(12) United States Patent
Kii

(10) Patent No.: US 7,870,222 B2
(45) Date of Patent: Jan. 11, 2011

(54) SYSTEMS AND METHODS FOR TRANSMITTING CONTENT BEING REPRODUCED

(75) Inventor: Manabu Kii, Tokyo (JP)

(73) Assignee: Sony Corporation, Tokyo (JP)

( * ) Notice: Subject to any disclaimer, the term of this patent is extended or adjusted under 35 U.S.C. 154(b) by 540 days.

(21) Appl. No.: 11/641,745

(22) Filed: Dec. 20, 2006

(65) Prior Publication Data
US 2007/0169147 A1     Jul. 19, 2007

(30) Foreign Application Priority Data

Dec. 28, 2005 (JP) ............................. 2005-377376
Nov. 28, 2006 (JP) ............................. 2006-320506

(51) Int. Cl.
*G06F 15/16* (2006.01)

(52) U.S. Cl. ................... 709/217; 709/231; 709/203

(58) Field of Classification Search ........... 709/206, 709/217, 219, 231, 229, 203
See application file for complete search history.

(56) References Cited

U.S. PATENT DOCUMENTS

| | | | |
|---|---|---|---|
| 6,735,251 B2* | 5/2004 | Sugahara | 375/240.01 |
| 6,928,423 B1* | 8/2005 | Yamanaka | 705/50 |
| 7,120,800 B2* | 10/2006 | Ginter et al. | 713/193 |
| 7,353,541 B1* | 4/2008 | Ishibashi et al. | 726/26 |
| 7,370,016 B1* | 5/2008 | Hunter et al. | 705/57 |
| 2002/0057900 A1* | 5/2002 | Nakajima | 386/94 |
| 2005/0033967 A1* | 2/2005 | Morino et al. | 713/182 |
| 2005/0254364 A1* | 11/2005 | Kuroda | 369/47.1 |
| 2006/0195696 A1* | 8/2006 | Hollar et al. | 713/176 |
| 2006/0294026 A1* | 12/2006 | Schellingerhout et al. | 705/80 |

FOREIGN PATENT DOCUMENTS

JP     2002-342192     11/2002

* cited by examiner

*Primary Examiner*—Kristie D Shingles
(74) *Attorney, Agent, or Firm*—Finnegan, Henderson, Farabow, Garrett & Dunner, L.L.P.

(57) ABSTRACT

Disclosed herein is an information communication terminal including: a storage unit for storing contents; a communication unit for carrying out a communication with an external apparatus; a content reproduction unit for reproducing a content stored in the storage unit; and an accessible-content setting unit for classifying contents into first category contents accessible by an external apparatus and second category contents inaccessible by an external apparatus and changing a content being reproduced by the content reproduction unit to a first category content if the content being reproduced is a second category content. The terminal further includes a transmission control unit for controlling the communication unit to transmit a first category content to an external apparatus if a request for the first category content is received from the external apparatus through said communication unit.

14 Claims, 38 Drawing Sheets

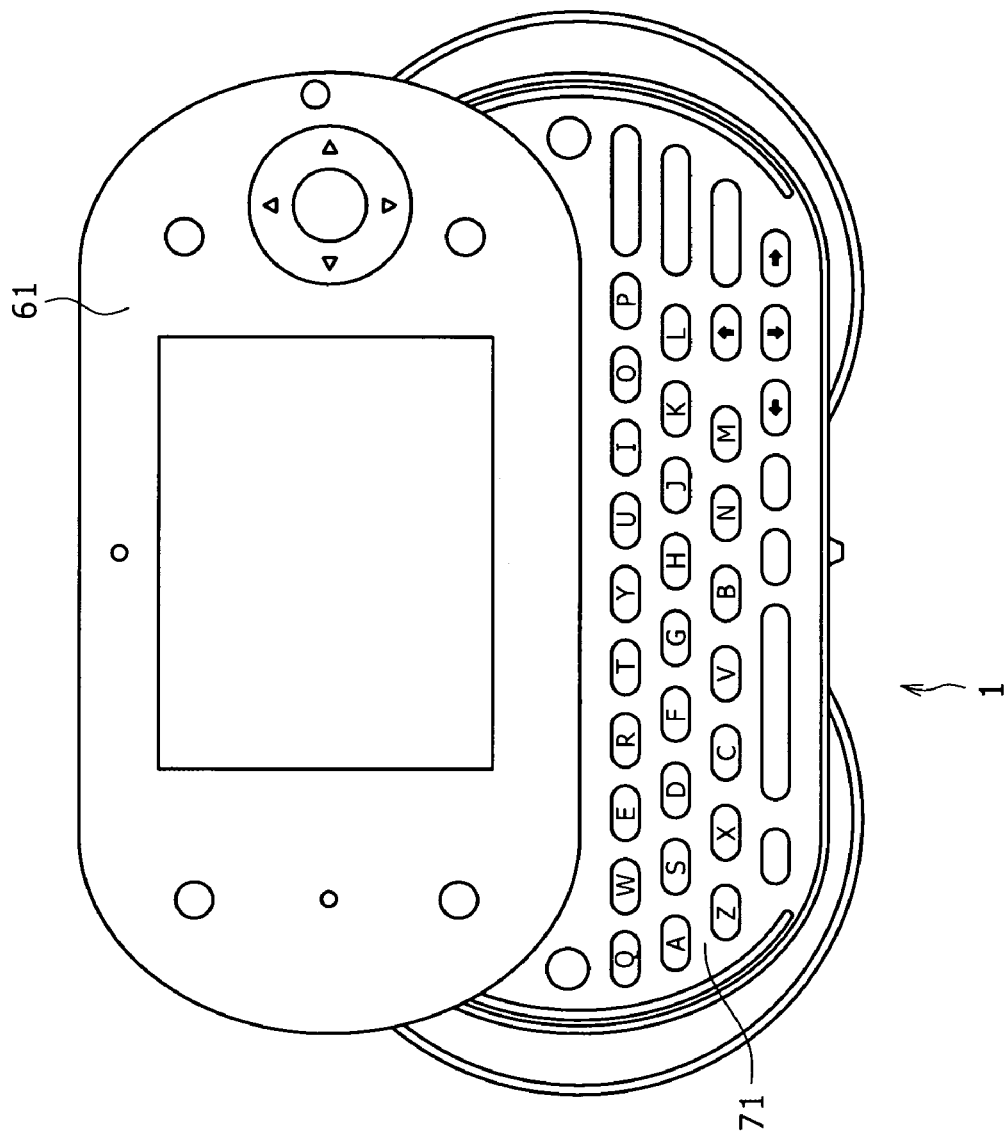

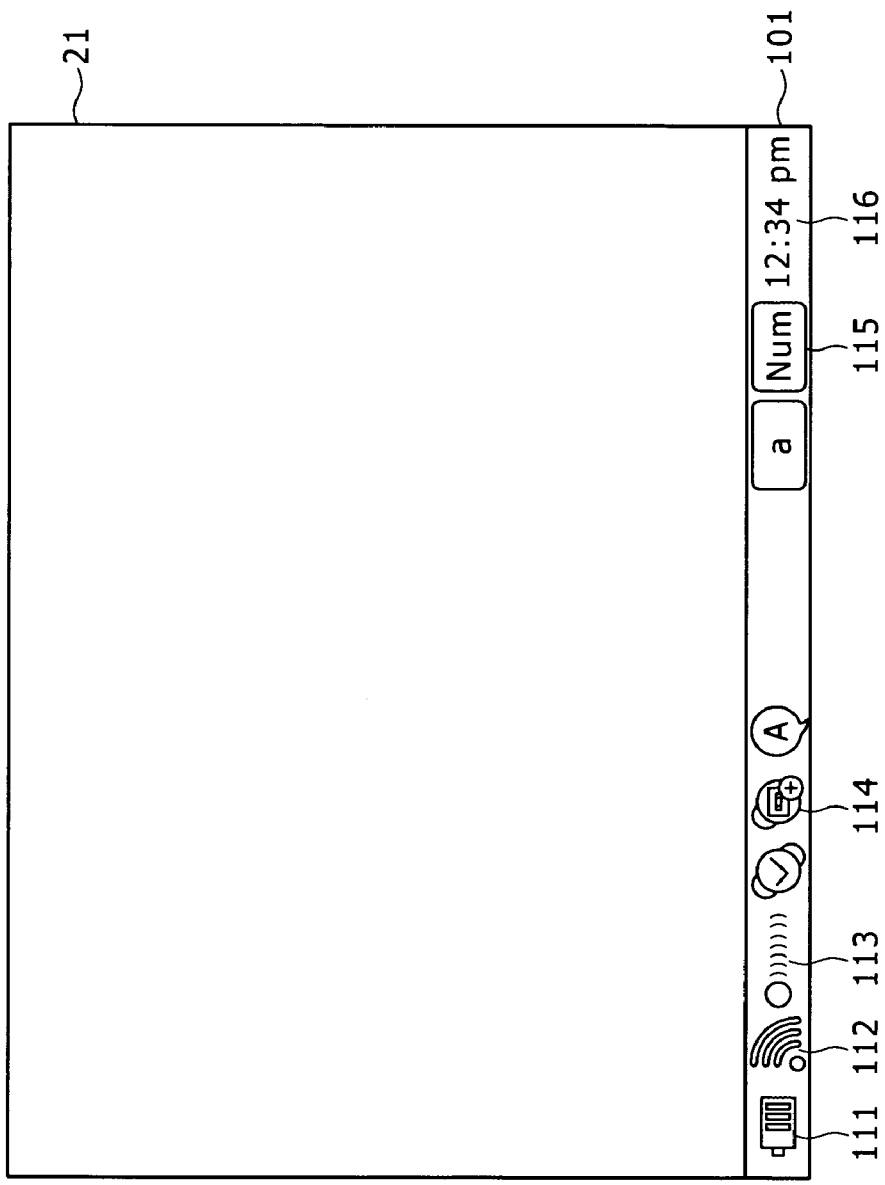

FIG. 10

| ITEM | DESCRIPTION |
|---|---|
| BATTERY RESIDUAL CHARGE DISPLAY | SHOWS THE AMOUNT OF CHARGE REMAINING IN THE BATTERY. TYPICAL DISPLAYS ARE 0%, 25%, 50%, 75% AND 100%. WHEN THE BATTERY IS BEING CHARGED, AN ANIMATION INDICATING A BATTERY STATE OF BEING ELECTRICALLY CHARGED IS DISPLAYED. |
| WLAN STRENGTH DISPLAY | SHOWS THE STRENGTH OF THE WLAN. FOR EXAMPLE, THIS DISPLAY SHOWS THE STRENGTH OF THE WLAN AT 4 STAGES, i.e., 0, 1, 2 AND 3. |
| WLAN STATE DISPLAY | SHOWS THE MODE AND CONNECTION STATE OF THE WLAN. TYPICAL MODES OF THE WLAN INCLUDE AN OFF MODE, AN INFRASTRUCTURE MODE AND AN AD-HOC MODE WHEREAS THE CONNECTION STATE OF THE WLAN CAN BE A CONNECTED STATE OR AN OFFLINE STATE. |
| IP TELEPHONE STATE DISPLAY (IN THE WLAN INFRASTRUCTURE MODE) | SHOWS THE STATE OF AN IP TELEPHONE APPLICATION. |
| INSTANT MESSENGER STATE DISPLAY (IN THE WLAN INFRASTRUCTURE MODE) | SHOWS THE STATE OF AN INSTANT MESSENGER APPLICATION. |
| AD-HOC APPLICATION STATE DISPLAY (IN THE WLAN AD-HOC MODE) | SHOWS INFORMATION ON THE CONNECTION OF AN APPLICATION UTILIZING AN AD-HOC CONNECTION. |
| KEYBOARD INPUT MODE DISPLAY | SHOWS THE MODE OF A SPECIAL KEY ON THE KEYBOARD. THE SPECIAL KEYS CAN BE ALT, NUM, SHIFT OR Fn. IN THE CASE OF HOLD, A HOLD MARK IS DISPLAYED. |
| CLOCK DISPLAY | SHOWS A CLOCK. |

FIG. 22

Text Editor.Album Comments

Love her or loathe her, uber-diva Jennifer Lopez knows how to deliver on record. She understands how to make the most of her limited vocal range, choosing to surround herself with able producers Rodney Jerkins, Timbaland, Big Boi and Cory Rooney, who oversaw Lopez's first

| about | as | ask | book |

12:34 pm    a    Num

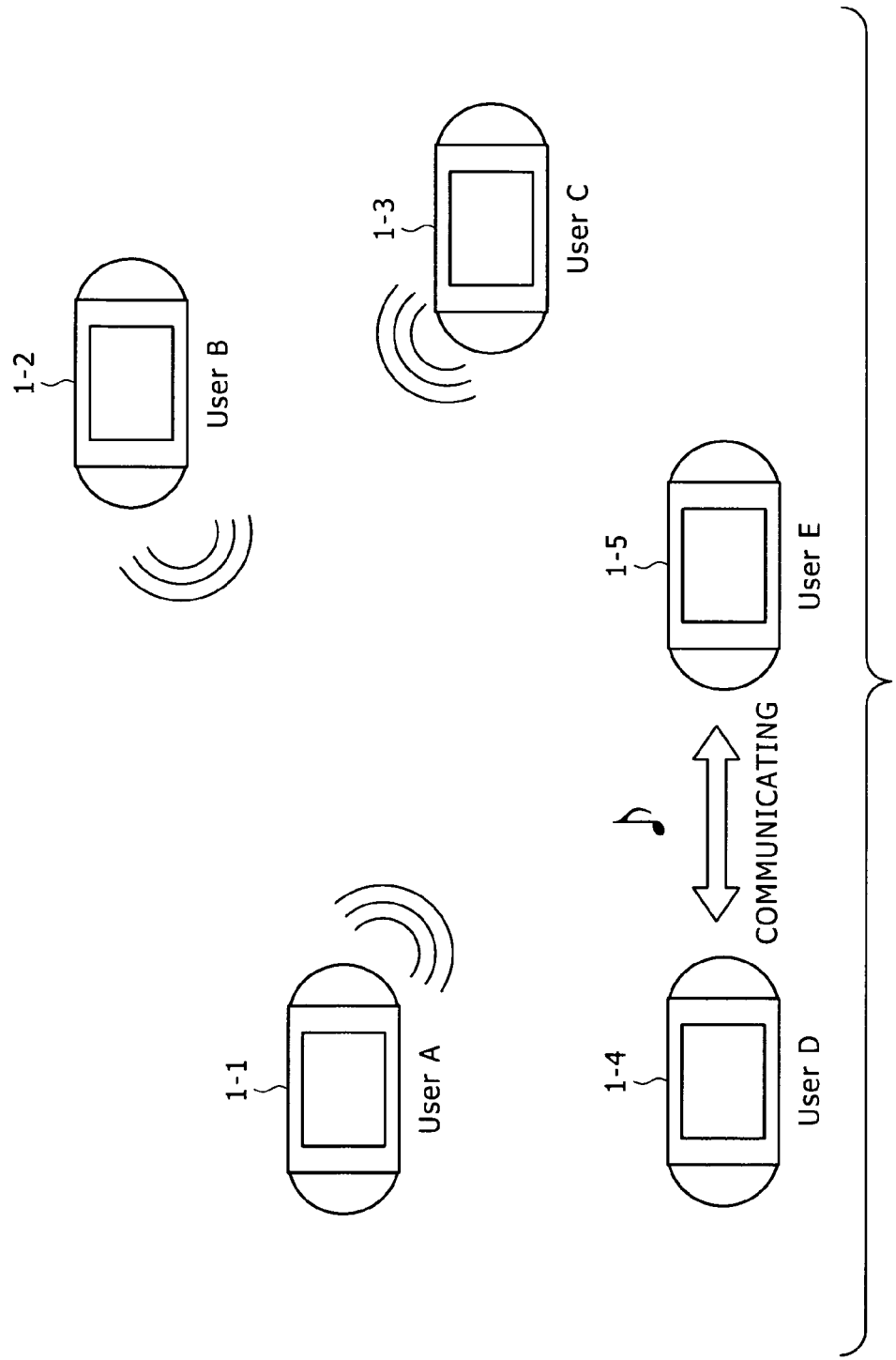

FIG. 24

| ITEM | DESCRIPTION |
|---|---|
| UNIQUE IP ADDRESS/PORT OF THIS STATION | IP ADDRESS AND PORT NUMBER |
| UNIQUE ID OF THIS STATION | UNIQUE ID OF THE APPARATUS |
| USER ID | ID OF THE USER WITH A SET PROFILE |
| CONNECTION/DISCONNECTION INFORMATION | BUSY, READY OR THE LIKE |
| INFORMATION ON MUSIC BEING REPRODUCED | MUSIC TITLE AND ARTIST NAME |
| SEQUENCE NUMBER AND OBJECT HANDLE OF MUSIC BEING REPRODUCED | INFORMATION REQUIRED IN STREAMING REPRODUCTION OF MUSICAL DATA WITH A PROTECTED COPYRIGHT |
| OTHER INFORMATION ON A REPRODUCTION STATE OR THE LIKE | |
| USER TEXT MEMO | TEXT MEMO ENTERED BY THE USER |

FIG. 26

| ITEM | DESCRIPTION |
|---|---|
| APPARATUS ID | APPARATUS UNIQUE ID |
| USER ID | ID OF A USER WITH A SET PROFILE |
| TEXT MEMO | TEXT DATA ENTERED BY THE USER FOR REGISTERING |
| FACE ICON | 96x96 BITMAP |
| USER-COLOR INFORMATION | COLOR SET BY THE USER AS A COLOR OF THE USER (36 COLORS) |
| COMMUNICATION APPLICATION ID | ID OF A COMMUNICATION APPLICATION |
| IM ID | ID OF AN INSTANT MESSENGER |

SYSTEMS AND METHODS FOR TRANSMITTING CONTENT BEING REPRODUCED

CROSS REFERENCES TO RELATED APPLICATIONS

The present invention contains subject matter related to Japanese Patent Application JP 2005-377376, filed in the Japanese Patent Office on Dec. 28, 2005, the entire contents of which being incorporated herein by reference.

BACKGROUND OF THE INVENTION

1. Field of the Invention

The present invention relates to an information processing apparatus, an information processing method, an information processing program and a recording medium. More particularly, the present invention relates to an information processing apparatus suitable for communications of information among a plurality of apparatus and capable of carrying out such communications, as well as relates to an information processing method adopted by the information processing apparatus, a program implementing the information processing method and a recording medium used for recording the program.

2. Description of the Related Art

Accompanying progress of the contemporary technologies, an information communication terminal capable of carrying out a streaming reproduction process is developed.

SUMMARY OF THE INVENTION

By the way, a streaming reproduction process is carried out as follows. An information communication terminal serving as a source to supply a predetermined musical content to be reproduced in a streaming reproduction process discloses a playlist including the predetermined musical content whereas a user owning an information communication terminal serving as a recipient to receive the predetermined musical content selects the content and confirms the selection of the content.

That is to say, the streaming reproduction process does not offer abundant features capable of keeping up with changing conditions. For example, a desired musical content not included on a playlist disclosed by the information communication terminal serving as a source to supply a musical content to be reproduced in a streaming reproduction process cannot be reproduced in the streaming reproduction process unless the desired musical content is added to the playlist in advance as a new content in spite of the fact that it is desirable to provide a feature allowing for example a musical content, which is being reproduced by the information communication terminal serving as a content supplier but not included on the playlist, to be temporarily disclosed while the content is being reproduced.

Addressing the problem described above, inventors of the present invention have developed a method allowing a musical content, which is being reproduced by an information communication terminal serving as a source to supply a musical content to be reproduced in a streaming reproduction process but not included on a playlist disclosed by the information communication terminal, to be temporarily disclosed while the content is being reproduced.

In accordance with a first embodiment of the present invention, there is provided an information communication terminal including:

a storage section for storing contents;

a communication section for carrying out a communication with an external apparatus;

a content reproduction section for reproducing a content stored in the storage section;

an accessible-content setting section for classifying contents into first category contents accessible by an external apparatus and second category contents inaccessible by an external apparatus and changing a content being reproduced by the content reproduction section to a first category content if the content being reproduced is a second category content; and a transmission control section for controlling the communication section to transmit a first category content to an external apparatus if a request for the first category content is received from the external apparatus through the communication section.

It is possible to provide the information communication terminal with a configuration in which the accessible-content setting section changes back the first category content to an original second category content after reproduction of the first category content is completed.

In addition, it is also possible to provide the information communication terminal with a configuration in which, if reproduction of a content in the reproduction section is inevitably stopped while the transmission control section is controlling the communication section to transmit the content to an external apparatus at a request made by the external apparatus as a request for the content, the accessible-content setting section handles the content as a first category content till the transmission control section completes the controlling transmission of the reproduced content to the external apparatus.

On top of that, it is also possible to provide the information communication terminal with a configuration further including a notification section for controlling the communication section to notify an external apparatus of information on a content, which is being reproduced by the content reproduction section, through the communication section.

Furthermore, it is also possible to provide the information communication terminal with a configuration in which the transmission control section controls the communication section to transmit a first category content to an external apparatus in a streaming format.

Moreover, it is also possible to provide the information communication terminal with a configuration further including a reception control section for controlling the communication section to transmit a request to an external apparatus as a request for a content by the external apparatus and receiving a content from the external apparatus through the communication section, wherein the content reproduction section reproduces the received content synchronously with the reproduction of the content in the external apparatus.

In addition, it is also possible to provide the information communication terminal with a configuration in which the accessible-content setting section sets a content stored in the storage section as a first category content by including the content on a playlist.

In accordance with a second embodiment of the present invention, there is provided an information communication method including the steps of:

classifying contents stored in a storage section into first category contents accessible by an external apparatus and second category contents inaccessible by an external apparatus;

reproducing a content stored in the storage section;

changing a content being reproduced at the content reproduction step to a first category content if the content being reproduced is a second category content; and controlling a communication section to transmit a first category content to an external apparatus if a request for the first category content is received from the external apparatus through the communication section.

In accordance with a third embodiment of the present invention, there is provided a recording medium used for storing a computer-readable program to be executed by a computer for carrying out processing including the steps of:

classifying contents stored in a storage section into first category contents accessible by an external apparatus and second category contents inaccessible by an external apparatus;

reproducing a content stored in the storage section;

changing a content being reproduced at the content reproduction step to a first category content if the content being reproduced is a second category content; and controlling a communication section to transmit a first category content to an external apparatus if a request for the first category content is received from the external apparatus through the communication section.

In accordance with a fourth embodiment of the present invention, there is provided an information communication system including a first information communication terminal and a second information communication terminal wherein:

the first information communication terminal has:

a first storage section for storing contents;

a first communication section for carrying out a communication with the second information communication terminal;

a first content reproduction section for reproducing a content stored in the first storage section;

a first accessible-content setting section for classifying contents into first category contents accessible by the second information communication terminal and second category contents inaccessible by the second information communication terminal and changing a content being reproduced by the first content reproduction section to a first category content if the content being reproduced is a second category content; and a transmission control section for controlling the first communication section to transmit a first category content being reproduced by the first content reproduction section to the second information communication terminal if a request for the first category content is received from the second information communication terminal through the first communication section; whereas the second information communication terminal has:

a second communication section for carrying out a communication with the first information communication terminal;

a reception control section for controlling the second communication section to transmit a request to the first information communication terminal as a request for a first category content being reproduced by the first information communication terminal and receive the first category content from the second information communication terminal; and a second content reproduction section for reproducing the first category content received by the second communication section from the first information communication terminal.

In accordance with the information communication terminal according to the first embodiment of the present invention and the information communication method according to the second embodiment of the present invention:

contents stored in a storage section are classified into first category contents accessible by an external apparatus and second category contents inaccessible by an external apparatus;

a content stored in the storage section is reproduced;

a content being reproduced is changed to a first category content if the content being reproduced is a second category content; and a first category content being reproduced is transmitted to an external apparatus by way of a communication section if a request for the first category content is received from the external apparatus through the communication section.

As described above, the computer-readable program cited before can be recorded on a recording medium according to the third embodiment of the present invention.

As described before, in accordance with the first embodiment of the present invention, a musical content, which is being reproduced by an information communication terminal serving as a source to supply a musical content to be reproduced in a streaming reproduction process but not included on a playlist disclosed by the information communication terminal, can be temporarily disclosed while the content is being reproduced.

BRIEF DESCRIPTION OF THE DRAWINGS

FIG. 8 is a diagram showing the front view of the external appearance of the information communication terminal with its cover slid upward;

FIG. 9 is an explanatory diagram showing a continuous display panel;

FIG. 10 explains pieces of information shown on the continuous display panel;

FIG. 22 is an explanatory diagram referred to in description of a character predictive conversion function;

FIG. 23 is an explanatory diagram referred to in description of communications in an ad-hoc mode;

FIG. 24 is an explanatory diagram referred to in description of pieces of typical information transmitted by an information communication terminal in an ad-hoc mode by adoption of a broadcasting transmission technique;

FIG. 26 is an explanatory diagram referred to in description of typical user information exchanged in a mutual registration process;

DETAILED DESCRIPTION OF THE PREFERRED EMBODIMENTS

Before preferred embodiments of the present invention are explained, relations between disclosed inventions and the embodiments are explained in the following comparative description. This description is intended to ensure that the embodiments according to the present invention conform to the specification and drawings therein. It is to be noted that, even if there is an embodiment described in this specification but not included in the following comparative description as an embodiment corresponding to an invention, such an embodiment is not to be interpreted as an embodiment not corresponding to an invention. Conversely speaking, an embodiment included in the following comparative description as an embodiment corresponding to a specific invention is not to be interpreted as an embodiment not corresponding to an invention other than the specific invention.

Figure 38:
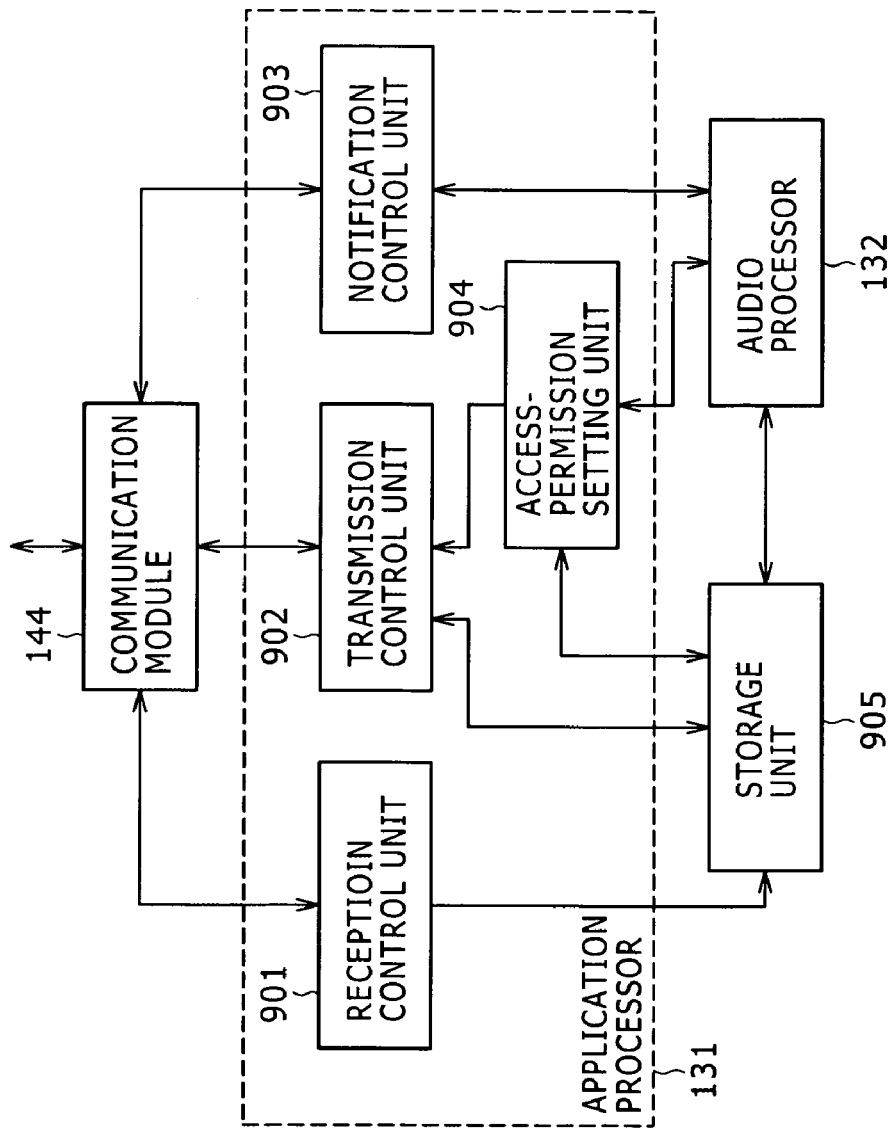
FIG. 38 is a functional block diagram showing functions of an application processor.

In accordance with a first embodiment of the present invention, there is provided an information communication terminal (such as an information communication terminal 1) including:

a storage section (such as a storage unit 905 shown in FIG. 38) for storing contents;

a communication section (such as a communication module 144 shown in FIG. 38) for carrying out a communication with an external apparatus;

a content reproduction section (such as an audio processor 132 shown in FIG. 38) for reproducing a content stored in the storage section;

an accessible-content setting section (such as an access-permission setting unit 904 employed in the application processor 131 shown in FIG. 38) for classifying contents into first category contents (such as disclosable contents) accessible by an external apparatus and second category contents (such as undisclosable contents) inaccessible by an external apparatus and changing a content being reproduced by the content reproduction section to a first category content if the content being reproduced is a second category content; and a transmission control section (such as a music streaming shown in FIG. 12 as a streamer of the application processor 131) for controlling the communication section to transmit a first category content to an external apparatus if a request for the first category content is received from the external apparatus through the communication section.

It is possible to provide the information communication terminal with a configuration in which the accessible-content setting section changes back the first category content (such as a temporarily disclosed content) to an original second category content (such as an undisclosable content) after reproduction of the first category content is completed.

In addition, it is also possible to provide the information communication terminal with a configuration in which, if reproduction of a content in the reproduction section is inevitably stopped (for example at a request made by a user owning the information communication terminal) while the transmission control section is controlling the communication section to transmit the content to an external apparatus at a request made by the external apparatus as a request for the content, the accessible-content setting section handles the content as a first category content till the transmission control section completes the controlling transmission of the reproduced content to the external apparatus.

On top of that, it is also possible to provide the information communication terminal with a configuration further including a notification section (such as an ad-hoc communication engine shown in FIG. 12 as an engine of the application processor 131) for controlling the communication section to notify an external apparatus of information on a content, which is being reproduced by the content reproduction section, through the communication section.

Furthermore, it is also possible to provide the information communication terminal with a configuration in which the transmission control section controls the communication section to transmit a first category content to an external apparatus in a streaming format (such as a content stream format).

Moreover, it is also possible to provide the information communication terminal with a configuration further having a reception control section (such as the application processor 131 shown in FIG. 38) for controlling the communication section to transmit a request to an external apparatus as a request for a content by the external apparatus and receiving a content from the external apparatus through the communication section, wherein the content reproduction section reproduces the received content synchronously with the reproduction of the content in the external apparatus.

Figure 34:
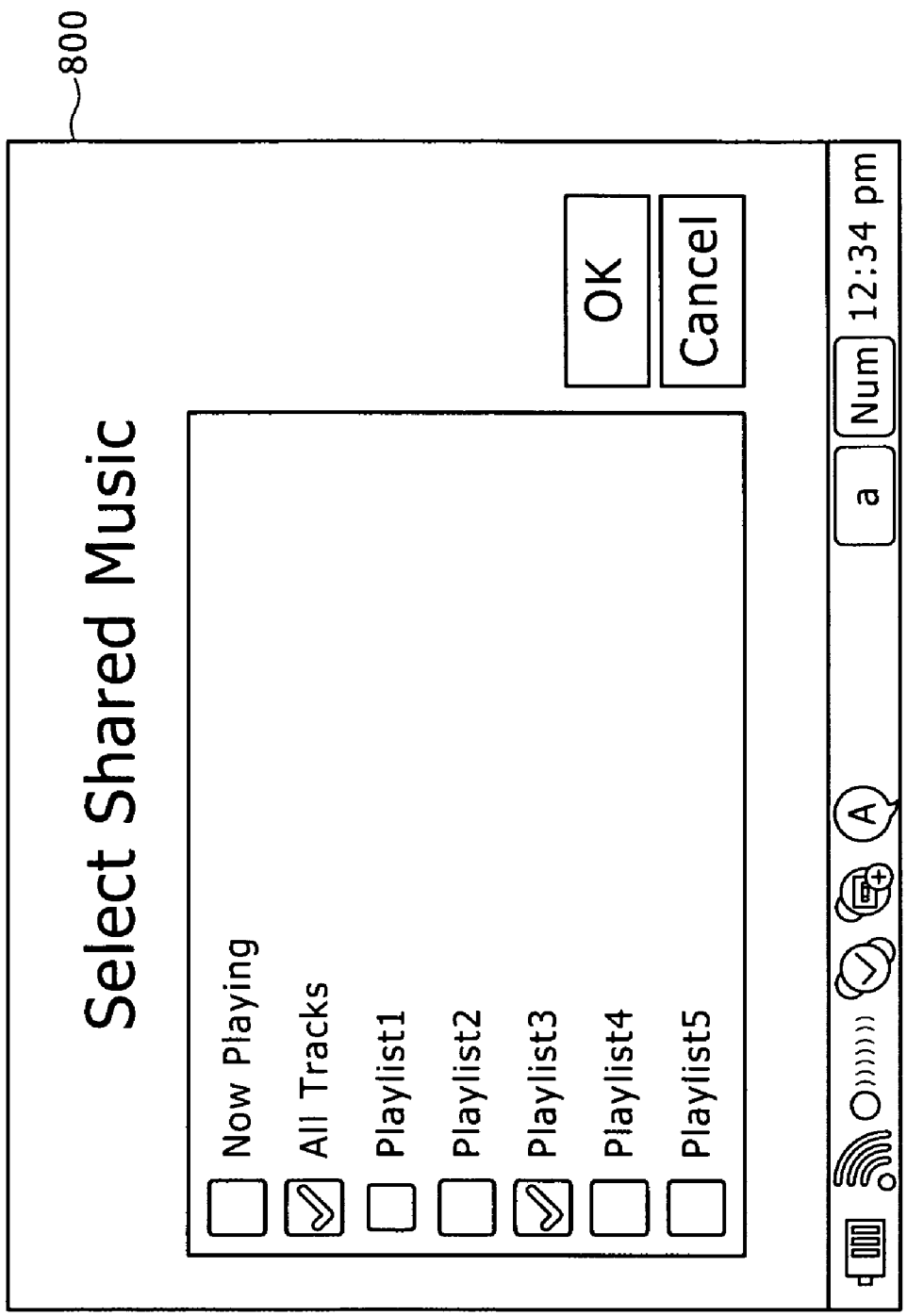
FIG. 34 is a diagram showing a typical setting screen displaying disclosed playlists and a now-playing item.

In addition, it is also possible to provide the information communication terminal with a configuration in which the accessible-content setting section sets a content stored in the storage section as a first category content by including the content on a playlist (such as one of playlists displayed on a screen shown in FIG. 34).

Figure 33:
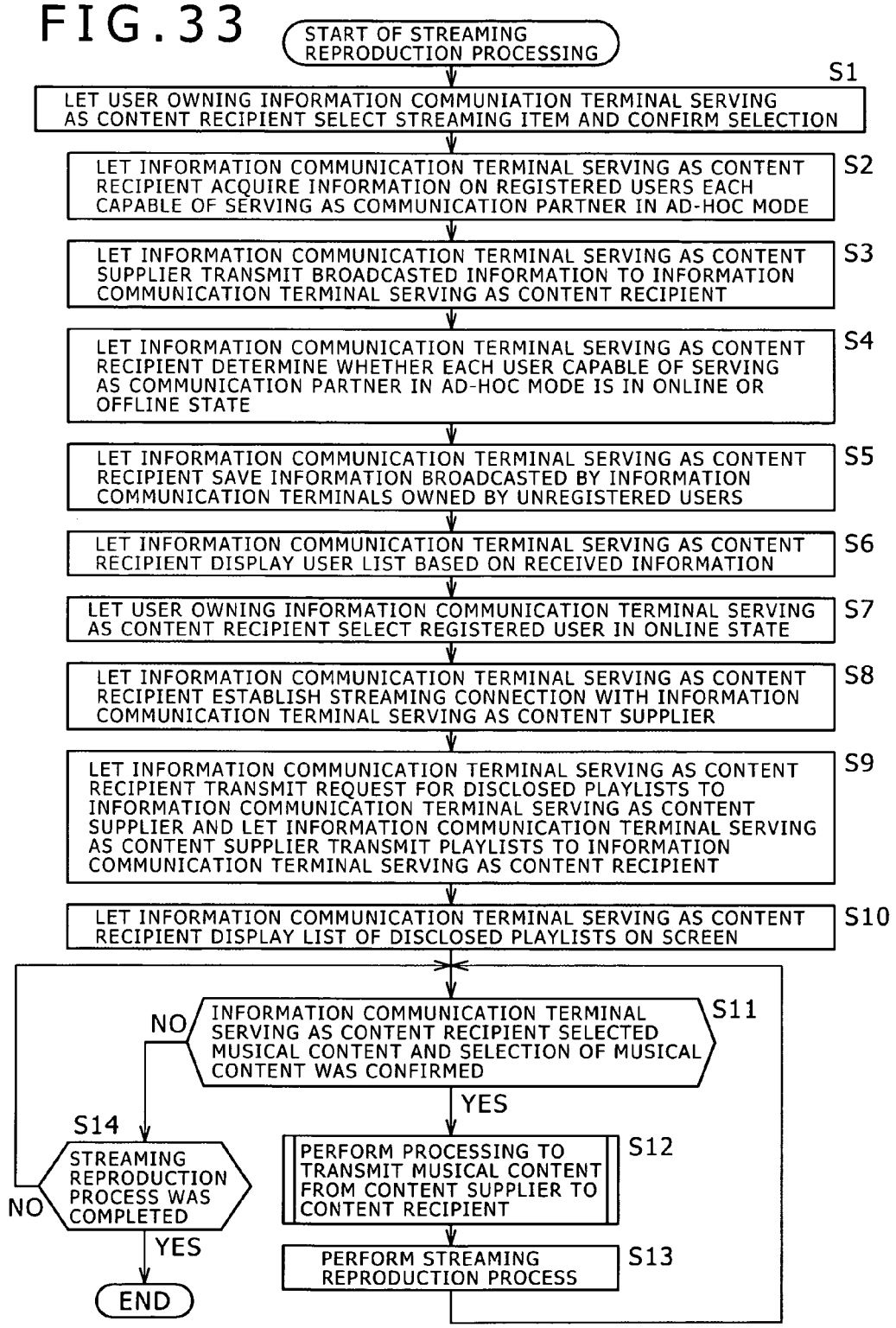
FIG. 33 shows a flowchart to be referred to in explanation of processing to implement a streaming reproduction process.

In accordance with a second embodiment of the present invention, there is provided an information communication method including the steps of:

classifying contents stored in a storage section into first category contents accessible by an external apparatus and second category contents inaccessible by an external apparatus;

reproducing a content stored in the storage section;

changing a content being reproduced at the content reproduction step to a first category content if the content being reproduced is a second category content; and transmitting a first category content being reproduced to an external apparatus by way of a communication section if a request for the first category content is received from the external apparatus through the communication section (for example in a process carried out at a step S12 of a flowchart shown in FIG. 33).

In accordance with a third embodiment of the present invention, there is provided a recording medium used for storing a computer-readable program to be executed by a computer for carrying out processing including the steps of:

classifying contents stored in a storage section into first category contents accessible by an external apparatus and second category contents inaccessible by an external apparatus;

reproducing a content stored in the storage section;

changing a content being reproduced at the content reproduction step to a first category content if the content being reproduced is a second category content; and controlling a communication section to transmit a first category content to an external apparatus if a request for the first category content is received from the external apparatus through the communication section (for example in the process carried out at the step S12 of the flowchart shown in FIG. 33).

In accordance with a fourth embodiment of the present invention, there is provided an information communication system including a first information communication terminal (such as a information communication terminal 1) and a second information communication terminal (such as another information communication terminal 1) wherein:

the first information communication terminal has:

a first storage section (such as the storage unit 905 shown in FIG. 38) for storing contents;

a first communication section (such as the communication module 144 shown in FIG. 38) for carrying out a communication with the second information communication terminal;

a first content reproduction section (such as the audio processor 132 shown in FIG. 38) for reproducing a content stored in the first storage section;

a first accessible-content setting section (such as the access-permission setting unit 904 employed in the application processor 131 shown in FIG. 38) for classifying contents into first category contents accessible by the second information communication terminal and second category contents inaccessible by the second information communication terminal and changing a content being reproduced by the first content reproduction section to a first category content if the content being reproduced is a second category content; and a transmission control section (such as a transmission control unit 902 employed in the application processor 131 shown in FIG. 38) for controlling the first communication section to transmit a first category content being reproduced by the first content reproduction section to the second information communication terminal if a request for the first category content is received from the second information communication terminal through the first communication section; whereas the second information communication terminal has:

a second communication section (such as the communication module 144 shown in FIG. 38) for carrying out a communication with the first information communication terminal;

a reception control section (such as a reception control unit 901 employed in the application processor 131 shown in FIG. 38) for controlling the second communication section to transmit a request to the first information communication terminal as a request for a first category content being reproduced by the first information communication terminal and receive the first category content from the second information communication terminal; and a second content reproduction section (such as the audio processor 132 shown in FIG. 38) for reproducing the first category content received by the second communication section from the first information communication terminal.

The embodiments of the present invention are explained by referring to diagrams as follows.

Figure 1:
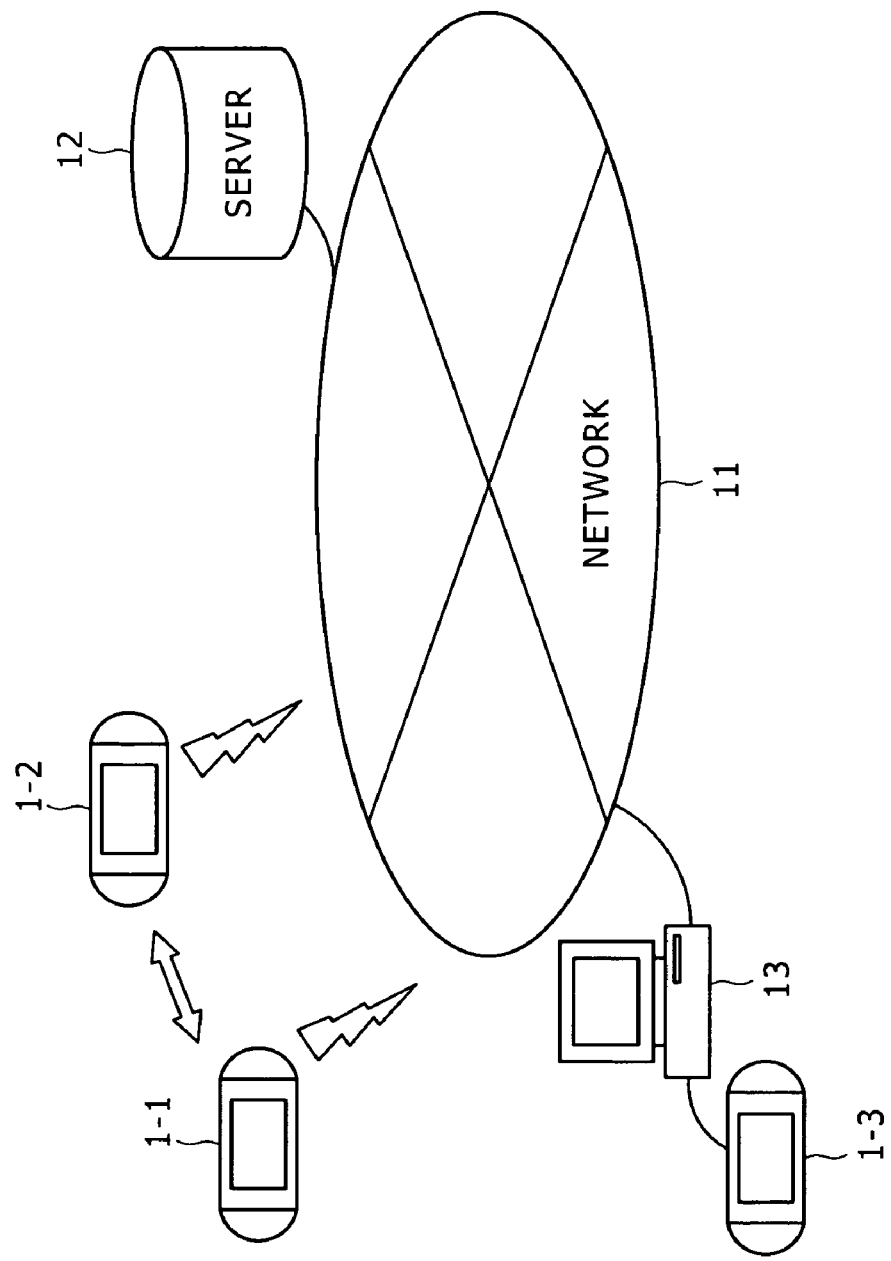
FIG. 1 is an explanatory diagram showing an information communication system including information communication terminals each provided by the present invention.

By referring to FIG. 1, the following description explains an information communication system including information communication terminals 1-1 to 1-3 each provided by the present invention. It is to be noted that the information communication terminals 1-1 to 1-3 shown in FIG. 1 have the same functions.

Typically, the information communication terminals 1-1 to 1-3 each execute a variety of programs in order to carry out a variety of functions such as a function to communicate information through radio or wired communication, a function to record various kinds of information, a function to reproduce audio and video data, a function to display various kinds of information such as recorded information, reproduced video information an GUI (Graphic User Interface) information serving as an aid helping the user enter an operation input via a variety of input devices and a function to receive an operation input entered by the user. In the following description, the information communication terminals 1-1 to 1-3 are each referred to simply as an information communication terminal 1, which is a generic name representing the information communication terminals 1-1 to 1-3, in case there is no need to distinguish the information communication terminals 1-1 to 1-3 from each other.

To put it concretely, the information communication terminal 1 has a WLAN (Wireless Local Area Network meaning a radio LAN) function conforming to typically a 802.11b standard as a function allowing the information communication terminal 1 to be connected to other apparatus and making the information communication terminal 1 capable of exchanging information with the other apparatus. The information communication terminal 1 is capable of selecting either an infrastructure mode or an ad-hoc mode. The WLAN infrastructure mode is a mode in which the information communication terminal 1 carries out a communication with another information communication terminal through an access point in the WLAN. On the other hand, the WLAN ad-hoc mode is a mode in which the information communication terminal 1 carries out a communication with another information communication terminal without using an access point in the WLAN. The information communication terminal 1 can also be connected to another apparatus by using a cable conforming to typically a USB (Universal Serial Bus) 2.0 standard so that the information communication terminal 1 is capable of exchanging information with the other apparatus. It is to be noted that the USB connection of the information communication terminal 1 may be implemented in accordance with either of an MSC (Mass Storage Class) mode and an MTP (Media Transfer Protocol) mode, either of which can be selected as a USB mode.

That is to say, if the information communication terminal 1 is an apparatus subscribing a predetermined service or an apparatus having a predetermined application program installed therein in order to implement predetermined setting, the information communication terminal 1 is capable of exchanging information with or without a predetermined access point with not only another information communication terminal, but also any other apparatus through a radio or wire communication.

Typically, the information communication terminal 1 includes a flash memory having a typical storage capacity of about 1 GB besides an ordinary volatile memory. In addition, if necessary, the information communication terminal 1 may be typically further provided with a large-capacity storage unit such as a hard disk. On top of that, the information communication terminal 1 has an LCD (Liquid Crystal Display) unit serving as a display device and also has a keyboard used as an input device. If necessary, the information communication terminal 1 may also be provided with other connected input devices such as a mouse and/or a joystick. The information communication terminal 1 may also be provided with a touch panel in addition to the LCD unit if required.

In addition, the information communication terminal 1 is capable of recording audio data supplied thereto and reproducing recorded audio data in accordance with an audio coding method such as an ATRAC3 (Advanced Transform Acoustic Coding 3) method, an MP3 (MPEG Audio Layer-3) method or a WMA (Windows (a registered trademark) Media Audio) method. Furthermore, the information communication terminal 1 also has the so-called photo viewer function for storing video data and reproducing as well as displaying the recorded video data. Moreover, the information communication terminal 1 is capable of avoiding operations such as distribution and exchanging of illegal data without a consent given by its copyright holder in accordance with various kinds of DRM (Digital Rights Management) such as OpenMG management or WMT10 (Janus) management.

On top of that, the information communication terminal 1 may have a variety of application programs installed therein as programs to be executed to carry out various kinds of processing. The application programs include an IP telephone program, an instant messenger, an email program, a web browser and a text editor.

Furthermore, the information communication terminal 1 has such a size that the information communication terminal 1 can be grasped by a hand of the user, providing desirable convenience such as portability to the user.

In addition, the information communication terminal 1 can be connected to a network 11 such as the Internet directly by a radio communication so that the information communication terminal 1 is capable of exchanging information with a variety of servers 12, a variety of personal computers 13 and other information communication terminals 1 through the network 11. The other information communication terminals 1 are any of the information communication terminals 1-1 to 1-3 shown in the figure.

Moreover, the information communication terminal 1 is also capable of exchanging information directly with other information communication terminals 1 by a radio communication. The other information communication terminals 1 are any of the information communication terminals 1-1 to 1-3 shown in the figure.

On top of that, the information communication terminal 1 can be connected to the personal computer so that the information communication terminal 1 is capable of exchanging information with the personal computer 13 as well as a variety of servers and other information communication terminals through the network 11 (such as the Internet) connected to the personal computer 13. In the example shown in the figure, the information communication terminal 1-3 is connected to the personal computer 13.

In addition, it is needless to say that the network 11 employed in the information communication system can be connected to more information communication terminals 1, more servers 12 and more personal computers 13.

Figure 2:
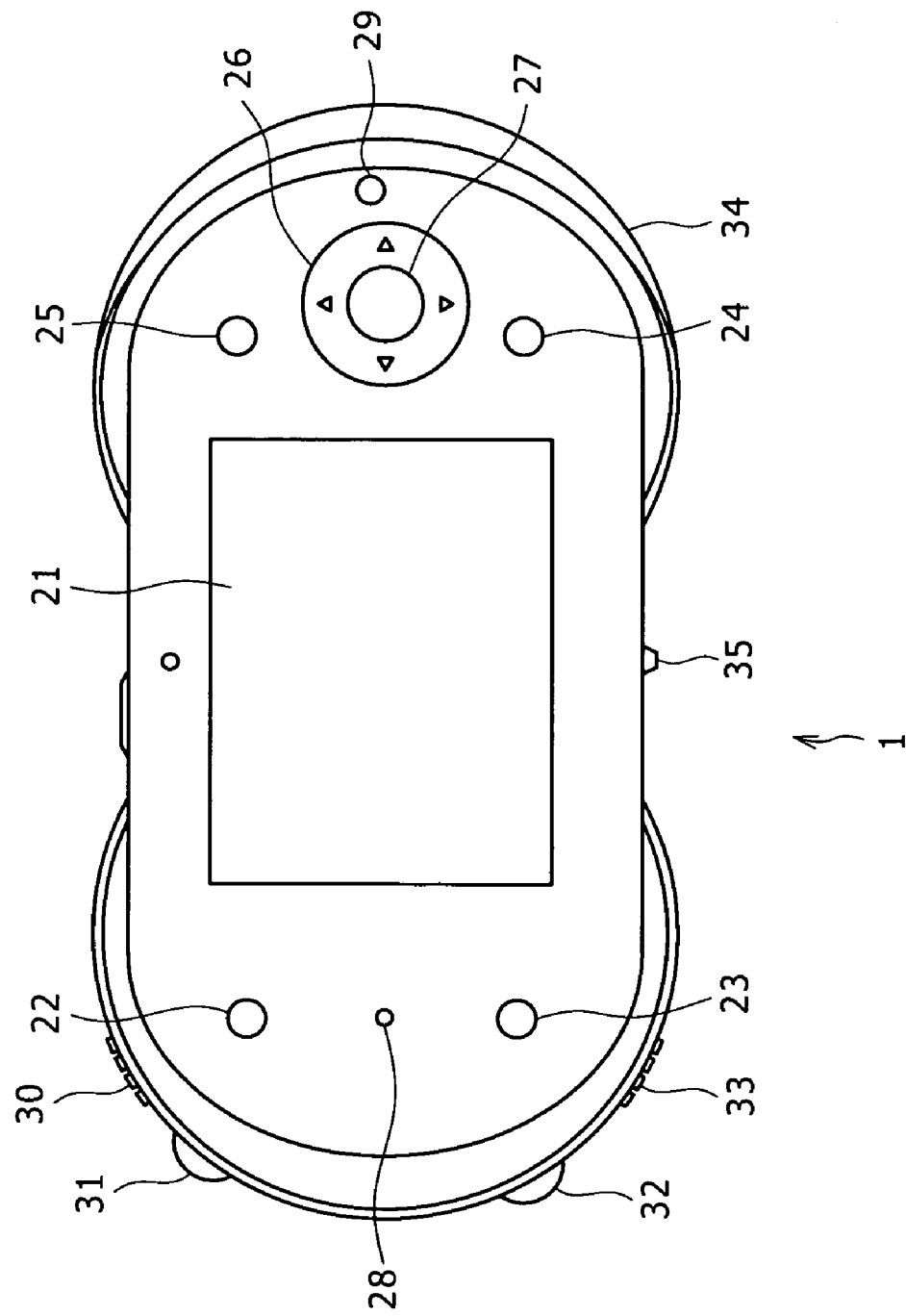
FIG. 2 is a diagram showing the front view of the external appearance of the information communication terminal.

Next, the external appearance of the information communication terminal 1 is explained by referring to FIGS. 2 to 8. FIG. 2 is a diagram showing the front view of the external appearance of the information communication terminal 1.

As shown in the figure, the front face of the information communication terminal 1 has a display unit 21, a WLAN-mode switching button 22, a home button 23, a back button 24, an option button 25, 4-direction keys 26, an enter button 27, a speaker 28 and a mike 29. The left-side face of the information communication terminal 1 includes a WLAN on/off switch 30, a WLAN-state notification light emitting unit 31, a power-supply-state notification light emitting unit 32 and a power-supply switch 33. The left-side face is a face located on the left side when seen from a position facing the display unit 21. The right-side face of the information communication terminal 1 has a communication-state notification light emitting unit 34. The right-side face is a face located on the right side when seen from the position facing the display unit 21. The bottom of the information communication terminal 1 has a music key 35. The bottom is a face located on the lower side when seen from the position facing the display unit 21.

The display unit 21 is typically a flat display unit such as an LCD unit capable of displaying various kinds of information. The information displayed on the display unit 21 includes information on the state of the information communication terminal 1. Displays of the information on the state of the information communication terminal 1 are explained by referring to FIGS. 8 and 9. Other information displayed on the display unit 21 in various kinds of processing carried out by the information communication terminal 1 will also be properly described later.

The WLAN-mode switching button 22 is a button to be operated by the user to enter an operation input for switching the radio LAN on and off.

The home button 23 is a button to be operated by the user to enter an operation input for displaying a home menu on the display unit 21 without regard to the type of information currently displayed on the display unit 21. The home menu will be described later by referring to FIG. 14.

The back button 24 is a button to be operated by the user to enter an operation input for restoring the display screen displayed immediately before the current display screen.

The option button 25 is a button to be operated by the user to enter an operation input for showing a display screen used for displaying a variety of optional tools.

The 4-direction keys 26 are each a key to be operated by the user to enter an operation input for moving typically a cursor over a screen of information displayed on the display unit 21 in one of four directions, changing typically a selected button or a selected icon or carrying out another operation.

The enter button 27 is a button to be operated by the user to enter an operation input for making a final decision to determine a selected menu, a selected button, a selected icon or another selected item.

The speaker 28 is a speaker for outputting voices of a phone conversation such as in an IP telephone call and sounds reproduced by a predetermined application. The sounds reproduced by a predetermined application are audio data recorded in advance in the information communication terminal 1.

The mike 29 is an input component for inputting voices of a phone conversation in an IP telephone call and sounds acquired by a predetermined application.

The WLAN on/off switch 30 is a switch to be operated by the user to switch a radio communication function of the information communication terminal 1 from an enabled state to a disabled state and vice versa.

The WLAN-state notification light emitting unit 31 is typically a light emitting device and a light guide tube or a plurality of light emitting devices and a plurality of light guide tubes. An example of the light emitting device is an LED (light emitting diode). The WLAN-state notification light emitting unit 31 is a component for notifying the user of an enabled state or a disabled state of the radio communication function included in the information communication terminal 1. For example, if the radio communication function included in the information communication terminal 1 is in the enabled state, the WLAN-state notification light emitting unit 31 is turned on to emit light. If the radio communication function included in the information communication terminal 1 is in the disabled state, on the other hand, the WLAN-state notification light emitting unit 31 is turned off to cease transmission of light. In order to turn on the WLAN-state notification light emitting unit 31 or put the WLAN-state notification light emitting unit 31 in a blinking state, the communication-state notification light emitting unit 34 drives the LEDs to emit light through the light guide tubes.

The power-supply-state notification light emitting unit 32 is typically a light emitting device having an LED (light emitting diode) or a plurality of LEDs. The power-supply-state notification light emitting unit 32 is a component for notifying the user of information such as information on whether or not the power supply of the information communication terminal 1 has been turned on and whether the power supply is being electrically charged or the process to electrically charge the power supply has been completed. For example, the power-supply-state notification light emitting unit 32 is put in an on state when the power supply is turned on. When the power supply is turned off, on the other hand, the power-supply-state notification light emitting unit 32 is also put in an off state as well. In addition, when the power supply is being electrically charged, the power-supply-state notification light emitting unit 32 is put in an on state showing a color different from a color, which is shown when the power supply is turned on.

The power-supply switch 33 is a switch for turning the power supply of the information communication terminal 1 on or off.

The communication-state notification light emitting unit 34 is typically a light emitting device having an LED (light emitting diode) or a plurality of LEDs. The communication-state notification light emitting unit 34 is a component for notifying the user of the communication state of the information communication terminal 1. For example, in a WLAN infrastructure mode, the communication-state notification light emitting unit 34 is put in an on state showing a color different from a color, which is shown in a WLAN ad-hoc mode. When an IP telephone call arrives, the communication-state notification light emitting unit 34 is put in either of an on state and a blinking state, which show another color. That is to say, the communication-state notification light emitting unit 34 is put in an off state or either of the on and blinking states showing different colors depending on the radio communication state of the information communication terminal 1.

The WLAN infrastructure mode is a mode adopting a method of communication through a radio LAN access point. On the other hand, the WLAN ad-hoc mode adopting a method to directly exchange data among apparatus without making use of a radio LAN access point.

The music key 35 is a key used for entering an input making a request for an operation such as an operation to start a reproduction process, an operation to end a reproduction operation, a fast-forward operation, a rewind operation, a temporary stop, a reversed-direction AMS (Auto Music Scan) for the beginning of a piece of music or another operation.

Figure 3:
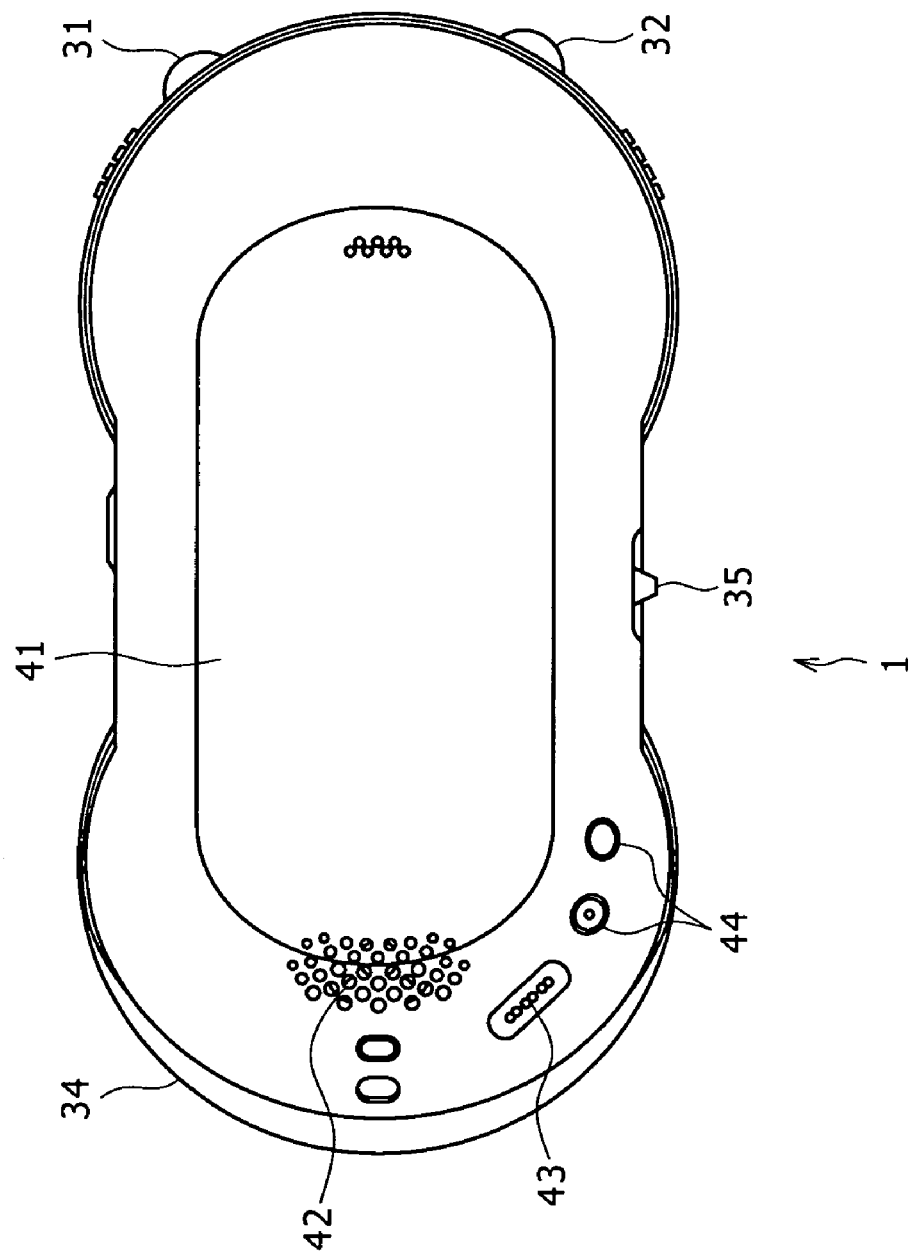
FIG. 3 is a diagram showing the rear view (opposite side to the face on which the display unit is visible) of the external appearance of the information communication terminal.

FIG. 3 is a diagram showing the rear view of the external appearance of the information communication terminal 1. The rear face is the face on the opposite side of the display unit 21.

As shown in the figure, the rear face of the information communication terminal 1 includes a battery cover 41 in addition to a ringer speaker 42, a hold switch 43 and a volume button 44, which are provided on a side in close proximity to the communication-state notification light emitting unit 34.

The battery cover 41 covers a battery mounting portion and a battery for supplying power to a variety of components employed in the information communication terminal 1.

The ringer speaker 42 is a speaker used mainly for outputting musical data stored on and reproduced from the information communication terminal 1 or outputting musical data streamed from another information communication terminal 1. The ringer speaker 42 is also a speaker for outputting, for example, a calling sound in the event of an arriving IP phone call.

The hold switch 43 is a switch to be operated by the user to invalidate inputs entered via all buttons and all switches in order to prevent an operation unintended by the user from being carried out due to an inadvertent operation performed on any of the buttons and switches typically when the information communication terminal 1 is kept in a pocket or a bag.

The volume button 44 is a button to be operated by the user to adjust the volume of a sound output by the ringer speaker 42.

Figure 4:
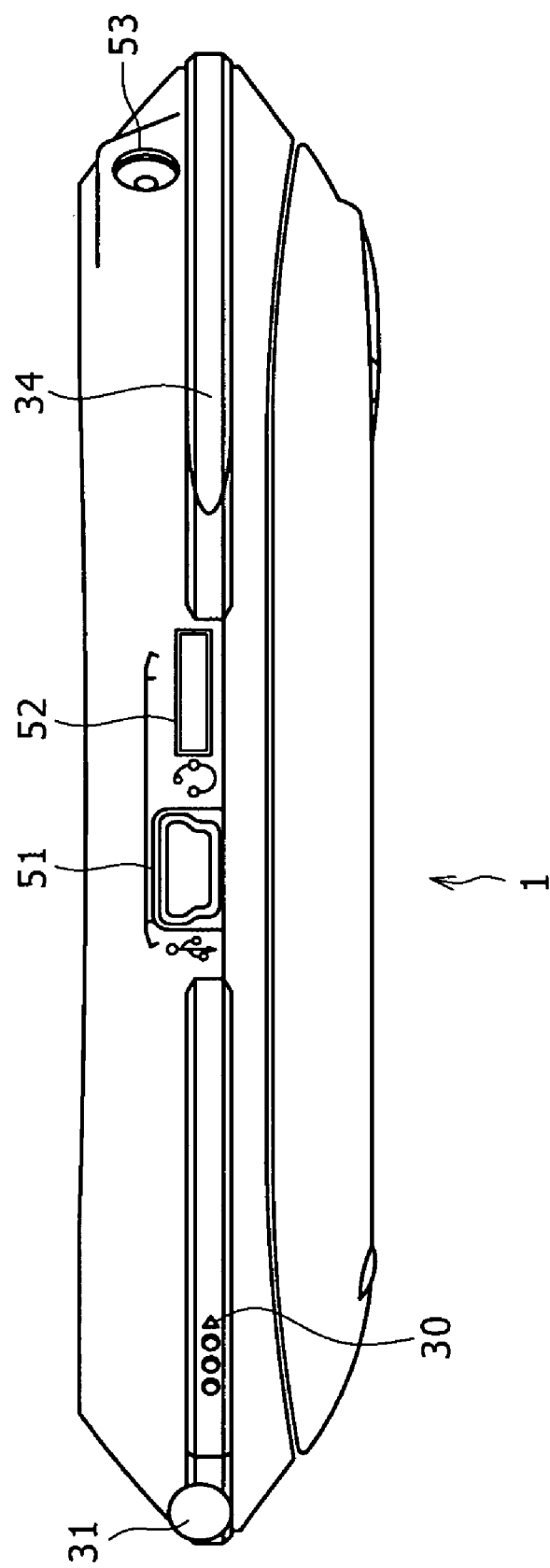
FIG. 4 is a diagram showing the top view of the external appearance of the information communication terminal where the top is defined as the side having a WLAN on/off switch.

FIG. 4 is a diagram showing the top view of the external appearance of the information communication terminal. In this case, the top is defined as the side having the WLAN on/off switch 30.

As shown in the figure, the top of the information communication terminal 1 includes a USB connector 51, a connector jack 52 and a DC jack 53.

A USB cable is connected to the USB connector 51, allowing the information communication terminal 1 to exchange information with another apparatus. As the USB connector 51, it is demanded to provide at least a downstream-side connector, and an upstream-side connector may be provided. The downstream-side connector is the so-called series-B or series-mini-B connector for connecting the information communication terminal 1 to the personal computer 13. On the other hand, the upstream-side connector is the so-called series-A connector for connecting the information communication terminal 1 to a peripheral apparatus. In addition, the information communication terminal 1 can receive a power supply via a USB connection.

The connector jack 52 is typically a 10-pin flat connector for connecting the information communication terminal 1 to an audio input/output device such as a headphone or a mike.

The DC jack 53 is used for receiving power of a DC power supply. In general, the DC jack 53 is connected to an AC/DC converter for converting the 100V AC power generated by the home power supply into a DC power supplied to the information communication terminal 1.

Figure 5:
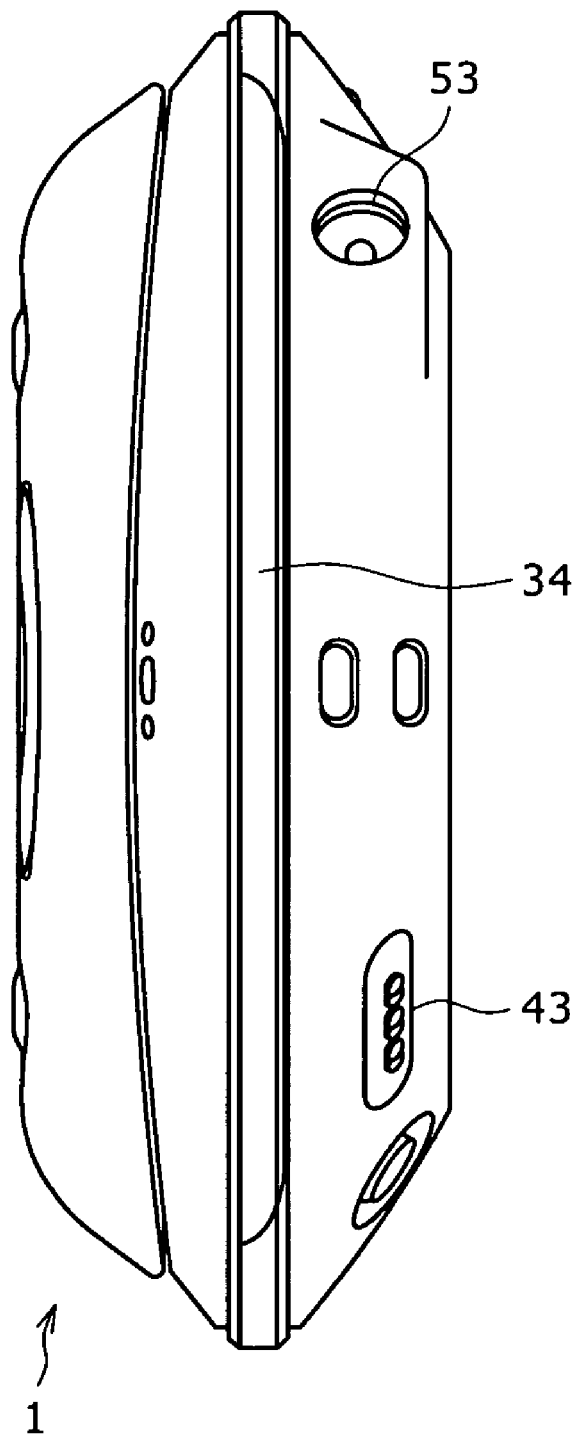
FIG. 5 is a diagram showing the right-side view of the external appearance of the information communication terminal where the right side is defined as the side located in the right when seen from a position at which a display unit of the information communication terminal is visible or, in other words, the right side is defined as the side having a communication-state notification light emitting unit.

FIG. 5 is a diagram showing the right-side view of the external appearance of the information communication terminal 1. In this case, the right side is defined as the side located in the right when seen from a position at which the display unit 21 of the information communication terminal 1 is visible or, in other words, the right side is defined as the side having a communication-state notification light emitting unit 34.

As shown in FIG. 5, the right-side face of the information communication terminal 1 also includes the hold switch 43 and the DC jack 53 in addition to the communication-state notification light emitting unit 34.

Figure 6:
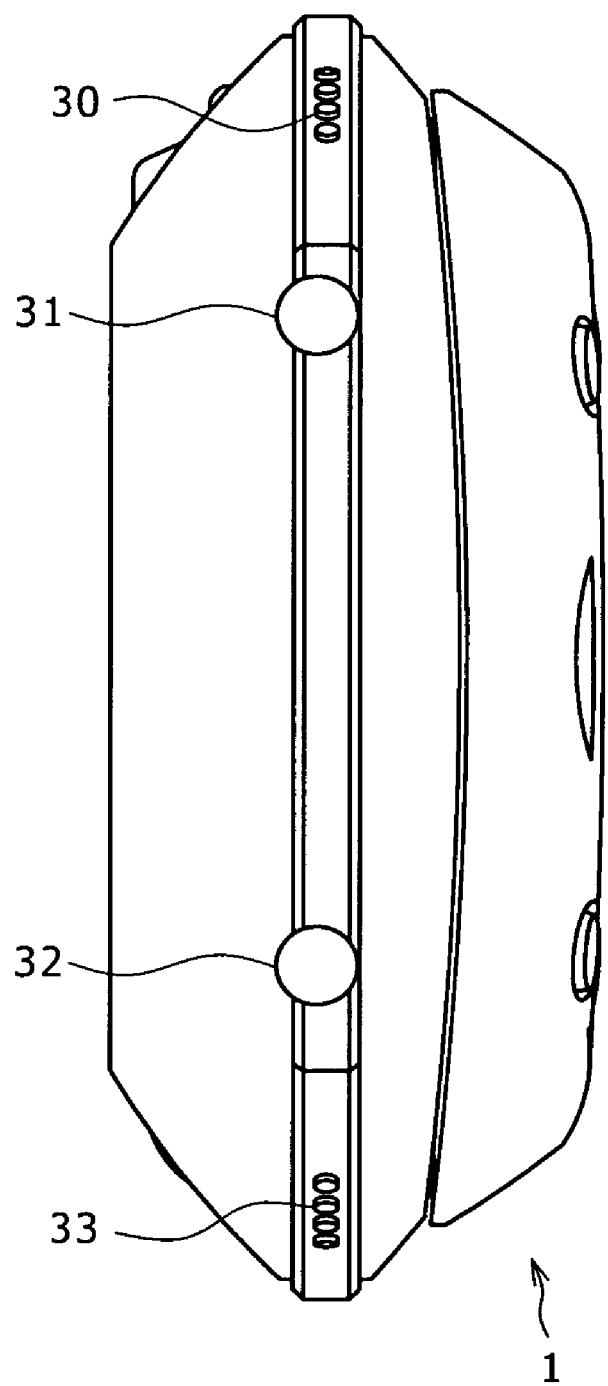
FIG. 6 is a diagram showing the left-side view of the external appearance of the information communication terminal where the left side is defined as the side located in the left when seen from a position at which the display unit of the information communication terminal is visible or, in other words, the right side is defined as the side having the WLAN on/off switch and a power-supply switch.

FIG. 6 is a diagram showing the left-side view of the external appearance of the information communication terminal 1. In this case, the left side is defined as the side located in the left when seen from a position at which a display unit 21 of the information communication terminal 1 is visible or, in other words, the right side is defined as the side having the WLAN on/off switch 30 and the power-supply switch 33.

As shown in FIG. 6, the left-side face of the information communication terminal 1 also includes the WLAN-state notification light emitting unit 31 and the power-supply-state notification light emitting unit 32 in addition to the WLAN on/off switch 30 and the power-supply switch 33.

Figure 7:
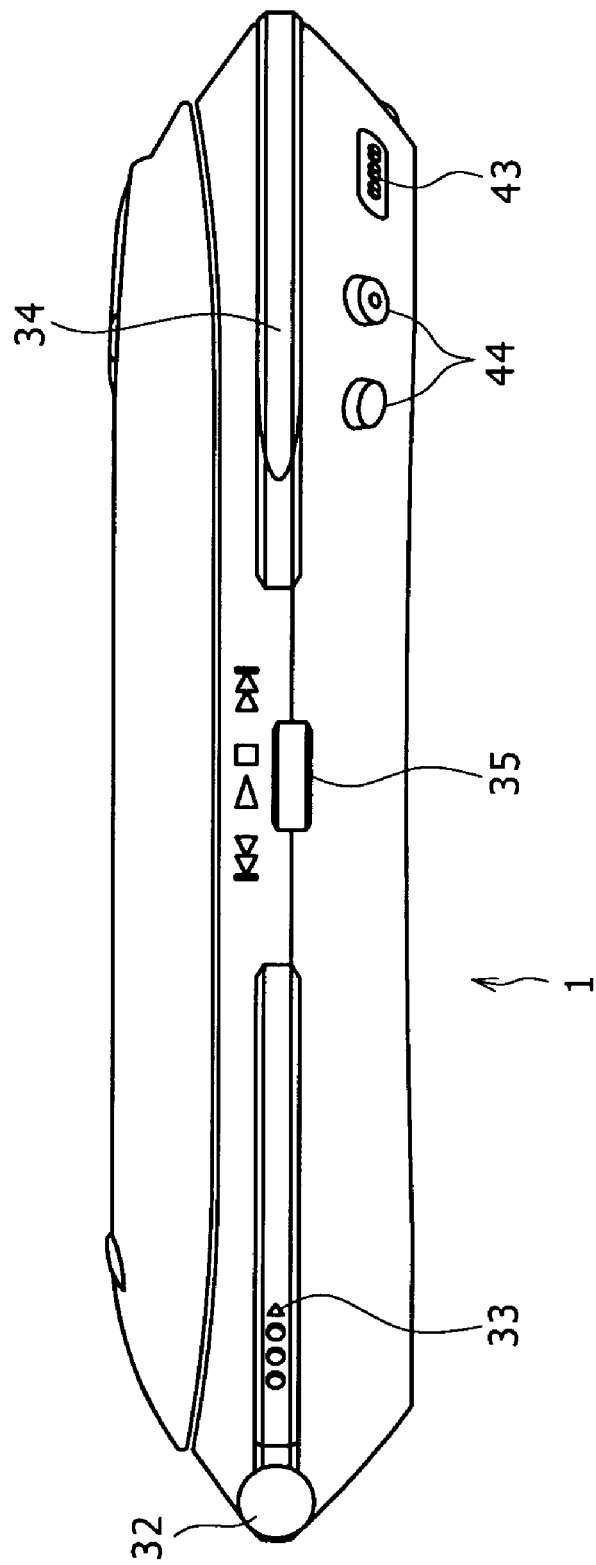
FIG. 7 is a diagram showing the bottom view of the external appearance of the information communication terminal where the bottom is defined as the side having the power-supply switch and a music key.

FIG. 7 is a diagram showing the bottom view of the external appearance of the information communication terminal 1. In this case, the bottom is defined as the side having the power-supply switch 33 and the music key 35.

As shown in FIG. 7, the bottom of the information communication terminal 1 also includes the power-supply-state notification light emitting unit 32, the communication-state notification light emitting unit 34, the hold switch 43 and the volume button 44 in addition to the power-supply switch 33 and the music key 35.

The information communication terminal 1 is configured to allow the cover 61 of the front face to be slid in the upward direction. As described earlier, the cover 61 has the display unit 21, the WLAN-mode switching button 22, the home button 23, the back button 24, the option button 25, the 4-direction keys 26, the enter button 27, the speaker 28 and the mike 29. The upward direction is an upward direction seen at a position in front of the display unit 21. With the cover 61 sled upward, a keyboard 71 is exposed to the user. FIG. 8 is a diagram showing the front view of the external appearance of the information communication terminal 1 with its front cover 61 slid upward.

The following description explains operation inputs related to the power supply and the WLAN as well as the states of the light emitting units explained above by referring to FIGS. 2 to 7.

First of all, with the power supply of the information communication terminal 1 put in an off state, the light emitting units including the power-supply-state notification light emitting unit 32 do not emit light either. Then, let us assume that the power-supply switch 33 is turned on in order to change the state of the power supply from the off state to an on state. In this case, the power-supply-state notification light emitting unit 32 emits light having a predetermined color indicating that the power supply has been put in the on state. In this state, the information communication terminal 1 is capable of accepting a normal operation input entered by the user.

With the power supply of the information communication terminal 1 put in an on state, that is, with the power-supply-state notification light emitting unit 32 put in a state of emitting light having a predetermined color indicating that the power supply has been put in the on state, the WLAN is still in an off state indicated by the WLAN-state notification light emitting unit 31 also being in an off state as well. In order to change the state of the WLAN from the off state to an on state, the user needs to operate the WLAN on/off switch 30. Typically, the WLAN on/off switch 30 is a slide-type switch to be slid in order to put the WLAN in an on or off state. In this case, the user can slide the WLAN on/off switch 30 in a predetermined direction in order to change the state of the WLAN from the off state to an on state. When the user slides the WLAN on/off switch 30 in the predetermined direction in order to change the state of the WLAN from the off state to the on state, the information communication terminal 1 is put in a state of being capable of carrying out a radio communication through the WLAN. In this state, the WLAN-state notification light emitting unit 31 is emitting light.

When the WLAN on/off switch 30 is operated in order to start a radio communication as described above, the information communication terminal 1 gets into a communication mode, which can be a WLAN infrastructure mode or a WLAN ad-hoc mode. Either the WLAN infrastructure mode or the WLAN ad-hoc mode is selected as the communication mode in accordance with setting. As an alternative, the information communication terminal 1 gets into the WLAN infrastructure mode or the WLAN ad-hoc mode, which was selected last as the communication mode.

The communication-state notification light emitting unit 34 is emitting light having a color determined on the basis of whether the present communication mode of the information communication terminal 1 is the WLAN infrastructure mode or the WLAN ad-hoc mode. In addition, the communication-state notification light emitting unit 34 emits light after the WLAN-state notification light emitting unit 31 emits light without regard to the state of the connection of the information communication terminal 1 to the WLAN. As an alternative, the communication-state notification light emitting unit 34 emits light only after such a connection has been established. On top of that, the communication-state notification light emitting unit 34 may emit light with an intensity determined by the strength of an electric wave received by the information communication terminal 1.

With the power supply of the information communication terminal 1 put in an on state, that is, with the power-supply-state notification light emitting unit 32 put in a state of emitting light having a predetermined color indicating that the power supply has been put in the on state and with the WLAN infrastructure mode selected as the communication mode, whereas the communication-state notification light emitting unit 34 put in a state of emitting light having a predetermined color indicating that the WLAN infrastructure mode has been selected as the communication mode, the user may want to change the communication mode from the WLAN infrastructure mode to the WLAN ad-hoc mode. In this case, the user needs to operate the WLAN-mode switching button 22. For example, the user presses the WLAN-mode switching button 22 downward in order to change the communication mode from the WLAN infrastructure mode to the WLAN ad-hoc mode. As a result, the communication mode is changed from the WLAN infrastructure mode to the WLAN ad-hoc mode indicated by the communication-state notification light emitting unit 34 emitting light with its color changed from the color indicating that the WLAN infrastructure mode has been selected as the communication mode to a predetermined color indicating that the WLAN ad-hoc mode has been selected as the communication mode.

With the WLAN ad-hoc mode selected as the communication mode of the information communication terminal 1, that is, with the WLAN-state notification light emitting unit 31 emitting light and the communication-state notification light emitting unit 34 emitting light having a predetermined color indicating the WLAN ad-hoc mode has been selected as the communication mode of the information communication terminal 1, let us assume that the user wants to switch the communication mode from the WLAN ad-hoc mode to the WLAN infrastructure mode. In this case the user needs to operate the WLAN-mode switching button 22. When the user operates the WLAN-mode switching button 22, the communication mode of the information communication terminal 1 is switched from the WLAN ad-hoc mode to the WLAN infrastructure mode as evidenced by the communication-state notification light emitting unit 34 emitting light with its color changed from the color indicating that the WLAN ad-hoc mode has been selected as the communication mode to a predetermined color indicating that the WLAN infrastructure mode has been selected as the communication mode.

With the power supply of the information communication terminal 1 put in an on state, that is, with the power-supply-state notification light emitting unit 32 put in a state of emitting light having a predetermined color indicating that the power supply has been put in the on state, let us assume that the user wants to turn of the WLAN off. In this case, the user needs to operate the WLAN on/off switch 30. Typically, the WLAN on/off switch 30 is a slide-type switch to be slid in order to put the WLAN in an on or off state. In this case, the user can slide the WLAN on/off switch 30 in a predetermined direction in order to change the state of the WLAN from the on state to an off state. When the user slides the WLAN on/off switch 30 in the predetermined direction in order to change the state of the WLAN from the on state to the off state, the information communication terminal 1 is put in a state of being no longer capable of carrying out a radio communication through the WLAN. In this state, the WLAN-state notification light emitting unit 31 is not emitting light anymore.

If the communication-state notification light emitting unit 34 emits light after the WLAN-state notification light emitting unit 31 emits light without regard to the state of the connection of the information communication terminal 1 to the WLAN, the communication-state notification light emitting unit 34 stops emitting light after the WLAN-state notification light emitting unit 31 ceases to emit light. If the communication-state notification light emitting unit 34 emits light after the connection of the information communication terminal 1 to the WLAN has been established, on the other hand, the communication-state notification light emitting unit 34 stops emitting light after the connection is cut off even if the WLAN is still an on state. The communication-state notification light emitting unit 34 also stops emitting light as the WLAN-state notification light emitting unit 31 ceases to emit light when the WLAN is turned off with the connection of the information communication terminal 1 to the WLAN established.

The power supply can be in one of two different off states. One of the two off state is referred to as a first power-supply off state or a user off state. The power supply is put in the first power-supply off state when the user turns off the power supply and no operation input is entered by the user within three days after the user turns off the power supply. In the first power-supply off state, however, power is supplied to a processor to be described later so that, when the user turns on the power supply with the power supply put in the first power-supply off state, the information communication terminal 1 can be activated immediately.

The other off state is referred to as a second power-supply off state or a deep off state. The power supply is put in the second power-supply off state when the user turns off the power supply and no operation input is entered by the user even after the lapse of three consecutive days since the user turns off the power supply. In the second power-supply off state, no power is supplied to the processor to be described later so that, when the user turns on the power supply with the power supply put in the second power-supply off state, it takes time of a predetermined length such as 30 seconds to put the information communication terminal 1 in a state of being ready for activation.

The information communication terminal 1 can be electrically charged by putting the information communication terminal 1 in a USB-connected state by making use of the USB connector 51 or by supplying DC power to the information communication terminal 1 by way of the DC jack 53. In general, the DC jack 53 is connected to an AC/DC converter for converting the 100V AC power generated by the home power supply into a DC power supplied to the information communication terminal 1. While the information communication terminal 1 is being electrically charged, the power-supply-state notification light emitting unit 32 is emitting light having a predetermined color indicating that the information communication terminal 1 is being electrically charged.

The following description explains the continuous display panel 101, which is basically displayed on the display unit 21 all the time.

As shown in FIG. 9, the continuous display panel 101 appears typically in a predetermined area stretched along the bottom line of the display unit 21. Basically, the continuous display panel 101 appears all the time. The continuous display panel 101 shows various kinds of information such as ones described in FIG. 10 as information on the state of the information communication terminal 1.

For example, the continuous display panel 101 includes a battery residual charge amount display area 111, a WLAN wave-strength display area 112, a WLAN state display area 113, a communication utilization application state display area 114, a keyboard input mode display area 115 and a clock display area 116.

The battery residual charge amount display area 111 is an area for showing information on the amount of electrical charge left in a battery. Typical displays in the battery residual charge amount display area 111 are 0%, 25%, 50%, 75% and 100%. When the battery is being charged, an animation indicating a battery state of being electrically charged is displayed.

The WLAN wave-strength display area 112 is an area for showing information on the strength of the WLAN. To put it concretely, this display typically shows the strength of the WLAN at four stages, i.e., 0, 1, 2 and 3.

The WLAN state display area 113 is an area for showing information on the mode and connection state of the WLAN. To put it concretely, the WLAN state display area 113 typically displays a WLAN mode such as an off mode, the WLAN infrastructure mode and the WLAN ad-hoc mode as well as a WLAN connection state such as a connected state (or a state of being connected) or an offline state.

The communication utilization application state display area 114 is an area for showing information on the state of execution of an Application carrying out a communication in either the WLAN infrastructure mode or the WLAN ad-hoc mode. Specifically, for example, in the WLAN infrastructure mode, if an IP telephone application is executed in order to carrying out a communication, the state of execution of the IP telephone application is shown in the communication utilization application state display area 114. If an instant messenger application is executed in order to carry out a communication in the WLAN infrastructure mode, the communication utilization application state display area 114 shows the state of execution of the instant messenger application. If an application making use of ad-hoc connection is executed in the WLAN ad-hoc mode, on the other hand, the communication utilization application state display area 114 shows connection information of the WLAN ad-hoc mode. An example of the connection information of the WLAN ad-hoc mode is information on whether or not a one-to-one communication is going on.

The keyboard input mode display area 115 is an area for showing information on the input mode of a special key on the keyboard. The special keys include Alt, Num, Shift and Fn. In the case of Hold, a Hold mark is displayed in the keyboard input mode display area 115.

The clock display area 116 is an area for showing information generated by a clock.

Let us keep in mind that it is needless to say that the continuous display panel 101 may also display various kinds of information on the states of the information communication terminal 1 other than the pieces of information described above.

Figure 11:
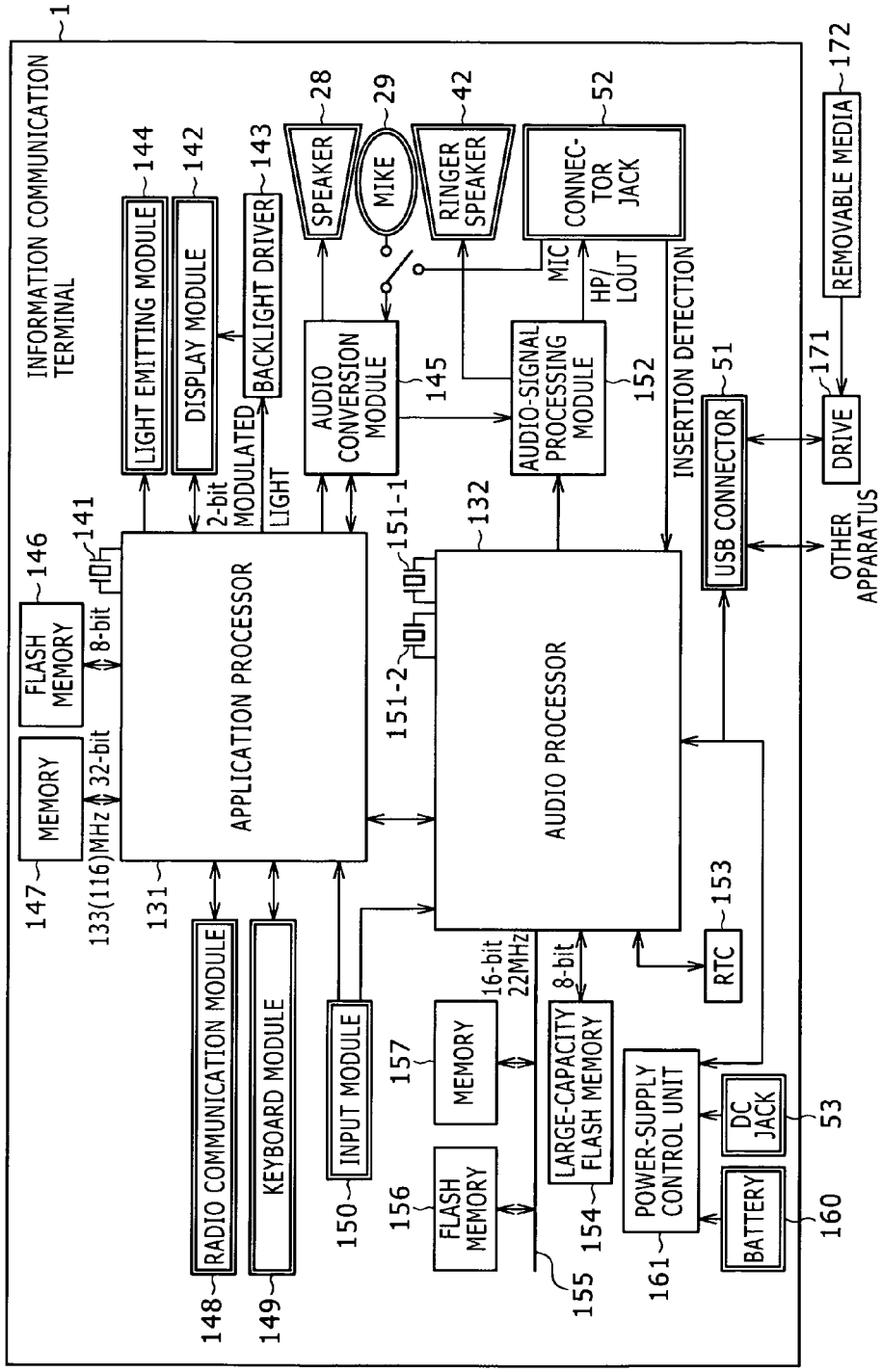
FIG. 11 is a block diagram showing the internal configuration of the information communication terminal.

FIG. 11 is a block diagram showing the internal configuration of the information communication terminal 1.

The information communication terminal 1 includes an application processor 131 and an audio processor 132. The application processor 131 is a processor used mainly for executing an application program. On the other hand, the audio processor 132 is a processor for executing functions such as management of audio data, coding and decoding of audio data and management of copyrights. The application processor 131 and the audio processor 132 are connected to each other typically by making use of one serial interface or one parallel interface or a plurality of serial or parallel interfaces so that the application processor 131 and the audio processor 132 are capable of exchanging control signals and data with each other.

The application processor 131 carries out various kinds of processing on the basis of a clock signal generated by a clock generation unit 141. Details of functions carried out by the application processor 131 will be described later by referring to FIG. 12.

The application processor 131 is connected to a display module 142, a backlight driver 143, a light emitting module 144, an audio conversion module 145, a flash memory 146, a memory 147, a radio communication module 148, a keyboard module 149 and an input module 150. The input module 150 is also connected to the audio processor 132.

The display module 142 is configured to include the display unit 21. If an LCD unit is employed as the display unit 21, the display module 142 is configured to also include an LCD driver, an LCD backlight and, if necessary, components such as a light guide tube required in an operation to display information on the display unit 21. The display module 142 displays various kinds of information on the display unit 21 in accordance with control executed by the application processor 131.

The backlight driver 143 is a driver for the backlight of the display unit 21.

The light emitting module 144 includes the WLAN-state notification light emitting unit 31, the power-supply-state notification light emitting unit 32, the communication-state notification light emitting unit 34 and drivers for driving light emitting devices employed in the WLAN-state notification light emitting unit 31, the power-supply-state notification light emitting unit 32 and the communication-state notification light emitting unit 34. The light emitting module 144 puts the WLAN-state notification light emitting unit 31, the power-supply-state notification light emitting unit 32 and the communication-state notification light emitting unit 34 in an on, blinking or off state in accordance with control executed by the application processor 131. In the on and blinking states, the WLAN-state notification light emitting unit 31, the power-supply-state notification light emitting unit 32 and the communication-state notification light emitting unit 34 each emit light having a predetermined color.

The audio conversion module 145 includes embedded components such as a PLL circuit, an A/D converter, a D/A converter and a DSP core. The DSP core is capable of carrying out filter processing and equalizer processing. The filter processing includes processing of a high-pass filter and a notch filter. To be more specific, in accordance with control executed by the application processor 131, the audio conversion module 145 carries out an A/D conversion process on a sound input by the mike 29 or a mike connected to the connector jack 52, and carries out predetermined processing such as filtering on the result of the process. Then, the audio conversion module 145 supplies the result of the predetermined processing to the application processor 131. On the other hand, the audio conversion module 145 carries out a D/A conversion process on audio data received from the application processor 131 and outputs the result of the D/A conversion process to the speaker 28 as a reproduced sound, or outputs audio data obtained as a result of the D/A conversion process to typically a headphone connected to the connector jack 52 as a reproduced sound by way of the connector jack 52.

The flash memory 146 is a memory having a typical storage capacity of about 64 MB. The flash memory 146 is used for storing programs to be executed by the application processor 131 and information that remains stored in the flash memory 146 even after the power supply is put in an off state. The information stored in the flash memory 146 includes data and a variety of register variables. The data and the register variables are information required in the execution of the programs.

The memory 147 is typically an SDRAM (Synchronous Dynamic Random Access Memory) having a typical storage capacity of about 64 MB. The memory 147 is used for storing information required in processing carried out by the application processor 131.

The radio communication module 148 is a unit for implementing a WLAN function conforming to the 802.11b standard. In accordance with control executed by the application processor 131, the radio communication module 148 carries out a radio communication in order to exchange information with another apparatus directly or through an access point and a network.

The keyboard module 149 is configured to include the keyboard 71 for receiving an operation input entered by the user and supplying a signal representing the operation to the application processor 131.

The input module 150 is configured to include the WLAN-mode switching button 22, the home button 23, the back button 24, the option button 25, the 4-direction keys 26, the enter button 27, the WLAN on/off switch 30, the power-supply switch 33, the music key 35, the hold switch 43 and the volume button 44. The input module 150 is a module for receiving an operation input entered by the user and supplying a signal representing the operation to the application processor 131 or the audio processor 132.

The audio processor 132 carries out various kinds of processing on the basis of a clock signal generated by a clock generation unit 151-1 or a clock generation unit 151-2. Since the audio processor 132 is a processor for handing mainly audio data, it is proper for the audio processor 132 to use two different clock signals. One of the clock signals is a basic clock signal used for processes such as processing to code and decode audio data. The other clock signal is a basic clock signal used for other signal processing. Functions carried out by the audio processor 132 will be described in detail by referring to FIG. 13.

The audio processor 132 is connected to the input module 150 described above, an audio-signal processing module 152, the USB connector 51, a real-time clock (RTC) 153, a large-capacity flash memory 154 and a memory bus 155. The memory bus 155 is connected to a flash memory 156 and a memory 157. The audio processor 132 also receives a signal indicating whether a device such as a headphone has been inserted into the connector jack 52 or pull out from the connector jack 52.

The audio-signal processing module 152 includes embedded components such as a D/A converter, a digital filter and an audio output amplifier for the headphone or the speaker. The audio-signal processing module 152 carries out a D/A conversion process on audio data received from the audio processor 132 or the audio conversion module 145, carries out a filtering process on the result of the D/A conversion process if necessary, amplifies the result of the filtering process and supplies the output of the amplifier to the ringer speaker 42 or the connector jack 52 as a reproduced signal. In addition, the audio-signal processing module 152 also receives a command from the audio processor 132 as a command to output not only an audio signal, but also the so-called beep sound or a calling sound of typically an arriving IP telephone call. The audio-signal processing module 152 outputs the beep sound or the calling sound of an arriving IP telephone call to the ringer speaker 42 or the connector jack 52.

The real-time clock (RTC) 153 is a clock for finding the present time by counting the number of pulses output by a pulse generator and supplying the present time to the audio-signal processing module 152.

The large-capacity flash memory 154 is a flash memory having a typical large storage capacity in the range 1 to several GB. The large-capacity flash memory 154 is used for storing information received from the audio processor 132. It is to be noted that the large-capacity flash memory 154 is also used for storing information generated by or acquired from a process carried out by the application processor 131 and supplied by the application processor 131 to the large-capacity flash memory 154 by way of the audio processor 132.

In addition, the large-capacity flash memory 154 is also used for storing information on other registered users. The information on another registered user is used in a process to exchange information with the other user by making use of an exchange tool such as an instant messenger, an IP phone, chatting or an email. The information exchanged with the other user typically includes a content such as musical data reproducible in a process carried out by the audio processor 132 and data generated as a result of executing a variety of application programs. On top of that, the large-capacity flash memory 154 is also used for storing information on registration of the user itself, who owns the information communication terminal 1, or information on registration of the information communication terminal 1. This registration information is transmitted to the apparatus owned by the other user serving as a partner of the information exchange process. The information on registration of the user itself, who owns the information communication terminal 1, or the information on registration of the information communication terminal 1 is stored in the large-capacity flash memory 154 in such a way that the user is capable of properly modifying the stored information.

The flash memory 156 is typically a memory having a typical storage capacity of about 64 MB. The flash memory 156 is used for storing a program to be executed by the audio processor 132 and information that remains stored in the flash memory 156 even after the power supply is put in an off state. The information stored in the flash memory 156 includes data and a variety of register variables. The data and the register variables are information required in the execution of the program.

The memory 157 is typically an SDRAM (Synchronous Dynamic Random Access Memory) having a typical storage capacity of about 64 MB. The memory 157 is used for storing information required in processing carried out by the audio processor 132.

The USB connector 51 is connected to an external apparatus by making use of a USB cable. An example of the external apparatus is the personal computer 13 explained before by referring to FIG. 1. If necessary, the USB connector 51 is also connected to a drive 171 on which a removable medium 172 is mounted. Examples of the removable medium 172 are a magnetic disk, an optical disk, a magneto-optical disk and a semiconductor memory. If necessary, a computer program read out from the removable medium 172 is installed in the flash memory 146 or the flash memory 156 in an executable state.

A signal received from an external apparatus such as the personal computer 13 through the USB connector 51 is supplied to the audio processor 132 and, if necessary, supplied to the application processor 131. On the other hand, the audio processor 132 outputs a predetermined signal to the external apparatus such as the personal computer 13 by way of the USB connector 51.

DC power supplied through the USB connection, DC power supplied through the DC jack 53 or DC power supplied from a battery 160 mounted on the information communication terminal 1 is distributed to components composing the information communication terminal 1 by a power-supply control unit 161.

Figure 12:
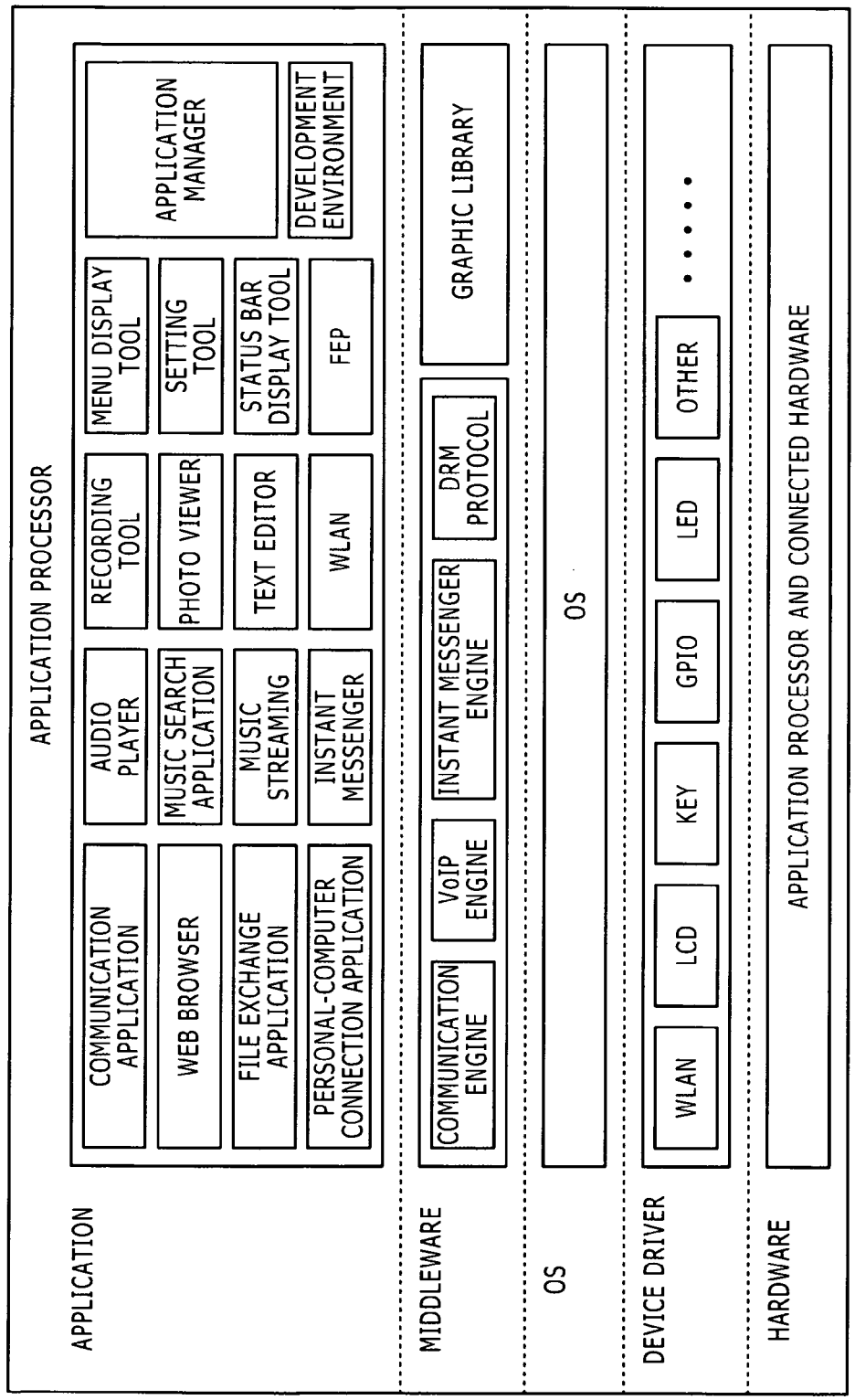
FIG. 12 is a software-stack diagram showing the configuration of software executed by an application processor.

FIG. 12 is a software-stack diagram showing the configuration of software executed by the application processor 131.

As shown in FIG. 12, the configuration of the software to be executed by the application processor 131 includes the following layers: a hardware layer at the bottom of the configuration, a device-driver layer above the hardware layer, an OS layer above the device-driver layer, a middleware layer above the OS layer and an application layer on the top of the configuration.

The device-driver layer is dedicated software for driving the application processor 131 and hardware connected to the application processor 131. To put it concretely, the device-driver layer includes a WLAN device driver WLAN for driving the radio communication module 148, an LCD driver for driving LCDs employed in the display module 142 for displaying an image on the display unit 21, a KEY keyboard driver for driving the keyboard module 149, a GPIO device driver for driving general-purpose ports of the application processor 131 and an LED driver for driving light emitting diodes employed in the WLAN-state notification light emitting unit 31, the power-supply-state notification light emitting unit 32 and the communication-state notification light emitting unit 34, which are included in the light emitting module 144.

In addition, the device-driver layer also properly includes other required device drivers such as a device driver for driving the backlight driver 143, a variety of memory drivers, a device driver for driving the audio conversion module 145, a mouse driver for driving a mouse if a mouse is employed in the information communication terminal 1 as an input device, a hard-disk driver for driving an embedded hard disk used for storing information if the hard disk is embedded in the information communication terminal 1 and a printer driver for driving an external printer connected to the information communication terminal 1 as an output device to which the information communication terminal 1 outputs information to be printed.

The OS layer is an OS (operating system) for controlling basic operations of the application processor 131. The OS is a basic program for managing a variety of resources driven by the device drivers. The OS manages the entire system by providing basic functions common to a number of application programs on the middleware and application layers to be described later as functions available to middleware and the application programs. For example, when any of the application programs executes an instruction, a device driver associated with the instruction is activated to carry out an operation requested by the instruction. Examples of the operation carried out by the device driver are an operation to input or output data from or to the flash memory 146, the memory 147 or the audio processor 132 and an operation to execute management of input/output functions such as a function to input data from the keyboard and a function to output an image to a screen. The OS can be Windows (a registered trademark) 95 (a trademark), Windows (a registered trademark) 98 (a trademark), Windows (a registered trademark) NT (a trademark), LINUX or OS/2 (a trademark). In addition, the OS also manages some software resources included typically in a context of execution of an application program on the application layer to be described later. The context of execution of an application program includes a set of registers, a main-memory image and a file handler.

Executed on the OS, the middleware on the middleware layer provides application programs with functions more sophisticated and more practical than the functions offered by the OS.

The middleware thus has an intermediate characteristic between the OS and application programs. If a function common to a number of application programs is developed individually for each of the application programs, the software development will become inefficient. In order to solve this problem, such a common function to be used by the application programs is developed as a function of the middleware. Thus, the middleware is a collection of such common functions, which are each generally a basic function in many cases.

To put it concretely, the middleware includes software elements such as a communication engine, a VoIP (Voice over IP) engine, an instant-messenger engine, a DRM (Digital Rights Management) protocol and a graphic library. The communication engine is software for providing basic functions of communication applications such as the IP phone. The VoIP engine is software for providing basic functions of a technology for exchanging audio data by making use of a TCP/IP network such as the Internet or an intranet. The instant-messenger engine is software for providing basic functions of an instant messenger. The DRM protocol is software for realizing a function for implementing processes such as a process to encrypt digital data in order to protect the copyright of the digital data. The graphic library is a collection of GUI components to be displayed on the display unit 21 to accompany execution of a variety of application programs.

To be more specific, the graphic library is a collection of general-purpose functions and general-purpose data, which are to be used in image processing carried out by a variety of application programs executed on the application layer. To put it more concretely, the graphic library is used for collecting some general-purpose functions to be used in the image processing in the same way as a book room is used for collecting books. That is to say, functions necessary for execution of application programs are made sharable by the programs as an independent file referred to as a graphic library. In general, the graphic library is loaded at an execution time separately from an application program and distinguished from subroutines of an application program.

On the application layer at the top of the software configuration, a variety of application programs are executed. In case of the information communication terminal 1, the application programs include application software, utilities, an application manager and a development environment. The application software includes individual applications such as a communication application, a web browser, a file exchange application, a personal-computer connection application, an audio player, a music search application, a music streaming application, an instant messenger, a recording tool, a photo viewer and a text editor. The utilities include a WLAN interface, a menu display tool, a setting tool, a status-bar display tool and an FEP (Front End Processor). The application manager is a program for managing the application software.

The communication application is an application program making use of the communication engine and the VoIP engine to allow the user to communicate with (a user utilizing) another apparatus through the so-called IP telephone function or a voice chatting function.

The web browser is an application used for viewing a web page through a network. To put it concretely, the web browser implements functions to download a file such as an HTML file, an image file or a musical file from a web server through the network and analyze the layout of the page in order to display/reproduce the file. The web browser also implements a function of allowing the user to transmit data to the web server by making use of a displayed form. In addition, the web browser also implements a function to execute application software written in a language such as Java (a trademark) Script, Flash or Java (a trademark).

The file exchange application is an application program having a file transfer function to exchange a data file with another apparatus connected to the information communication terminal 1 through a network or directly. The personal-computer connection application is an application program having a function to connect the information communication terminal 1 to the personal computer 13 in order to allow the information communication terminal 1 to exchange information with the personal computer 13.

The audio player is an application program having a function to reproduce musical data. The music search application is an application program having a function to store audio data in an internal database and allow the user to search the database for desired musical data. The music streaming application is an application program having a function to transmit multimedia data such as video and audio data to another apparatus through a network and reproduce multimedia data in a streaming reproduction process while receiving the data from another apparatus through the network.

The instant-messenger application is an application program having a function to produce a result of determination as to whether or not a peer connected to the network such as the Internet or a LAN as a peer making use of the same software is in an online state. The instant-messenger application also has a function to allow chatting with the peer or a transfer of a file to/from the peer if the result of the determination indicates that the peer is in an online state.

The recording tool is an application program having a function to record audio data input by the mike 29 in a way similar to the so-called voice memo and reproduce the recorded audio data. The photo viewer is an application program having a function to manage image data (or photo data) recorded internally in the information communication terminal 1 and control a process to reproduce and display the recorded image data by making use of a variety of display methods such as a method to display image data as a list of thumbnail images and a slideshow display method. The text editor is an application program having a function to create text data on the basis of operation inputs entered by the user via an input device such as the keyboard 71.

Individual application programs other than those mentioned and described above include table-calculation software, database creation software, an email application and a variety of game applications. These other application programs can also be properly installed in the information communication terminal 1 as well.

The WLAN interface is a utility for implementing a WLAN function conforming typically to the 802.11b standard. The menu display tool is a utility for controlling a display appearing on the display unit 21 as a display showing information such as a menu or a standby image. The setting tool is a utility for setting a variety of functions of the information communication terminal 1 on the basis of operation inputs entered by the user. The status-bar display tool is a utility for displaying various kinds of information on the continuous display panel 101 explained earlier by referring to FIGS. 9 and 10. The FEP is a utility serving as kanji conversion software used for handing inputs entered in the Japanese language.

Figure 13:
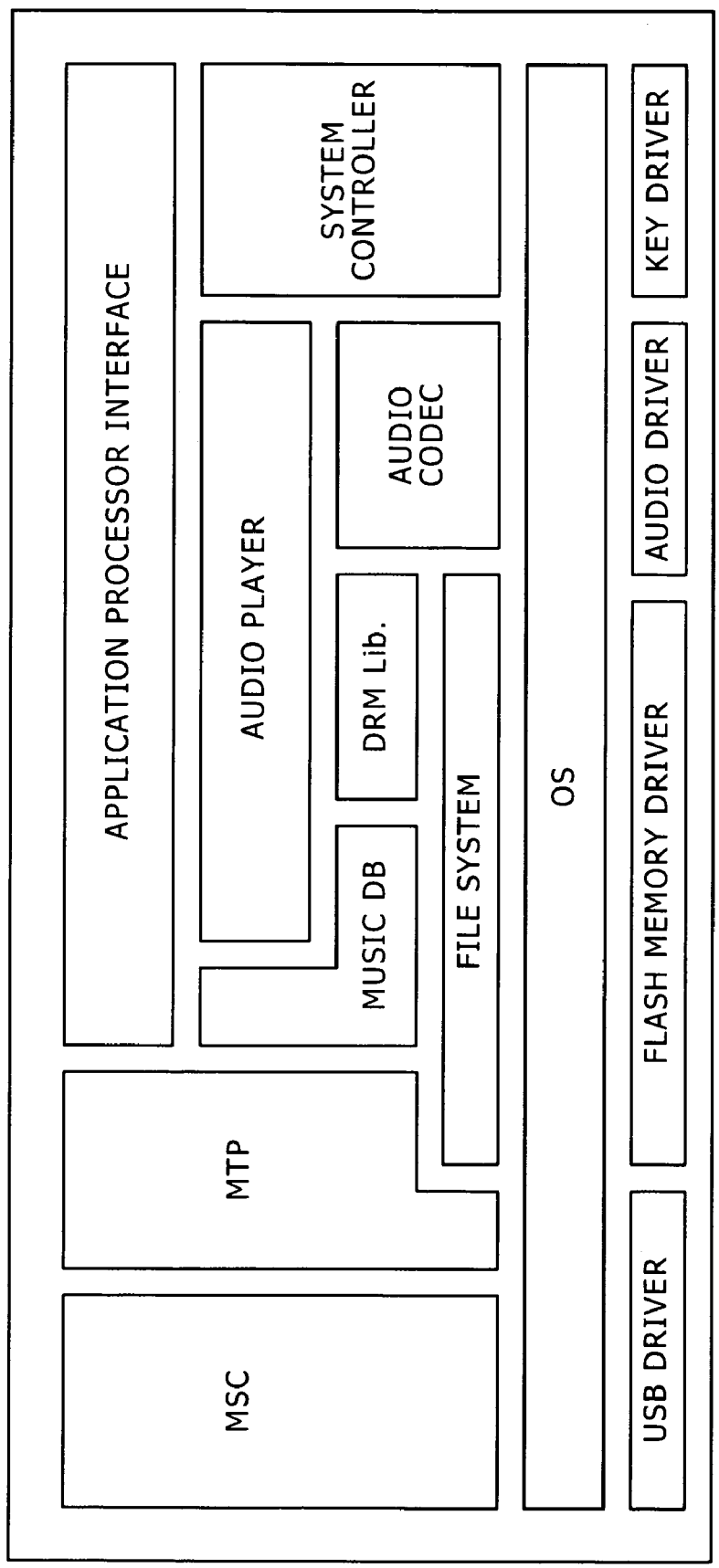
FIG. 13 is a software-stack diagram showing the configuration of software executed by an audio processor.

FIG. 13 is a software-stack diagram showing the configuration of software executed by the audio processor 132.

The device-driver layer at the bottom of the configuration is dedicated software for driving the audio processor 132 and hardware connected to the audio processor 132. To put it concretely, the device-driver layer includes a USB driver, a flash-memory driver, an audio driver and a key driver. The USB driver is a device driver for implementing USB-connection and USB-streaming functions. The flash-memory driver is a device driver for driving the large-capacity flash memory 154 connected to the audio processor 132. The audio driver is a device driver for driving the audio-signal processing module 152. The key driver is a device driver for driving an input device employed in the input module 150. An example of the input device is a music key 35 for inputting an operation input concerning a process to be carried out by the audio processor 132.

The device-driver layer may also properly include other required device drivers such as a memory driver for driving a memory other than the large-capacity flash memory 154 and a GPIO device driver for driving a general-purpose port of the application processor 131.

The OS is a basic program for controlling basic operations carried out by the audio processor 132. As the OS of the audio processor 132, it is desirable to employ a real-time OS designed for an embedded system. An example of the real-time OS designed for an embedded system is uITRON.

A variety of application programs are executed on the OS.

In implementing USB connection, the information communication terminal 1 is capable of switching a USB mode from an MSC (Mass Storage Class) mode, which is one of two USB modes, to an MTP (Media Transfer Protocol) mode serving as the other USB mode and vice versa.

The MSC (Mass Storage Class) mode is a USB mode providing the host apparatus with a function to recognize and control a connected USB apparatus as a storage apparatus. In this case, the USB apparatus is the information communication terminal 1 connected to the personal computer 13. That is to say, having a MSC (mass storage class) interface, the information communication terminal 1 is recognized as a driver by an OS running on the personal computer 13. Thus, an application executed in the personal computer 13 is capable of reading out data stored internally in the information communication terminal 1. The data stored internally in the information communication terminal 1 includes image data and musical data. The application executed in the personal computer 13 to read out data stored internally in the information communication terminal 1 is not limited to a special application, but may also be an explorer or the like.

The MTP (Media Transfer Protocol) mode is a USB mode providing a protocol for connecting the information communication terminal 1 and the personal computer 13 to each other and exchanging musical data, moving-picture data and still-picture data between the information communication terminal 1 and the personal computer 13. MTP software for the MTP mode is executed on a layer of communication with any storage device including the USB MSC (mass storage class) storage apparatus, allowing a content having a copyright protection flag to be transferred with a high degree of safety.

A file system is software for managing files stored in a memory (such as the large-capacity flash memory 154) connected to the audio processor 132. Some of the files managed by the file system are stored in a database. To be more specific, musical-data files managed by the file system are stored in a musical DB (database). The copyrights of the musical-data files are protected in a DRM (Data Rights Management) library.

The DRM library is a collection of general-purpose functions and general-purpose data, which are used by a variety of application programs to encrypt digital data such as musical data, moving-picture data and still-picture data in order to implement a function of avoiding illegal data copies and illegal transfers of data to other apparatus.

Musical data stored in a memory (such as the large-capacity flash memory 154) connected to the audio processor 132 is data compressed by an audio coding/decoding unit in a compression format such as an MP3 (MPEG Audio layer-3) format, an ATRAC3 (Adaptive TRansform Acoustic Coding-3) format, a WMA (Windows (a trademark) Media Audio) format or an ASF (Advanced Streaming Format). Thus, the audio coding/decoding unit is also capable of decompressing the compressed musical data by adoption of a decompression method for the compression format.

An audio player is software for controlling a process to decompress compressed audio data in the audio coding/decoding unit by adoption of a predetermined decompression method and output the audio data as reproduced data. The compressed audio data to be decompressed is supplied to the audio processor 132 by way of an application processor interface. The compressed audio data is audio data subjected to copyright protection based on the DRM library and managed by making use of the musical DB in accordance with control signals output by various kinds of software executed by the application processor 131.

A system controller is software for controlling a variety of functions implemented by the audio processor 132.

An application processor interface is software for providing a function to control exchanges of various kinds of information and control signals between the application processor 131 and the audio processor 132.

By referring to display screens appearing on the display unit 21, the following description explains typical and concrete executions of a variety of application programs in the information communication terminal 1.

A variety of application programs executed by the information communication terminal 1 can be classified into a category not making use of processing of communications with another apparatus and a category making use of processing of communications with another apparatus through a network. The category not making use of processing of communications with another apparatus includes the audio player, the recording tool (or the so-called voice memo tool), the photo viewer and the text editor. As described earlier, the audio player is an application program for reproducing audio data. On the other hand, the category making use of processing of communications with another apparatus includes the file exchange application, the music streaming application, the communication application, the instant messenger and the web browser. As described before, the file exchange application is an application program having a file transfer function to exchange a data file with another apparatus connected to the information communication terminal 1 through a network or directly. Also as explained earlier, the music streaming application is an application program having a function to transmit multimedia data such as video and audio data to another apparatus through a network and reproduce multimedia data while receiving the data from another apparatus through the network in a streaming reproduction process. Also as described earlier, the communication application is an application program making use of the communication engine and the VoIP engine in order to allow the user to communicate with (a user utilizing) another apparatus through the so-called IP telephone function or a voice chatting function through a network. Also as explained before, the instant-messenger application is an application program having a function to allow chatting or a transfer of a file through a network. Also as explained earlier, the web browser is an application program used for viewing a web page through a network.

There are also application programs each having a plurality of functions. There are also application programs each having a plurality of functions making use of and not making use of processing of communications with another apparatus through a network. The functions not making use of processing of communications with another apparatus include a function to record audio data (such as mainly musical data), a still picture and a moving picture and a function to organize stored data into a database. On the other hand, the functions making use of processing of communications with another apparatus through a network include a function to exchange data with another apparatus and a function to reproduce data while receiving the data from another apparatus in a streaming reproduction process.

Figure 14:
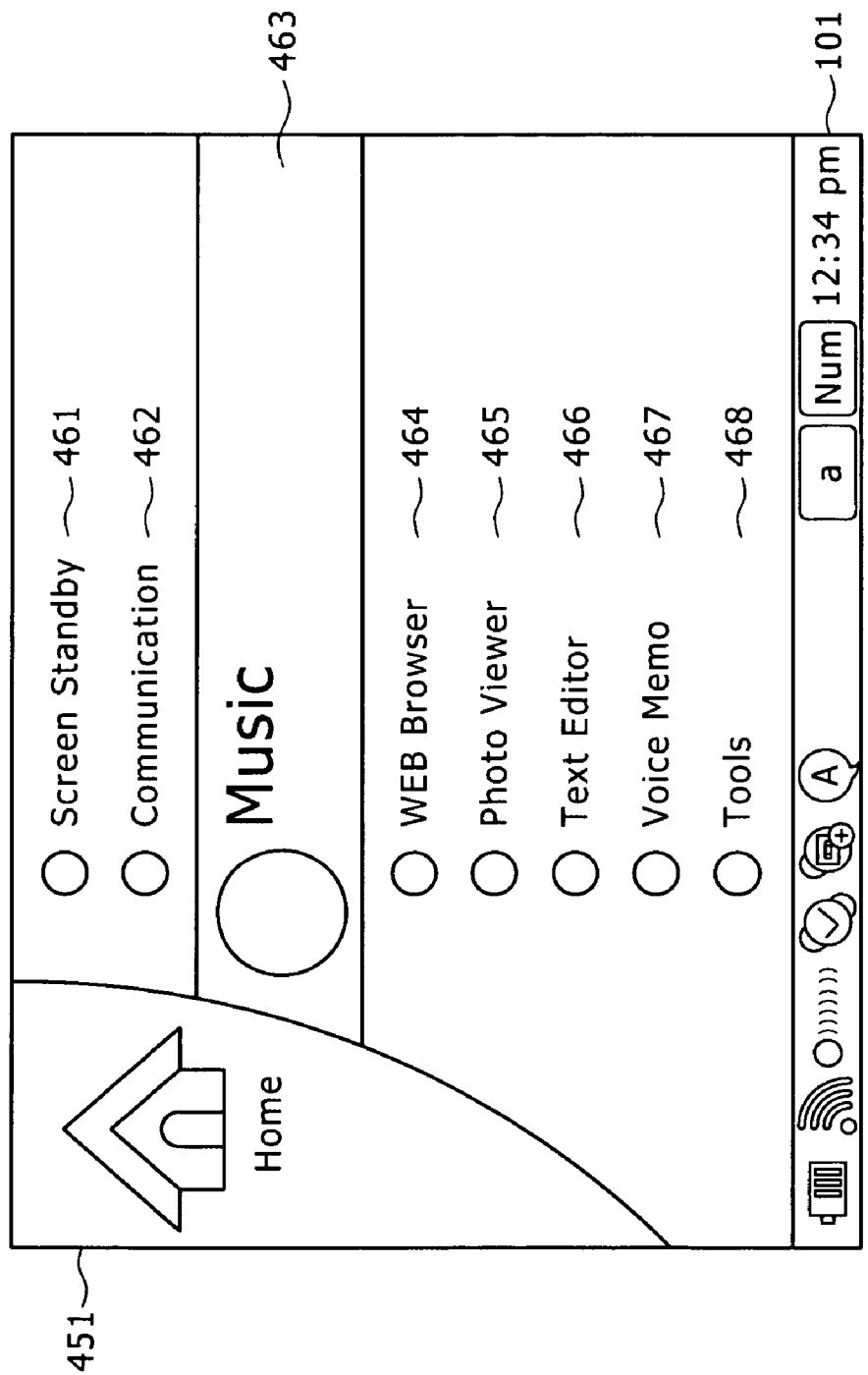
FIG. 14 is a diagram showing a typical display of a home screen.

FIG. 14 is a diagram showing a typical display of a home screen 451, which immediately appears on the display unit 21 employed in the information communication terminal 1 typically when the power supply is turned on or when the home button 23 is pressed. The home screen 451 shows a menu as a list of application programs that can be executed in the information communication terminal 1. As an alternative, the displayed menu can also be a list of items each including a plurality of such application programs. In the case of the home screen 451 shown in FIG. 14, the displayed menu shows a standby screen 461, a communication application 462, a music tool 463, a web browser 464, a photo viewer 465, a text editor 466, a voice memo tool 467 and a variety of tools 468 in a state of being selectable. If application programs executable in the information communication terminal 1 cannot all be displayed on one page of the home screen 451, the user may operate an up or down key of the 4-direction keys 26 in order to scroll the displayed list of the menu in the upward or downward direction respectively. In this way, the user is capable of viewing all the application programs included on the list. The user is allowed to select an application program from the displayed menu of the home screen 451 appearing on the display unit 21 and activate the selected program.

It is to be noted that, in accordance with a typical method adopted by the user to select and determine an application program from the menu, for example, the user operates the down or up key of the 4-direction keys 26 to change the selected item in the menu. The selected item in the menu is an item pointed to by a cursor. The menu is scrolled in the upward direction when the user presses the up key of the 4-direction keys 26 with the menu top item pointed by the cursor and scrolled in the downward direction when the user presses the down key of the 4-direction keys 26 with the menu bottom item pointed by the cursor. Then, after placing the cursor at a position to point to a desired item in the menu by operating the down or up key, the user presses the enter button 27 in order to confirm the selection of the desired menu item pointed to by the cursor as a selected application program. When the user confirms the selection of the desired menu item pointed to by the cursor as the selected application program by pressing the enter button 27, the program is activated. In accordance with another typical method adopted by the user to select an application program and confirm the selection of the application program from the menu, for example, with the third item in the menu assumed to be an always selected menu item, the user operates the down or up key of the 4-direction keys 26 in order to scroll the entire menu in the downward or upward direction respectively. In this way, different programs occupy the position of the third item serving as the always selected menu item. The user continues scrolling the menu till the desired application program occupies the position of the third item serving as the always selected menu item. As the desired application program occupies the position of the third item serving as the always selected menu item, the user presses the enter button 27 in order to confirm the selection of the third menu item as a selected application program. When the user confirms the selection of the third menu item as the selected application program by pressing the enter button 27, the program is activated.

First of all, by referring to FIGS. 14 to 18, the following description explains typical processing when the voice memo tool 467 is selected from the menu shown on the home screen 451 and the recording and reproduction tool (or the so-called voice memo) represented by the voice memo tool 467 is executed. As described above, the home screen 451 of FIG. 14 shows a menu as a list of application programs that can be executed in the information communication terminal 1 or, as an alternative, the displayed menu can also be a list of items each including a plurality of such application programs.

Figure 15:
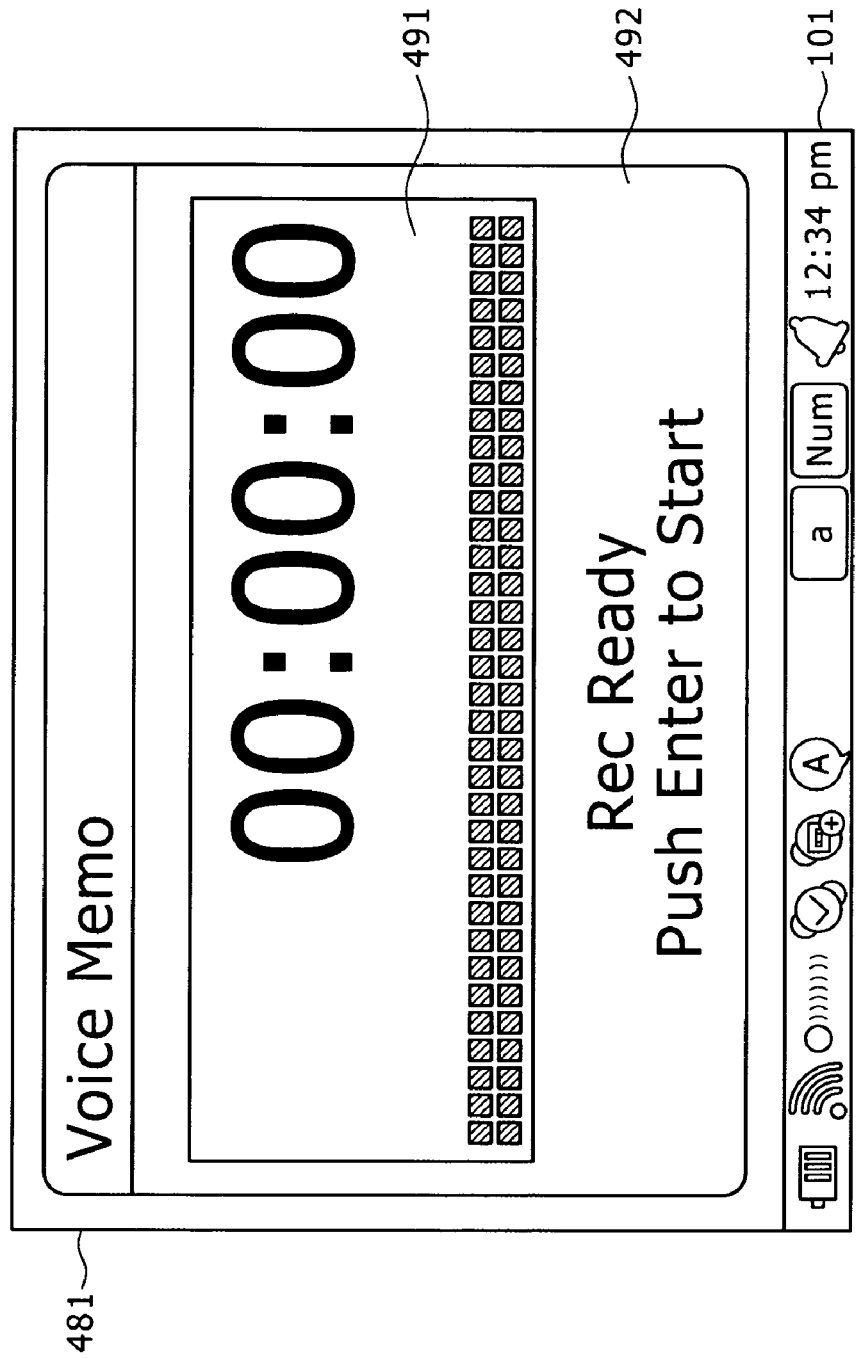
FIG. 15 is a diagram showing a typical display of the screen in a recording wait state.

FIG. 15 is a diagram showing a typical display of a screen 481 appearing initially in a recording wait state when the recording and reproduction tool is activated.

The display screen 481 of the recording and reproduction tool includes a recording-duration display area 491 for showing a recording length and a message display area 492 for showing a message to the user. The recording-duration display area 491 not only shows a recording or a reproduction length but may also show other information such as the volume of recorded or reproduced audio data and the present reproduction position (or the reproduction-stop position) of recorded audio data in a reproduction process.

As shown in FIG. 15, in the recording wait state, the recording length shown in the recording-duration display area 491 is 0 and the message display area 492 shows a message saying: "Rec Ready. Push Enter to Start."

When the user presses the enter button 27, that is, when a signal representing an operation input entered by the user is received from the input module 150, the application processor 131 drives the mike 29 or a mike connected to the connector jack 52 to input voices, receives audio data completing an A/D conversion process in the audio conversion module 145 and supplies the data to the audio processor 132. The audio processor 132 encodes the data and stores the encoded data in the large-capacity flash memory 154.

Figure 16:
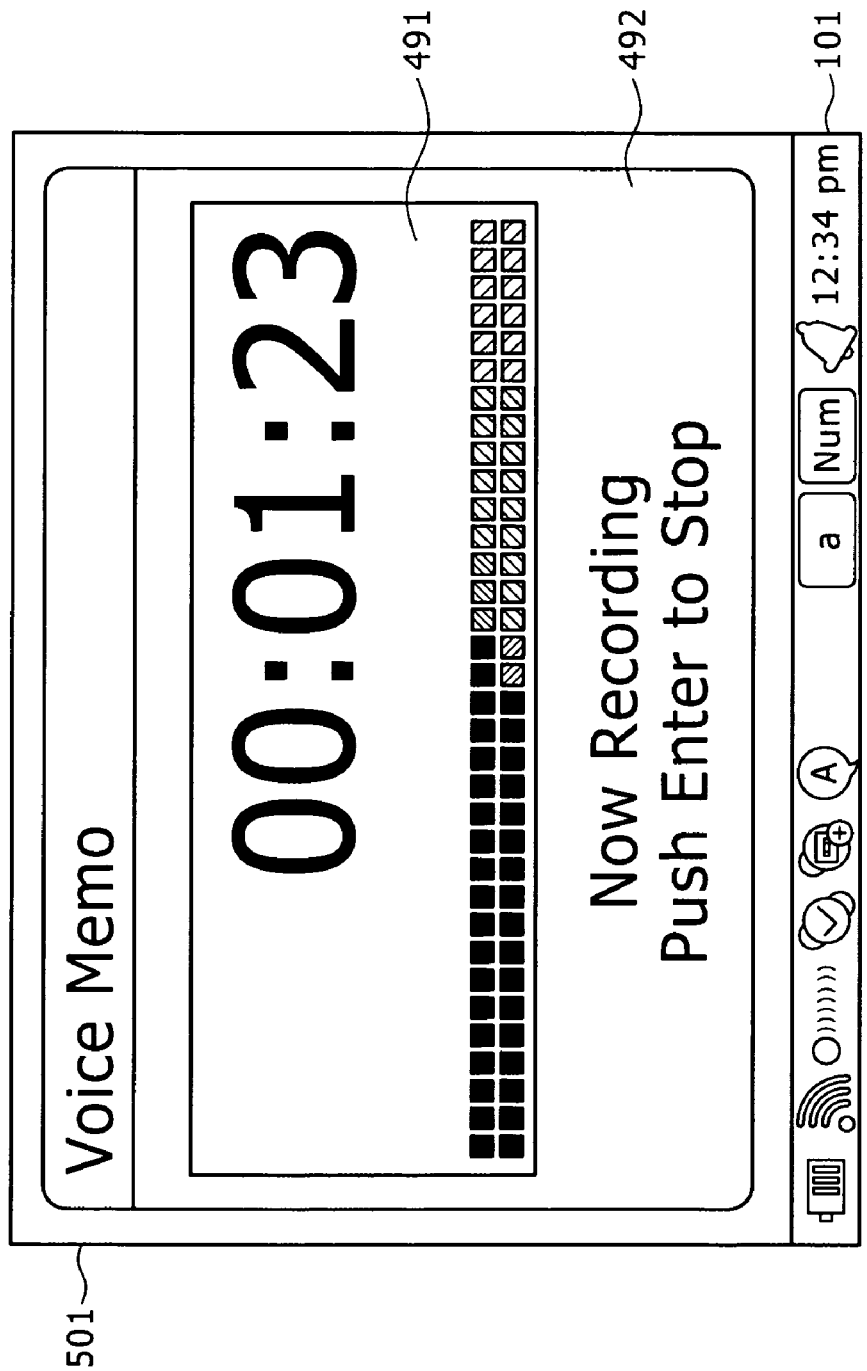
FIG. 16 is a diagram showing a typical display of the screen in a recording state.

FIG. 16 is a diagram showing a typical display of a screen 501 in a recording state.

As shown in FIG. 16, in a recording state, the recording-duration display area 491 shows an increasing recording length whereas the message display area 492 shows a message saying: "Now Recording. Push Enter to Stop."

When the user presses the enter button 27, that is, when a signal representing an operation input entered by the user is received from the input module 150, the application processor 131 stops the process to input voices by making use of the mike 29 or the mike connected to the connector jack 52.

Figure 17:
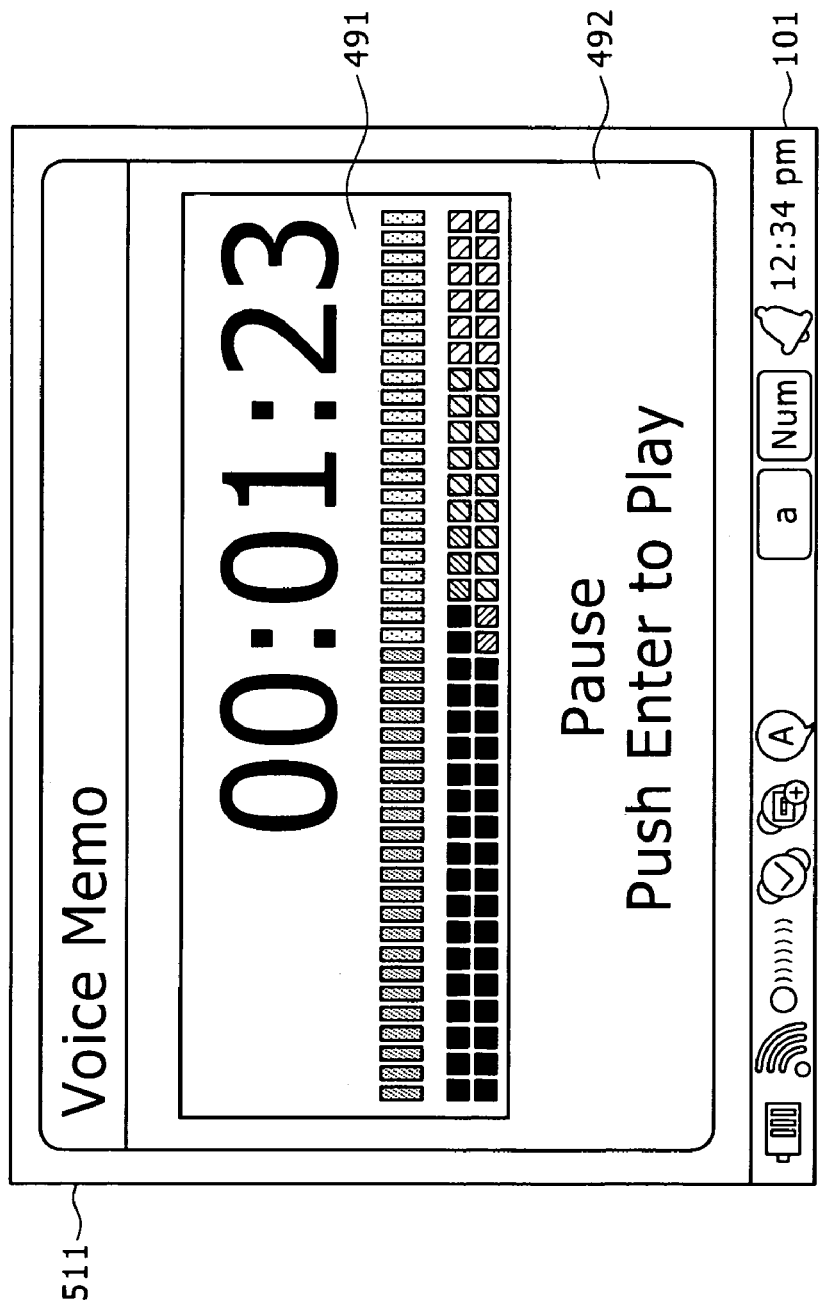
FIG. 17 is a diagram showing a typical display of the screen in a stopped-recording state, that is, a state of waiting for reproduction of recorded audio data (or, a temporarily stopped reproduction state)

FIG. 17 is a diagram showing a typical display of a screen 511 in a stopped-recording state, that is, a state of waiting for reproduction of recorded audio data (or, a reproduction pause state).

As shown in FIG. 17, in a reproduction pause state, the recording-duration display area 491 shows a fixed recording length and information on the progress of reproduction of the recorded sound data whereas the message display area 492 shows a message saying: "Pause. Push Enter to Play."

When the user presses the enter button 27, that is, when a signal representing an operation input entered by the user is received from the input module 150, the application processor 131 drives the audio processor 132 to read out recorded audio data from the large-capacity flash memory 154 and supply the data to the audio conversion module 145 after decoding the data. The audio conversion module 145 carries out a D/A conversion process on the audio data received from the audio processor 132 and outputs the data resulting from the D/A conversion process to the speaker 28 as reproduced data or outputs audio data obtained as a result of the D/A conversion process to typically a headphone connected to the connector jack 52 as a reproduced sound by way of the audio-signal processing module 152.

Figure 18:
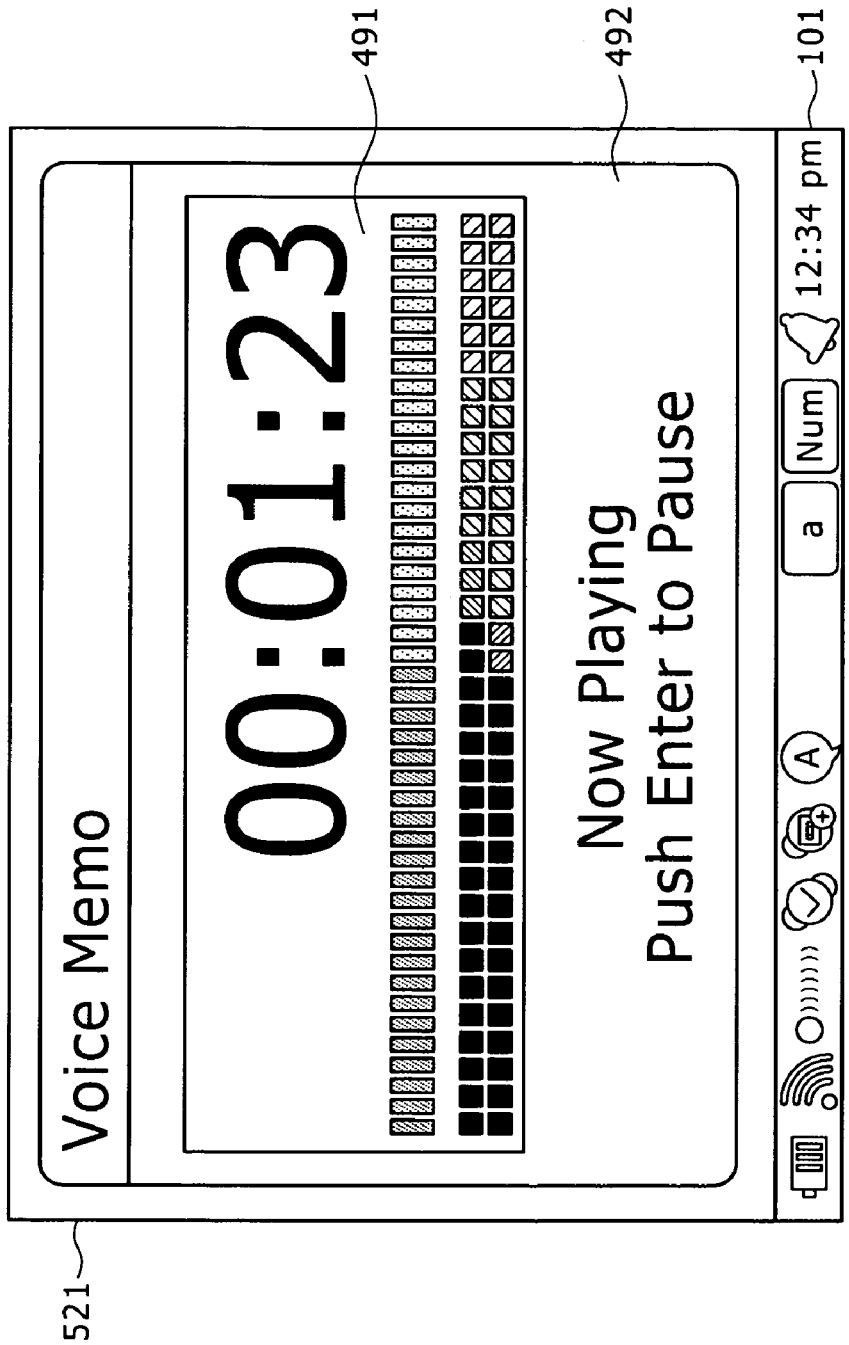
FIG. 18 is a diagram showing a typical display of the screen in a state of reproducing recorded audio data.

FIG. 18 is a diagram showing a typical display of a screen 521 in a state of reproducing recorded audio data.

As shown in FIG. 18, in a reproduction state, the recording-duration display area 491 shows a reproduction length and information on the progress of reproduction of the recorded sound data whereas the message display area 492 shows a message saying: "Now Playing. Push Enter to Pause," meaning that the information communication terminal 1 is in a reproduction state, which can be stopped by pressing the enter button 27. When the user presses the enter button 27 in the state shown in FIG. 18, the reproduction process is temporarily stopped to enter the reproduction pause state explained earlier by referring to FIG. 17.

The following description explains typical processing carried out by execution of the photo viewer 465 selected by confirmation from items included in a menu displayed on the home screen 451 explained earlier by referring to FIG. 14. As described before, the displayed menu is a list of application programs that can be executed in the information communication terminal 1 or, as an alternative, the displayed menu can also be a list of items each including a plurality of such application programs.

Figure 19:
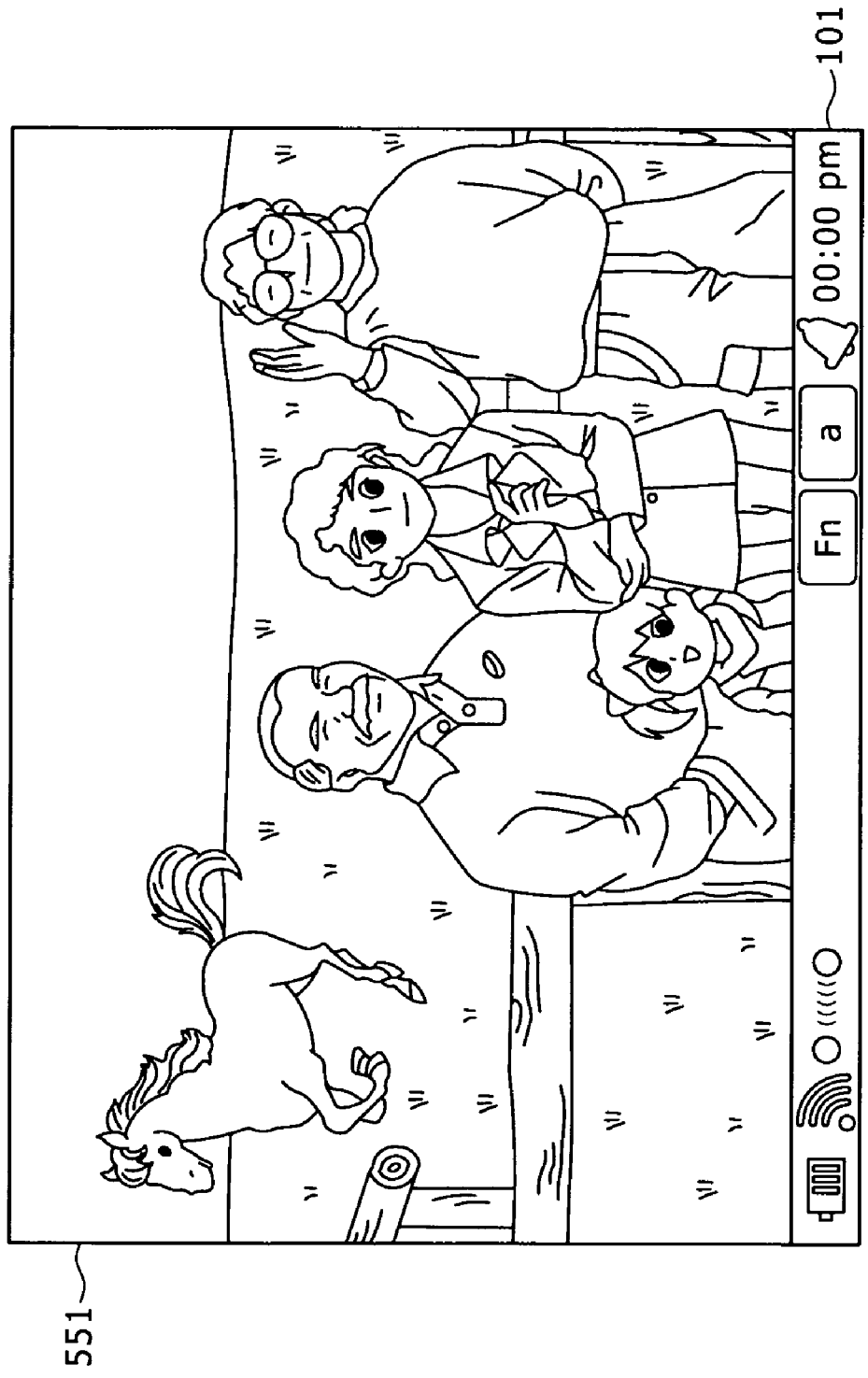
FIG. 19 is a diagram showing a typical display screen in execution of a photo viewer.

FIG. 19 is a diagram showing a typical display screen 551 in execution of the photo viewer 465. The photo viewer 465 is an application program for carrying out a process to read out the data of still pictures from the large-capacity flash memory 154 and display the data on the display unit 21 in accordance with an operation input entered by the user. Typically, the photo viewer 465 converts each of the still pictures into a thumbnail image and displays the data as a list of thumbnail images on the display unit 21. As an alternative, the photo viewer 465 displays the thumbnail images on the display unit 21 in units according to classification done by the user. As another alternative, the photo viewer 465 displays the thumbnail images on the display unit 21 in a slide-show format.

Figure 20:
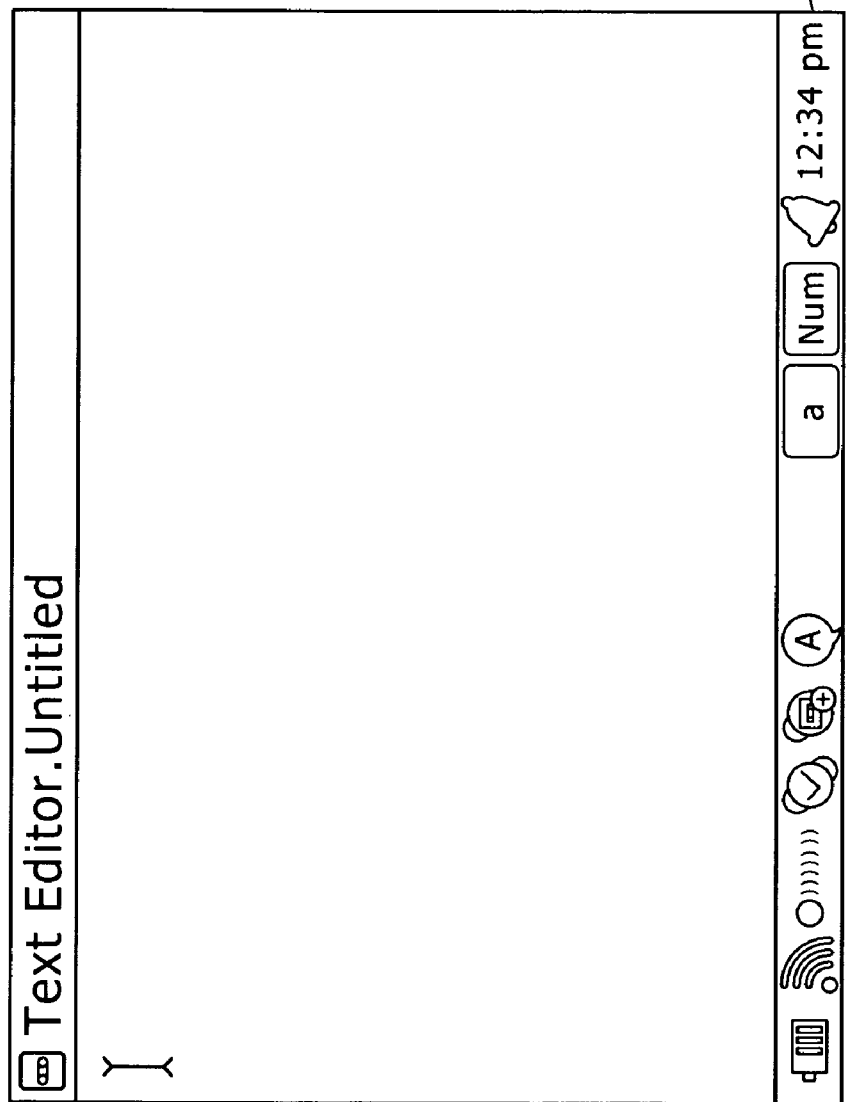
FIG. 20 is a diagram showing a typical screen for creation of a new text.
Figure 21:
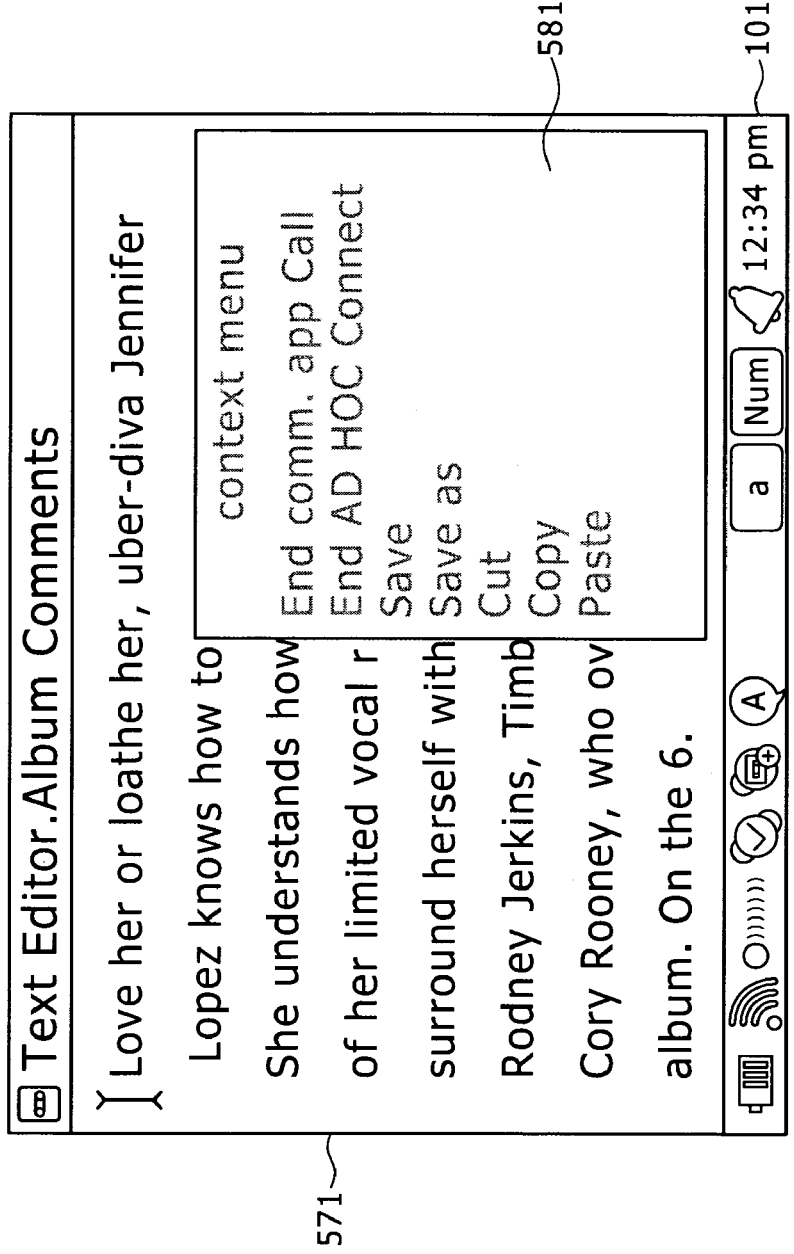
FIG. 21 is an explanatory diagram showing a context menu.

By referring to FIGS. 20 to 22, the following description explains typical processing carried out by execution of the text editor 466 selected by confirmation from items included in a menu displayed on the home screen 451 explained earlier by referring to FIG. 14. As described before, the displayed menu is a list of application programs that can be executed in the information communication terminal 1 or, as an alternative, the displayed menu can also be a list of items each including a plurality of such application programs.

FIG. 20 is a diagram showing a typical screen 571 for creation of a new text by making use of the text editor 466. On the top of the new-text creation screen 571, the name of a text file to be used for storing the new text is shown. If the user has not yet entered the name of a text file to be used for storing the new text, the name 'untitled' is used. In addition, the new-text creation screen 571 also shows a cursor pointing to the present edit position in a text input area.

While a text is being entered, it is possible to display a context menu 581 like one shown in FIG. 21 in accordance with an operation input entered by the user. The context menu 581 typically shows commands including 'End Comm. App. Call', 'End AD HOC Connect', 'Save', 'Save As', 'Cut', 'Copy' and 'Paste'. 'End Comm. App. Call' is the name of a command to terminate the text editor 466 and activate the communication application. 'End AD HOC Connect' is the name of a command to terminate the text editor 466 and start an ad-hoc connection mode. 'Save' is the name of a command to keep a created text. 'Save As' is the name of a command to keep a created text in a file by giving a name to the file. 'Cut' is the name of a command to cut out a portion of a text from the text. The portion to be cut out from the text is a character string in a specified range. 'Copy' is the name of a command to copy a portion of a text. The portion to be copied is a character string in a specified range. 'Paste' is the name of a command to paste a portion at a position in a text. The portion to be pasted to the text is a character string cut out from a text by making use of the 'Cut' command or a character string copied by making use of the 'Copy' command.

In addition, the text editor 466 also has a character predictive conversion function. The character predictive conversion function works as follows. When the user moves the cursor to a place at which a string of characters is to be entered and enters the first character of the string, the character predictive conversion function automatically displays a plurality of predicted candidates for the character string to be entered at the position of the entered first character as a string starting with the entered first character. The character predictive conversion function automatically displays the predicted candidates in a character-string predictive conversion bar 591 at the bottom of the new-text creation screen 571 as shown in FIG. 22.

If the predicted candidates shown in a character-string predictive conversion bar 591 include the character string to be entered by the user at the position of the entered first character, the user can carry out an operation to select the string of characters from the character-string predictive conversion bar 591 in order to enter the selected string of characters to the position. In this way, the user is capable of entering a desired string of characters to the position of the entered first character by carrying out only few text-character input operations. The user is capable of deleting the character-string predictive conversion bar 591 from the new-text creation screen 571 by carrying out an input operation of deciding to select an x box at the left end of the new-text creation screen 571.

The keyboard 71 shown in FIG. 8 as a keyboard employed in the information communication terminal 1 may have the so-called + character keys in addition to the 4-direction keys 26 provided on the cover 61. By providing the + character keys, the user may enjoy more convenience of selecting the + character keys or the 4-direction keys 26 as follows.

For example, the user may operate a key of the 4-direction keys 26 or a left-direction or right-direction key of the + character keys on the keyboard 71 in order to enter a command to move the cursor over the new-text creation screen 571 of the text editor 466 in a direction indicated by the operated key. On the other hand, the user may operate an upward-direction or downward-direction key of the + character keys on the keyboard 71 in order to enter a command to select a string of characters among a plurality of candidates shown in the character-string predictive conversion bar 591.

The software described above as the application programs implementing the photo viewer 465, the text editor 466 and the voice memo tool 467 is executed to carry out no processing of communication with an external apparatus. However, let us take functions each handling a musical content as an example. In this case, such a function may be executed to carry out processing of communication with an external apparatus or processing of no communication with an external apparatus. All the functions each handling a musical content are typically collected in a menu. This is because it is desirable to let the user utilize any of the functions each handling a musical content as an application program by selecting the program from the menu without the need to be aware of whether or not the selected program entails a communication with an external apparatus or without the need to distinguish the functions entailing a communication with an external apparatus and functions entailing no communication with an external apparatus from each other.

The method of communication with another apparatus can be implemented by wire connection making use of a USB cable or by radio connection making use of the WLAN. In the case of radio connection making use of the WLAN, the WLAN ad-hoc mode or the WLAN infrastructure mode can be adopted as described before.

The WLAN communication adopting the WLAN ad-hoc mode is explained by referring to FIGS. 23 to 26 as follows.

Let us assume for example that information communication terminals 1-1 to 1-5 operated by users A to E respectively exist in a range of implementable communications as shown in FIG. 23. Also let us assume that the information communication terminal 1-4 operated by user D is communicating in the WLAN ad-hoc mode with the information communication terminal 1-5 operated by user E.

In this case, each of the information communication terminals existing in the range of implementable communications as a terminal for the WLAN ad-hoc mode is not set to allow the information communication terminals to freely transfer files among each other and freely reproduce a transferred musical content in a streaming reproduction process. Instead, each of the WLAN ad-hoc mode information communication terminals existing in the range of implementable communications is set to allow only mutually registered information communication terminals to freely transfer files among each other and freely reproduce a transferred musical content in a streaming reproduction process. Two information communication terminals serving as mutual communication partners are said to be mutually registered information communication terminals if any specific one of the terminals is a terminal registered in the other terminal and the other terminal is a terminal registered in the specific terminal.

In the WLAN ad-hoc mode, each of the information communication terminals 1-1 to 1-5 operated by users A to E respectively as shown in FIG. 23 transmits its unique information and information on its present condition to all apparatus in the range of implementable communications by adoption of a broadcasting transmission technique, which does not specify any specific destination of the transmission. The unique information of a information communication terminal 1 is information that basically remains unchanged. On the other hand, the information on the present condition of a information communication terminal 1 is information that varies from time to time. FIG. 24 is a diagram explaining pieces of typical information transmitted by an information communication terminal 1 in an ad-hoc mode by adoption of the broadcasting transmission technique.

As shown in the figure, the typical information transmitted by an information communication terminal 1 in an ad-hoc mode by adoption of the broadcasting transmission technique includes a unique IP address and unique port number of this terminal, a unique apparatus ID of this terminal, a user ID with a set profile, connection/disconnection information typically indicating a busy or ready state or the like, information on music being reproduced (or now playing) including such as the music title and the artist name, information required in a streaming reproduction process for a musical content being reproduced as a content with a protected copyright, other information such as information on a reproduction state or the like and a text memo entered by the user. The sequence number and object handle of music being reproduced are typical information required in a streaming repro implementable duction process for a musical content being reproduced as a content with a protected copyright.

The unique IP address and unique port number of this terminal, the unique apparatus ID of this terminal and the user ID with a set profile, which are included in the information communication terminal 1 in an ad-hoc mode, are information that basically remains unchanged. On the other hand, the information on music being reproduced (or now playing), the information required in a streaming reproduction process for a musical content being reproduced as a content with a protected copyright and other information such as information on a reproduction state or the like are information varying from time to time. The text memo entered by the user is basically unchanged but the user may enter a text memo with contents varying from time to time.

In addition, each of the information communication terminals 1 setting the WLAN ad-hoc mode may transmit information other than that explained above by referring to FIG. 24 to all apparatus in the range of implementable communications by adoption of the broadcasting transmission technique as long as the other information is information that can be disclosed to any user not registered as a communication partner in the WLAN ad-hoc mode set typically for exchanging information. For example, each of the information communication terminals 1 setting the WLAN ad-hoc mode may transmit image data of an icon (or the thumbnail) of the sender itself along with the information explained above by referring to FIG. 24 to any other information communication terminal 1 setting the WLAN ad-hoc mode. The icon will be displayed on a standby screen of the other information communication terminal 1 operated by an ad-hoc communication partner, who is a user not mutually registered yet. The icon is an icon letting the user, who is not a mutually registered user, display a screen of the owner of the icon. The standby screen will be described later in detail.

On the other hand, each of the information communication terminals 1-1 to 1-5 operated by users A to E respectively as shown in FIG. 23 receives the information explained above by referring to FIG. 24 from each of the information communication terminals 1-1 to 1-5, and produces a result of determination as to whether the information communication terminals 1-1 to 1-5 each serving as a sender is owned by a user registered as an ad-hoc communication partner in order to recognize the states of communication with the information communication terminals 1-1 to 1-5 each owned by a user registered as an ad-hoc communication partner and recognize information on each user owning another information communication terminal 1 existing in the range of implementable communications as an unregistered information communication terminal 1.

Then, in the WLAN ad-hoc mode, the information communication terminal 1 displays an ad-hoc user list display screen on the display unit 21. The ad-hoc user list display screen is a screen showing a list of pieces of information on users each registered as an ad-hoc communication partner owning the information communication terminal 1 and users each owning another information communication terminal 1 existing in the range of implementable communications as an unregistered information communication terminal 1.

To put it concretely, the ad-hoc user list display screen shows the states of communication with the information communication terminals 1 each owned by a user registered as an ad-hoc communication partner and any other information communication terminal 1 existing in the range of implementable communications as an unregistered information communication terminal 1. The state of communication with another information communication terminal 1 owned by a user registered as an ad-hoc communication partner can be an online state, an offline state or a busy state. The online state of another information communication terminal 1 is a state in which a communication with the other information communication terminal 1 can be carried out. The offline state of another information communication terminal 1 is a state in which a communication with the other information communication terminal 1 cannot be carried out due to the fact that the other information communication terminal 1 does not exist in the range of implementable communications. The busy state of another information communication terminal 1 is a state in which a communication with the other information communication terminal 1 cannot be carried out due to the fact that the other information communication terminal 1 is communicating with another apparatus. As for the state of communication with any other information communication terminal 1 existing in the range of implementable communications as an unregistered information communication terminal 1, an unknown state is displayed.

Let us assume for example that users B, Z, D and E are each a user registered in the information communication terminal 1 owned by user A as a communication partner of user A. In this case, the ad-hoc user list display screen of user A displays a list shown on the left side of FIG. 25 as a list of users. The list of users shows user B in an online state, user Z in an offline state, user D in a busy state, user E in a busy state and user C in an unknown state. That is to say, a communication with user B can be carried out, a communication with user Z cannot be carried out due to the fact that the information communication terminal 1 owned by user Z does not exist in the range of implementable communications, a communication with either of users D and E cannot be carried out due to the fact users D and E are each communicating with another apparatus whereas the information communication terminal 1 owned by user C exists in the range of implementable communications as an unregistered information communication terminal 1.

By the same token, let us assume for example that users A, D and E are each a user registered in the information communication terminal 1 owned by user B as a communication partner of user B. In this case, the ad-hoc user list display screen of user B displays a list shown in the middle of FIG. 25 as a list of users. The list of users shows user A in an online state, user D in a busy state, user E in a busy state and user C in an unknown state. That is to say, a communication with user A can be carried out, a communication with either of users D and E cannot be carried out due to the fact users D and E are each communicating with another apparatus whereas the information communication terminal 1 owned by user C exists in the range of implementable communications as an unregistered information communication terminal 1.

In the same way, let us assume for example that users D and E are each a user registered in the information communication terminal 1 owned by user C as a communication partner of user C. In this case, the ad-hoc user list display screen of user C displays a list shown on the right side of FIG. 25 as a list of users. The list of users shows user D in a busy state, user E in a busy state, user A in an unknown state and user C in an unknown state. That is to say, a communication with either of users D and E cannot be carried out due to the fact that users D and E are each communicating with another apparatus whereas the information communication terminals 1 owned by users A and C each exist in the range of implementable communications as an unregistered information communication terminal 1.

In addition, the ad-hoc user list display screen may also display the name of a user identifiable from at least a user ID included in various kinds of information broadcasted by another information communication terminal 1, the state of communication with the information communication terminal 1 owned by the user and, if necessary, other information. As described above, the state of communication with the information communication terminal 1 owned by the identified user can be an online, offline, busy or unknown state. In the examples shown in FIG. 25, the ad-hoc user list display screen displays the name of each user, the state of communication with the information communication terminal 1 owned by the user and information on a now playing musical content, that is, a musical content being reproduced. In addition, the ad-hoc user list display screen may also display information such as a text memo entered by the user if necessary.

Various kinds of information broadcasted by another information communication terminal 1 include information that cannot be displayed on the ad-hoc user list display screen. The information that cannot be displayed on the ad-hoc user list display screen may be recognized as a user information property.

Figure 25:
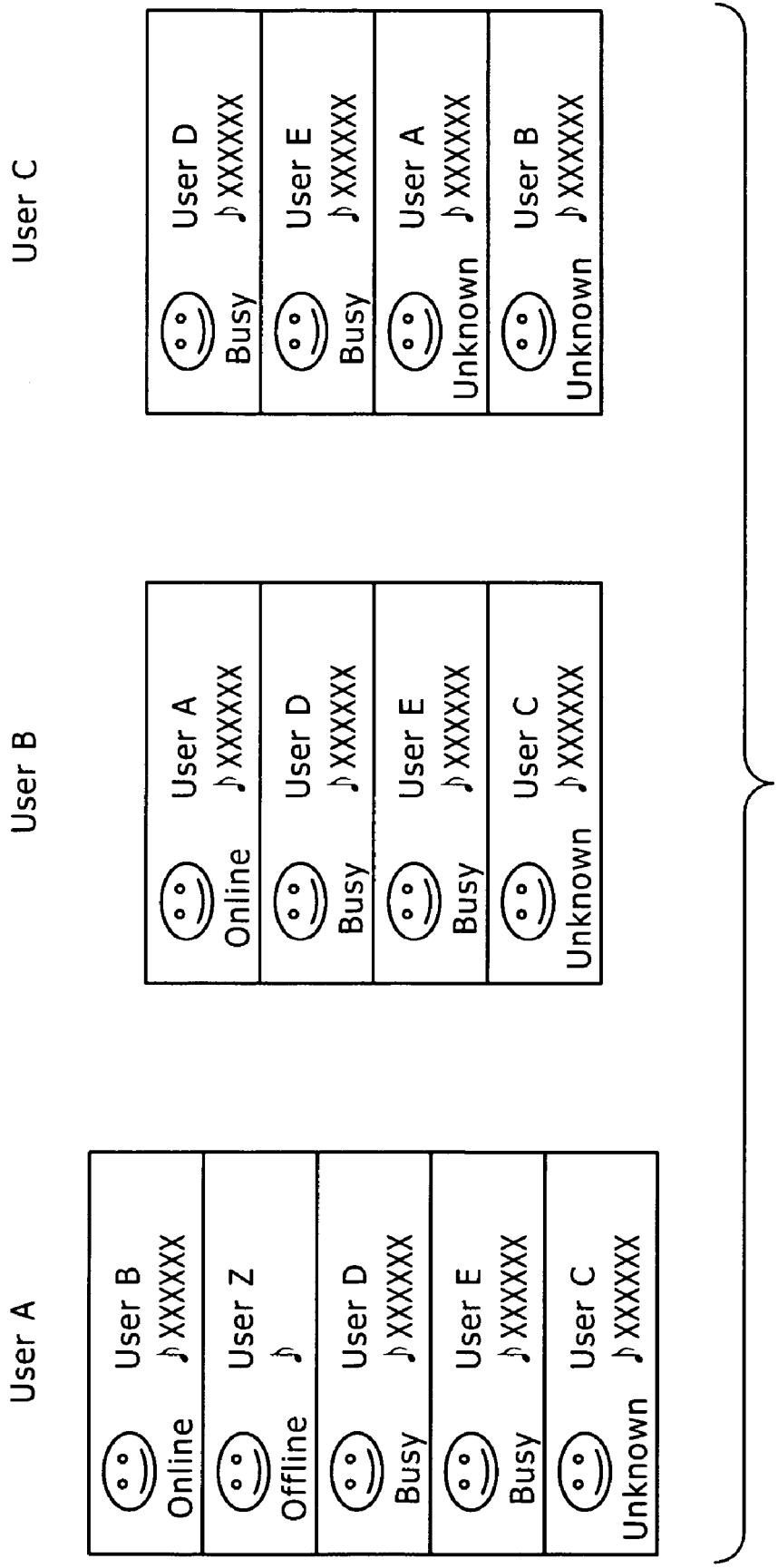
FIG. 25 is an explanatory diagram showing ad-hoc user list display screens.

In the examples shown in FIG. 25, let us assume that a decision is made by user A to confirm selection of the information communication terminal 1 owned by user C but not registered in the information communication terminal 1 owned by user A, a decision is made by user B to confirm selection of the information communication terminal 1 owned by user C but not registered in the information communication terminal 1 owned by user B or a decision is made by user C to confirm selection of the information communication terminal 1 owned by either of user A or B but not registered in the information communication terminal 1 owned by user C. In this case, a dialog box is displayed to show a message for verifying execution of a mutual registration process to register the selected user in the information communication terminal 1 owned by the selecting user and register the selecting user in the information communication terminal 1 owned by the selected user.

FIG. 26 is a diagram explaining typical user information exchanged between the information communication terminals 1 owned by the selecting and selected users serving as communication partners in the mutual registration process. As described above, the mutual registration process is carried out in order to register the selected user in the information communication terminal 1 owned by the selecting user and register the selecting user in the information communication terminal 1 owned by the selected user.

It is desirable to exchange information in the mutual registration process as information including an apparatus unique ID, a user ID with a set profile, a text, image data of a face icon, user color information, an ID used in a communication application and the ID of the instant messenger. Examples of the text entered by the user for the registration purpose are the URL of a home page of the user itself and sentences introducing the user itself. It is needless to say that the face icon to be displayed on a standby screen to be described later does not have to be a photo of the actual face of the user. The user color information set by the user is information on the display color of the background (or the so-called wallpaper) to be displayed during a process to communicate with the user as the background of the display unit 21. An example of the communication application cited above is a tool such as a chatting tool or an IP-telephone tool.

A message can be exchanged even between information communication terminals 1 owned by users not mutually registered in the information communication terminals 1 provided that the information communication terminals 1 exchanging the message exist in the range of implementable communications. For example, the radio communication module 148 employed in the information communication terminal 1 on the sender side transmits a message to a information communication terminal 1 on the recipient side as a message requesting the information communication terminal 1 serving as the message recipient to carry out a mutual registration process for registering the information communication terminals 1 in each other to in order to turn them into mutually registered terminals 1. After the information communication terminal 1 serving as the message recipient approves the request made by the information communication terminal 1 on the sender side, the information shown in FIG. 26 is exchanged between the terminals 1 and supplied to the application processors 131 employed in the terminals 1. The application processors 131 each supply the exchanged information to the flash memory 146 connected to the application processor 131 or either of the flash memory 156 and the large-capacity flash memory 154, which are connected to the audio processor 132. In this way, the exchanged information is stored in each specific one of the information communication terminals 1 as information on the other information communication terminal 1 owned by a user registered in the specific information communication terminal 1 as a communication partner capable of carrying out processing such as a process of exchanging files and a streaming reproduction process in an ad-hoc mode.

Between information communication terminals 1 mutually registering the other information communication terminal 1 as a communication partner capable of carrying out processing such as a process of exchanging files and a streaming reproduction process in an ad-hoc mode, a communication is always performed on a one-to-one basis in the same way as the communication between the information communication terminals 1-4 and 1-5 shown in FIG. 23 in order to implement the processing such as a process of exchanging files and processing to reproduce a musical content in a streaming reproduction process.

It is to be noted that, basically, all data files recorded internally in the information communication terminal 1 can be exchanged with the communication partner of the terminal 1 in the process of exchanging files. In the case of a data file exchanged in a file exchange process as a file having a protected copyright, however, the information communication terminal 1 serving as the communication partner receiving the data file in the file exchange process is not capable of opening (or reproducing) the file unless, for example, the information communication terminal 1 has a descramble key for decrypting the file.

In addition, in the case of a content to be reproduced in a streaming reproduction process as a content with a protected copyright in an ad-hoc mode by an information communication terminal 1 serving as a communication partner receiving the content in a file exchange process and having permission to reproduce the content, the information communication terminal 1 is not capable of opening (or reproducing) the data file containing the content unless, for example, the information communication terminal 1 has a descramble key for decrypting the streamed file.

By referring to FIGS. 27 to 32, the following description explains typical processing carried out by execution of the music tool 463 selected by confirmation from items included in a menu displayed on the home screen 451 explained earlier by referring to FIG. 14. As described before, the displayed menu is a list of application programs that can be executed in the information communication terminal 1 or, as an alternative, the displayed menu can also be a list of items each including a plurality of such application programs. The processing carried out by execution of the music tool 463 is typically a process to handle audio data, which is mainly musical data.

Figure 27:
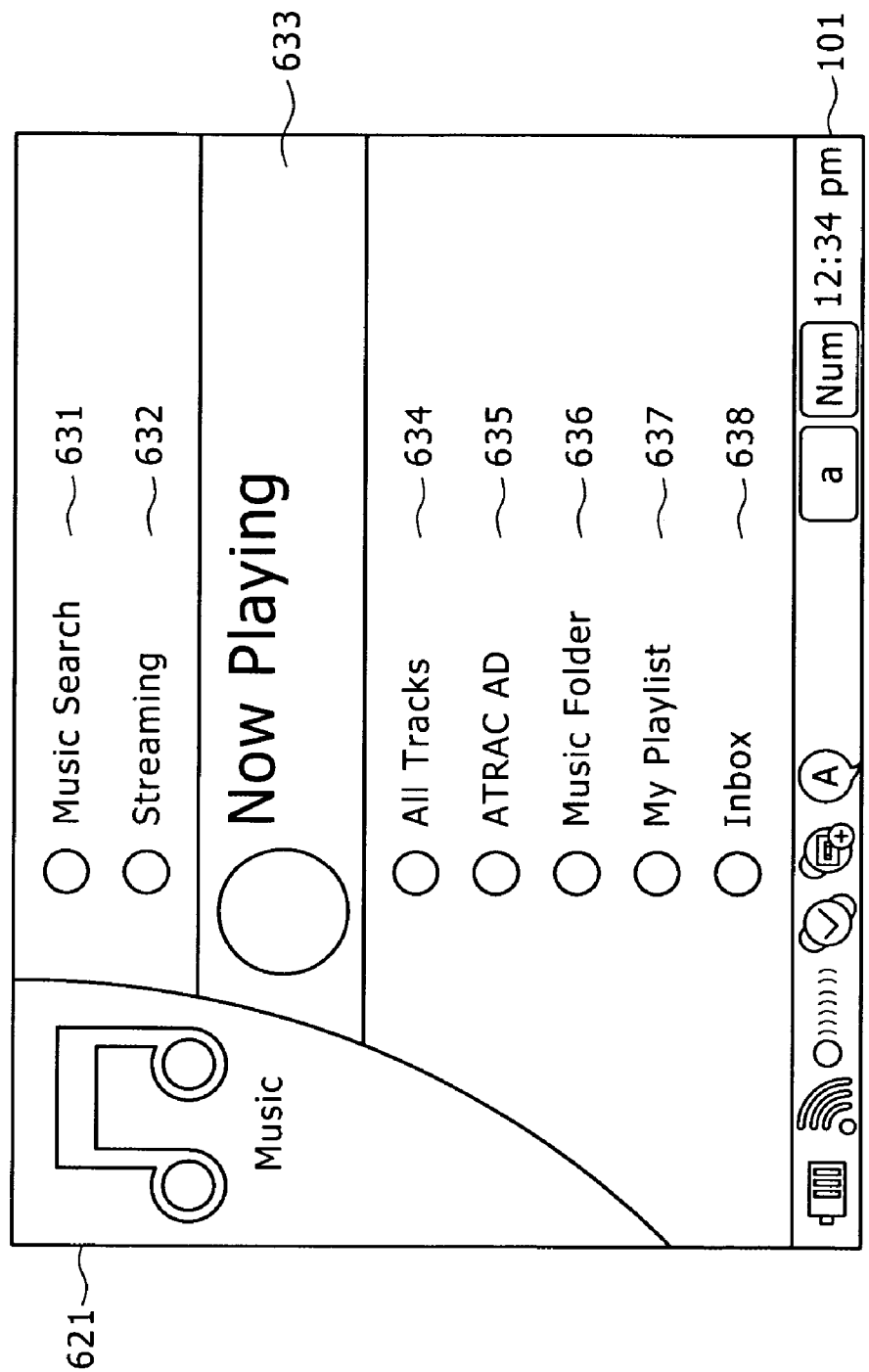
FIG. 27 is an explanatory diagram showing a menu screen.

FIG. 27 is an explanatory diagram showing a list menu screen 621 displayed on the display unit 21 as a list menu screen 621 of the music tool 463 selected by confirmation from items included in a menu displayed on the home screen 451 explained earlier by referring to FIG. 14. As shown in FIG. 27, the list menu screen 621 of the music tool 463 selected by confirmation from items included in a menu displayed on the home screen 451 shows a list of menu items such as Music Search 631, Streaming 632, Now Playing 633, All Tracks 634, ATRAC AD 635, Music Folder 636, My Playlist 637 and Inbox 638. The user is capable of selecting any desired one of the menu items by confirmation by operating the 4-direction keys 26 and the enter button 27.

If the Music Search menu item 631 is selected by confirmation from the list menu screen 621, for example, the music search application of the application layer explained before by referring to FIG. 12 is activated. The activated music search application displays a search screen 651 like one shown in FIG. 28. Then, the user enters a desired search key to a text input area 661 in order to select a musical content as follows.

First of all, when the user enters the desired search key to the text input area 661 and presses the enter button 27, the music search application activated by the application processor 131 supplies the search key received from the keyboard module 149 to the audio processor 132.

By carrying out the music-DB function explained earlier by referring to FIG. 13, the audio processor 132 searches content titles, album titles and artist names for ones each including the search keyword received from the music search application and supplies the result of the search process to the music search application activated by the application processor 131. Let us assume for example that the result of the search process is content titles each including the search keyword.

Figure 28:
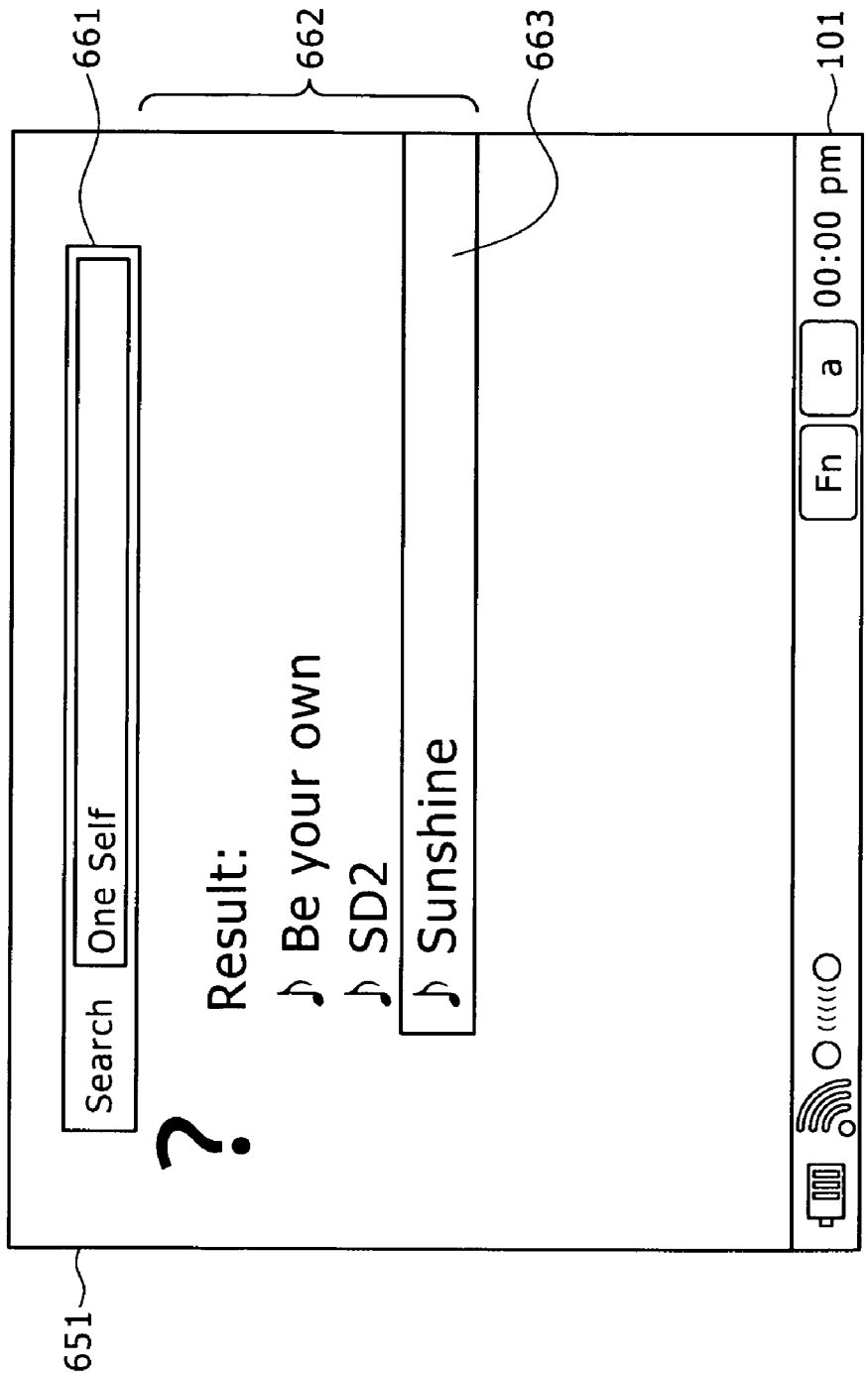
FIG. 28 is an explanatory diagram showing a search screen.

The music search application activated by the application processor 131 displays the search result, which is a list of content titles, in a search-result display area 662 of the search screen 651 as shown in FIG. 28.

Then, the user operates the 4-direction keys 26 in order to move the cursor 663 to the position of a desired content title selected from the list displayed in the search-result display area 662 of the search screen 651, and presses the enter button 27 to confirm the selection of the desired content title pointed to by the cursor 663. In this case, the application processor 131 activates the audio player explained before by referring to FIG. 12 and, if necessary, controls the audio processor 132 to output the musical data of the content, the title of which has been selected by confirmation by the user, as reproduced data. That is to say, by carrying out the function of the audio player explained before by referring to FIG. 13, the audio processor 132 starts a process to reproduce the musical data of the content, the title of which has been selected by confirmation by the user.

To put it concretely, the audio processor 132 reads out the musical data managed by making use of the music DB from the large-capacity flash memory 154 as the musical data selected by confirmation by the user. If the musical data selected by confirmation by the user is data with a protected copyright, the audio processor 132 carries out a process to descramble the data by making use of a function and data, which are stored in the DRM library. The audio processor 132 then supplies data obtained as the result of the descrambling process to the audio-signal processing module 152 and uses an audio coding/decoding function to control the audio-signal processing module 152 to carry out a decoding process and a D/A conversion process on the data obtained as the result of the descrambling process and supply the result of the decoding process and the D/A conversion process to the ringer speaker 42 or a headphone connected to the connector jack 52 to be output as reproduced data.

Figure 29:
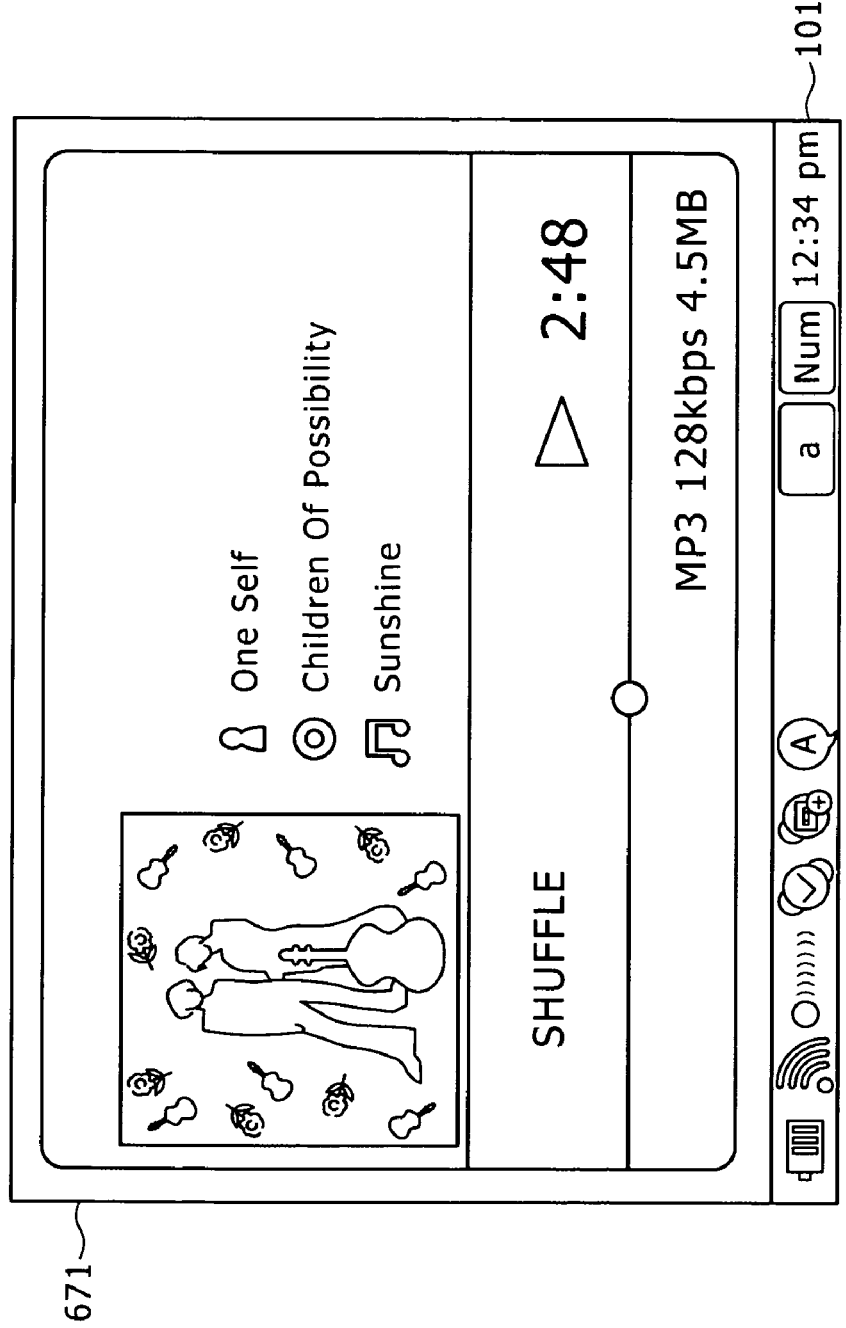
FIG. 29 is an explanatory diagram showing a musical-data reproduction display screen.

FIG. 29 is an explanatory diagram showing a musical-data reproduction display screen 671 appearing on the display unit 21 employed in the information communication terminal 1. The musical-data reproduction display screen 671 displays information on the musical content being reproduced. The information typically includes the title of the musical content, the name of an artist singing the content, the title of an album including the content and the thumbnail image of the jacket of the album.

Figure 30:
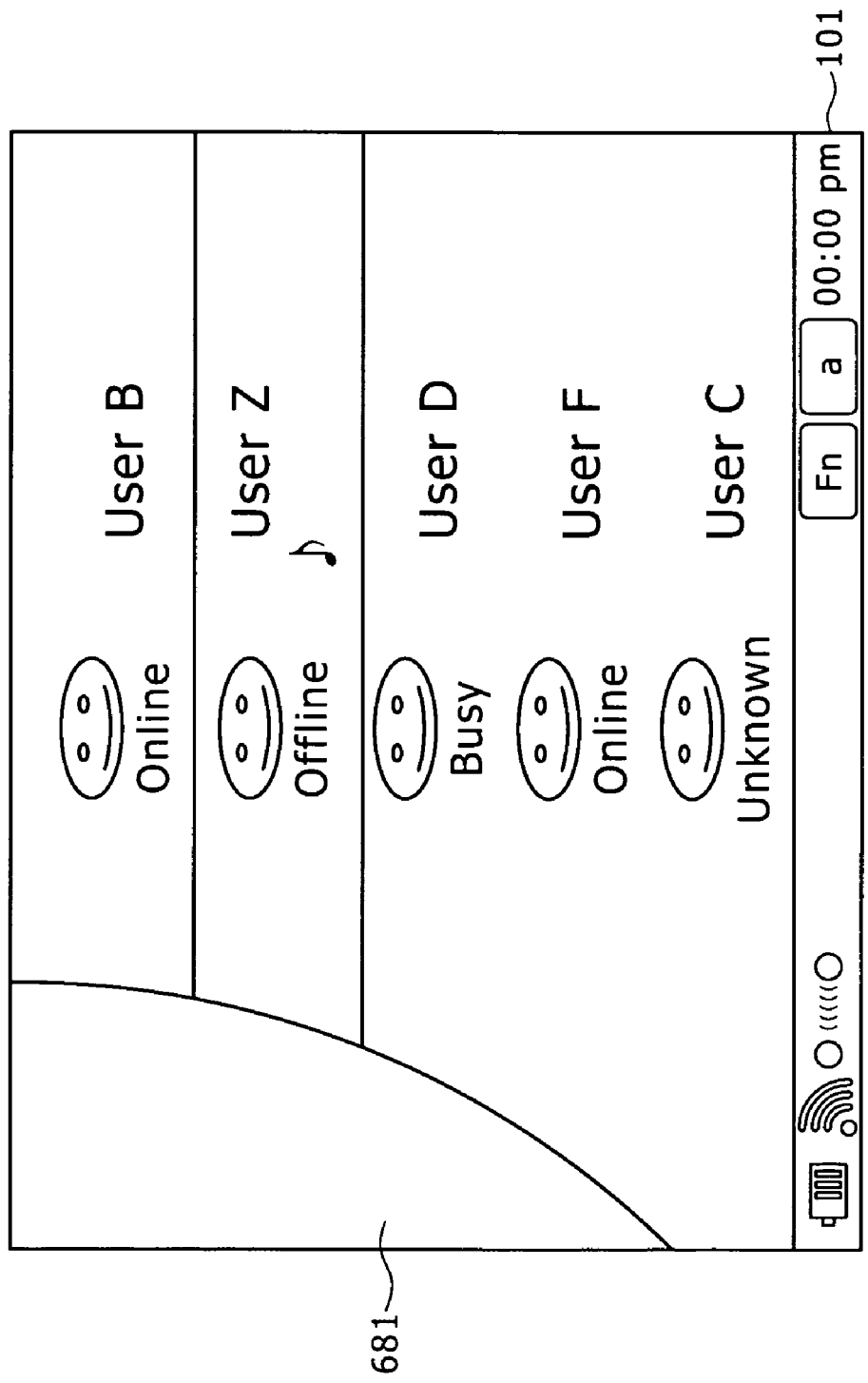
FIG. 30 is an explanatory diagram showing an ad-hoc user list display screen.

Let us now assume that the Streaming 632 is selected by confirmation from items of the menu screen 621 shown in FIG. 27 with the WLAN ad-hoc mode set. In this case, an ad-hoc user list screen 681 like one shown in FIG. 30 is displayed. If the Streaming 632 is selected by confirmation from items of the menu screen 621 shown in FIG. 27 without setting the WLAN ad-hoc mode, on the other hand, the information communication terminal 1 may display a dialog box including a message prompting the user to carry out an operation to set the WLAN ad-hoc mode. In this case, if the user carries out an operation to set the WLAN ad-hoc mode after selecting the Streaming 632 from the menu screen 621 shown in FIG. 27, an ad-hoc user list screen 681 like one shown in FIG. 30 is displayed.

As described before by referring to FIG. 25, the ad-hoc user list screen 681 basically shows a list of pieces of information on users each owning an information communication terminal 1 registered as an ad-hoc communication partner and users each owning an information communication terminal 1 located in a range of implementable communications but not registered as an ad-hoc communication partner.

Figure 31:
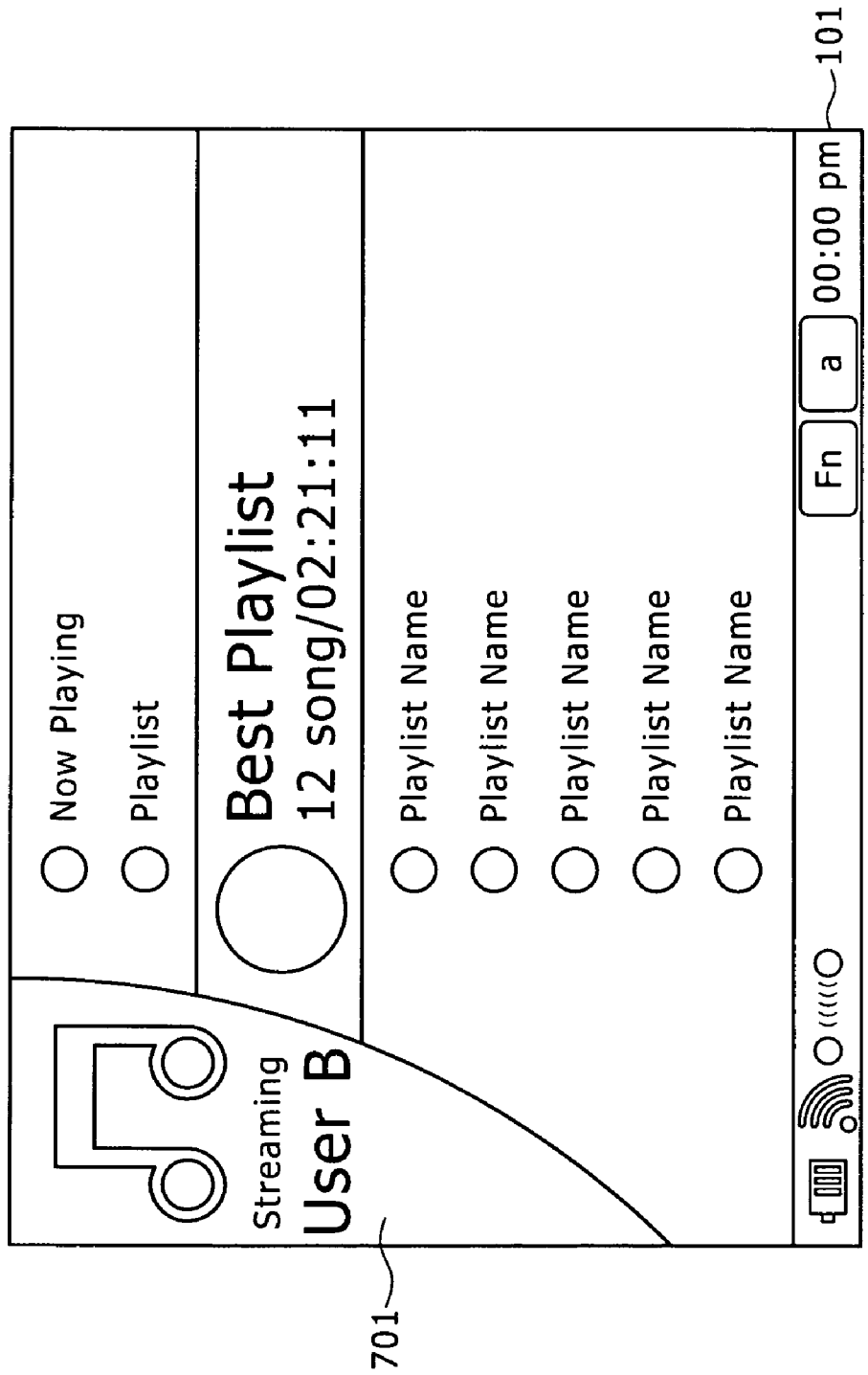
FIG. 31 is an explanatory diagram showing a released-playlist list display screen.

Let us assume for example that user B in an online state is selected by confirmation among users shown on the ad-hoc user list screen 681 of FIG. 30. In this case, the connection of the information communication terminal 1 to an information communication terminal 1 owned by user B in an online state is confirmed and disclosable playlists that can be disclosed to users by broadcasting are exchanged with user B. A playlist to be described later in detail is a list of some musical contents stored internally in the information communication terminal 1. Then, a disclosed-playlist list display screen 701 like one shown in FIG. 31 is displayed. As shown in the figure, the disclosed-playlist list display screen 701 is a list showing disclosed playlists received from the information communication terminal 1 owned by user B as disclosed playlists of user B and information selected from pieces of broadcasted information as information on a musical content being reproduced by (or now playing in) the information communication terminal 1 owned by user B. At that time, if the playlist including the musical content being reproduced by (or now playing in) the information communication terminal 1 owned by user B is a playlist disclosed to users, the disclosed-playlist list display screen 701 shows the playlist as a disclosed playlist in a selected state.

Figure 32:
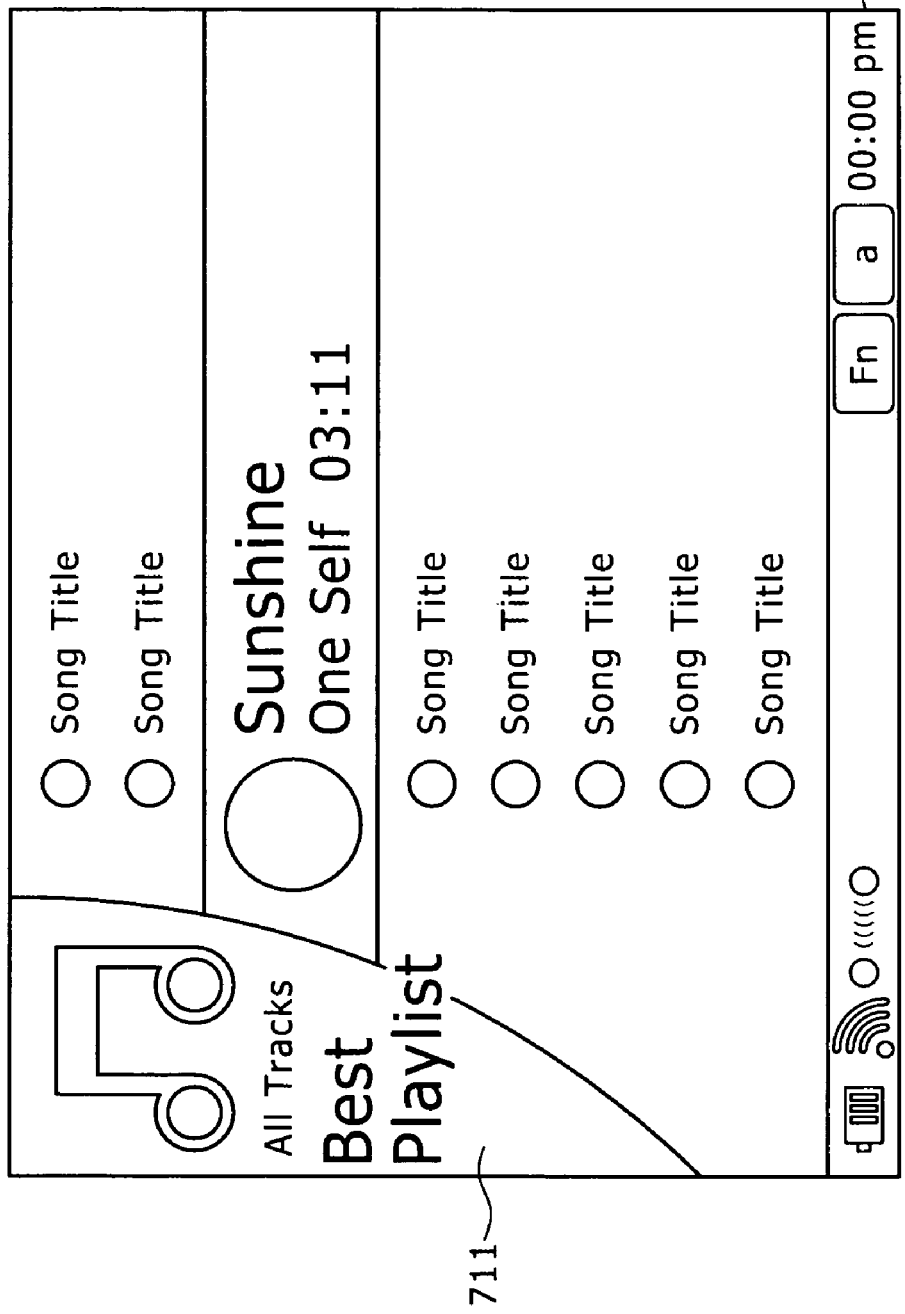
FIG. 32 is an explanatory diagram showing a track display screen.

Let us assume that the user selects by confirmation a desired playlist among the disclosed playlists shown on the disclosed-playlist list display screen 701 of FIG. 31 as disclosed playlists of user B. In this case, a track-list display screen 711 like one shown in FIG. 32 is shown. As shown in the figure, the track-list display screen 711 is a list of tracks included in the desired playlist selected by confirmation among the disclosed playlists shown on the disclosed-playlist list display screen 701. In other words, the track-list display screen 711 is a list of musical contents included in the desired playlist. If the user selects a desired track by confirmation among the tracks shown on the track-list display screen 711, the information communication terminal 1 reproduces the desired track while receiving the track from the information communication terminal 1 owned by user B in a streaming reproduction process.

In addition, when the now-playing item 633 appearing on the menu screen 621 is selected, the application processor 131 activates the audio player explained earlier by referring to FIG. 12 and, if necessary, controls the audio processor 132 in order to reproduce and output desired musical data. That is to say, the audio processor 132 starts a process to reproduce the musical data, the selection of which has been confirmed, by making use of the function of the audio player explained earlier by referring to FIG. 13.

By making use of the function of the music DB explained earlier by referring to FIG. 13, the audio processor 132 generates a list of musical contents stored in the large-capacity flash memory 154 or information showing a structure of files stored in the large-capacity flash memory 154 and supplies the list of musical contents stored in the large-capacity flash memory 154 or the information showing a structure of files to the application processor 131. If a structure of files is generated, the structure of files can be an actual or virtual structure of files. By making use of the function of the graphics library, the application processor 131 displays the list of musical contents stored in the large-capacity flash memory 154 or the information showing a structure of files on the display unit 21. By referring to either the list of musical contents stored in the large-capacity flash memory 154 or the information showing a structure of files, which is shown on the display unit 21, the user carries out input operations in order to select desire musical data and confirm the selection of the data.

Then, the audio processor 132 reads out the musical content, the selection of which has been confirmed by the user, from the large-capacity flash memory 154 also used for storing musical contents managed by using the music DB. If the copyright of the musical content read out from the large-capacity flash memory 154 is protected, the audio processor 132 carries out a process to de-scramble the musical data by making use of a function and/or data, which are stored in DRM.Lib, supplying the result of the de-scramble process to the audio-signal processing module 152. Then, by making use of an audio coding/decoding function, the audio processor 132 controls the audio-signal processing module 152 to carry out a decoding process and a DA conversion process on the result of the de-scramble process. Finally, the audio processor 132 outputs the result of the decoding process and the DA conversion process from the ringer speaker 42 or a headphone connected to the connector jack 52 as eventual reproduced data.

In addition, in a process to reproduce musical data, a musical-data reproduction display screen 671 similar to the one explained earlier by referring to FIG. 29 is displayed on the display unit 21.

If the All Tracks item 634 is selected from items shown on the menu screen 621 explained earlier by referring to FIG. 27 and the selection of the item 634 is confirmed, a list of all tracks recorded in the large-capacity flash memory 154 is displayed on the display unit 21.

It is to be noted that the a content such as musical data recorded in the large-capacity flash memory 154 can be a content directly acquired from a service provider for distributing data of musical contents, acquired from a predetermined recording medium or acquired from another information communication terminal 1 or the personal computer 13. In other words, the a content such as musical data recorded in the large-capacity flash memory 154 can be acquired by carrying out a radio communication in the WLAN infrastructure mode or the WLAN ad-hoc mode or by a wire communication through a USB connection according to the MSC or MTP method.

The information communication terminal 1 is capable of recording contents such as musical data in the large-capacity flash memory 154 by classifying the contents in accordance with the acquisition technique, the coding/decoding type and the copyright protection method. For example, the data of musical contents may be received from different service providers for distributing musical contents conforming to different coding/decoding techniques and/or different copyright protection methods. In this case, the contents such as musical data are classified on the basis of the service providers, which can each be an organization or an enterprise.

In the following description, in accordance with a typical classification method, contents such as musical data are categorized into at least three groups, i.e., ATRAC AD, Music Folder and Inbox. Thus, when the All Tracks item 634 is selected from items shown on the menu screen 621 explained earlier by referring to FIG. 27 and the selection of the item is confirmed, a list of all tracks recorded in each of three folders, namely, ATRAC AD, Music Folder and Inbox, are displayed on the display unit 21.

Musical contents stored in the folders named ATRAC AD and Music Folder are contents each acquired by carrying out a radio communication in either the WLAN infrastructure mode or the WLAN ad-hoc mode. To be more specific, musical contents stored in the folder named ATRAC AD are contents each having the ATRAC format. On the other hand, musical contents stored in the folder named Music Folder are contents each having a format other than the ATRAC format. Musical contents stored in the folder named Inbox are contents each acquired by carrying out a wire communication through a USB connection.

In the past, the copyright management method and the coding/decoding method, which were adopted for acquired (or, in most cases, downloaded) musical contents, varied in many cases in accordance with the service provider for distributing the musical contents. In addition, in many cases, the conventional information communication terminal was provided with an application program to be executed to acquire a musical content from a service provider for distributing the musical contents and reproduce the acquired musical content. In such cases, the communication method permitted as a method for exchanging musical data also varied. On the other hand, the information communication terminal 1 is adapted to the WLAN infrastructure radio communication mode and the WLAN ad-hoc radio communication mode as well as the MSC and MTP methods adopted for the USB connection.

Thus, by installing an application program proper for the WLAN infrastructure radio communication mode and the WLAN ad-hoc radio communication mode and/or the MSC and MTP methods in the information communication terminal 1, the information communication terminal 1 can be made capable of acquiring data of musical contents from a number of service providers as well as storing and reproducing the data. It is to be noted that a software coding/decoding protocol and/or a DRM protocol may also be installed in place of the application program.

If the ATTRAC AD item 635 is selected from items shown on the menu screen 621 explained earlier by referring to FIG. 27 and the selection of the item 635 is confirmed, a list of all tracks recorded in the ATRAC AD folder stored in the large-capacity flash memory 154 is displayed on the display unit 21. By the same token, if the Music Folder item 636 is selected from items shown on the menu screen 621 explained earlier by referring to FIG. 27 and the selection of the item is confirmed, a list of all tracks recorded in the Music Folder folder stored in the large-capacity flash memory 154 is displayed on the display unit 21. In the same way, if the Inbox item 638 is selected from items shown on the menu screen 621 explained earlier by referring to FIG. 27 and the selection of the item is confirmed, a list of all tracks received in a file transfer through the USB connection and recorded in the Inbox folder stored in the large-capacity flash memory 154 is displayed on the display unit 21.

Musical contents recorded in the folder named Inbox cited above are each a content acquired from the personal computer 13 connected to the information communication terminal 1 by a USB connection. To put it in detail, musical contents recorded in the folder named Inbox are each a content acquired from the personal computer 13 connected to the information communication terminal 1 by a wire communication through the USB connection according to the MSC or MTP method adopted as the USB connection method.

As described above, in the past, the copyright management method and the coding/decoding method, which were adopted for acquired (or, in most cases, downloaded) musical contents, varied in many cases in accordance with the service provider for distributing the musical contents. In addition, in many cases, the conventional information communication terminal was provided with an application program to be executed to acquire a musical content from a service provider for distributing the musical contents and reproduce the acquired musical content. That is to say, in many cases, since the personal computer 13 has installed application programs provided by a plurality of service providers, a content (such as musical data) stored in the personal computer 13 can be handled only by a predetermined application program provided by a service provider supplying the content. In other words, in many cases, an operation to copy a content from the personal computer 13 connected to the information communication terminal 1 by a USB connection to the information communication terminal 1 can be carried out only by a predetermined application program provided by a service provider distributing the content. Even in such a case, the information communication terminal 1 is capable of acquiring contents such as musical data from the personal computer 13, which has received the data from a variety of service providers, as well as storing and reproducing the data. This is because the information communication terminal 1 is adapted to both the MSC and MTP modes adopted as the USB connection mode for the USB connection.

An operation to switch the USB connection mode from MSC to MTP or vice versa can be started by selecting the Tools item 468 from the items shown on the home screen 451 explained before by referring to FIG. 14. The setting tool described earlier by referring to FIG. 13 as a tool for the application processor 131 has a function to switch the USB connection mode from MSC to MTP or vice versa by controlling the audio processor 132 to select the MSC or MTP software owned by the audio processor 132 as described earlier by referring to FIG. 13. In this way, the function used by application programs such the file exchange application can be switched.

If the My Playlist item 637 is selected from items shown on the menu screen 621 explained earlier by referring to FIG. 27 and the selection of the item 637 is confirmed, a list of contents such as musical data is displayed in accordance with an input operation carried out by the user. To put it concretely, My Playlist is a list of contents (such as musical data) managed as a virtual file generated as a file of a virtual-file system in a process to classify the contents in accordance with a method determined by the user. As described before, the contents such as musical data are categorized into at least three groups, i.e., ATRAC AD, Music Folder and Inbox and recorded in three folders, namely, the aforementioned ATRAC AD, Music Folder and Inbox folders respectively. For example, the playlist is a list of favorite contents such as songs. In order to manage a number of musical contents, playlists are typically classified by genre into, for example, a playlist of indoor music, a playlist of orchestral music, a playlist of instrumental music and a playlist of vocal music. At the same time, playlists may also be classified by artist and/or performer into, for example, a playlist of music performed by musician A, a playlist of music performed by musician B, a playlist of music performed by orchestra A, a playlist of music performed by orchestra B, a playlist of music performed by conductor A and a playlist of music performed by conductor B. In addition, playlists may also be classified by song writer into a playlist of music written by song writer A and a playlist of music written by song writer B.

In addition, it is needless to say that playlists represented by the My Playlist menu item 637 can be organized in a layer structure consisting of a plurality of layers. For example, the playlists are classified by song writer into large groups such as a playlist of music written by song writer A and a playlist of music written by song writer B. Then, music pertaining to each of the large groups is further classified by genre into middle groups such as a playlist of indoor music, a playlist of orchestral music, a playlist of instrumental music and a playlist of vocal music. Furthermore, music pertaining to each of the middle groups is classified by title into small groups each consisting musical contents performed by the various artist, orchestra or performer. By organizing musical contents in a layer structure consisting of a plurality of layers as described above, the user is capable of searching the structure for a musical content, which the user wants to listen to, with ease. For example, the user can easily find a musical content included on the orchestral-music playlist pertaining to the playlist of music written by song writer A as a content performed by orchestra B named the Xth Symphony Orchestra.

In addition, it is possible to have a plurality of My Playlist musical groups. In this case, it is needless to say that the same musical content may pertain to more than one My Playlist musical group. Since each of the My Playlist musical groups is a virtual file of a virtual-file system, a musical content is actually stored as a real data file in the large-capacity flash memory 154 even if the same musical content pertains to more than one My Playlist musical group.

On top of that, each of the My Playlist musical groups may include a flag indicating whether or not the group can be disclosed at an ad-hoc broadcasting time. That is to say, it is possible to provide a configuration in which only some of the My Playlist musical groups are disclosed at an ad-hoc broadcasting time.

Moreover, My Playlist can be newly created, deleted or updated with a high degree of freedom in accordance with an operation input entered by the user. For example, it is desirable to provide a configuration in which, when the user presses downward the option button 25 with information on My Playlist displayed on the display unit 21, a dialog box appears on the screen of the display unit 21 as a box for letting the user select an operation to newly create, delete or update My Playlist.

By referring to a flowchart shown in FIG. 33, the following description explains operations carried out by information communication terminals 1, which serve respectively as a source to supply a content to be reproduced in a streaming reproduction process and a recipient of the content, in the streaming reproduction process.

As shown in the figure, the flowchart begins with a step S1 at which a user owning the information communication terminal 1 serving as a recipient to receive a content to be reproduced in a streaming reproduction process selects the Streaming item 632 appearing on the menu screen 621 shown in FIG. 27 and confirms the selection of the item 632. Let us assume for example that, in this case, the information communication unit 1-1 serves as the recipient to receive a content to be reproduced in a streaming reproduction process. Then, at the next step S2, the menu display tool reads out information on registered users each capable of serving as a communication partner in the WLAN ad-hoc mode from the large-capacity flash memory 154 and obtains the information through the audio processor 132. The menu display tool is a tool executed by the application processor 131 employed in the information communication unit 1-1.

Subsequently, at the next step S3, the menu display tool of the information communication unit 1-1 acquires broadcasted information from another information communication terminal 1 by way of an ad-hoc communication engine also executed by the application processor 131 employed in the information communication unit 1-1 as an engine receiving the information. An ad-hoc communication engine executed by an application processor 131 employed in the other information communication terminal 1 broadcasts the information determined in advance as will be described later.

Then, at the next step S4, the menu display tool of the information communication unit 1-1 serving as recipient to receive a content to be reproduced in a streaming reproduction process produces a result of determination as to whether each of the registered users each capable of serving as a communication partner in the WLAN ad-hoc mode is an online or offline state. The information communication unit 1-1 produces such a result of determination on the basis of the information on the registered users and the broadcasted information.

Subsequently, at the next step S5, the menu display tool of the information communication unit 1-1 extracts information broadcasted by information communication terminals owned by unregistered users from the received broadcasted information on the basis of the information on the registered users and the broadcasted information.

Then, at the next step S6, the menu display tool of the information communication unit 1-1 generates an ad-hoc user list display screen 681 showing a list of pieces of information on users as shown in FIG. 30 on the basis of the determination result produced at the step S4, the information extracted at the step S5 and other data, displaying the ad-hoc user list display screen 681 on the display unit 21.

Subsequently, at the next step S7, the user selects registered user B in an online state among registered users displayed on the ad-hoc user list display screen 681 showing the list of pieces of information on the users. After user B owning the information communication unit 1-2 serving as the source to supply a musical content to be reproduced in a streaming reproduction process is selected, the ad-hoc communication engine of the information communication unit 1-1 serving as the recipient to receive a musical content to be reproduced in a streaming reproduction process establishes steaming connection in conjunction with the ad-hoc communication engine of the information communication unit 1-2 at the next step S8.

Then, at the next step S9, the ad-hoc communication engine of the information communication unit 1-1 serving as the recipient to receive a musical content to be reproduced in a streaming reproduction process transmits a request for disclosed playlists to the ad-hoc communication engine of the information communication unit 1-2 serving as the source to supply a musical content to be reproduced in a streaming reproduction process though the established connection. When the ad-hoc communication engine of the information communication unit 1-2 serving as the source to supply a musical content to be reproduced in a streaming reproduction process receives the request for disclosed playlists from the information communication unit 1-1 serving the recipient to receive a musical content to be reproduced in a streaming reproduction process though the established connection, the ad-hoc communication engine of the information communication unit 1-2 reads out disclosed playlists from the large-capacity flash memory 154 through the audio processor 132 and transmits the playlists to the information communication unit 1-1.

It is to be noted that it is possible to provide a configuration in which only some of the disclosed playlists mentioned above are set as playlists to be disclosed at a broadcasting time in the WLAN ad-hoc mode. The operation to set some of the disclosed playlists mentioned above as playlists to be disclosed at a broadcasting time can be done for example by putting a check mark in a check box attached to each of the disclosed My Playlists displayed on a setting screen 80 shown in FIG. 34. In the setting screen 800 shown in FIG. 34, for example, a check mark is put in a check box attached to Playlist 3 to set Playlist 3 selected among Playlist 1 to 5 as a disclosed playlist.

Subsequently, at the next step S10 of the flowchart shown in FIG. 33, the ad-hoc communication engine of the information communication unit 1-1 serving as the recipient to receive a musical content to be reproduced in a streaming reproduction process receives the disclosed playlist selected as described above from the ad-hoc communication engine of the information communication unit 1-2 serving as the source to supply a musical content to be reproduced in a streaming reproduction process though the established connection. On the basis of the disclosed playlist received from the information communication unit 1-2 and the now-playing information included in broadcasted information received from the information communication unit 1-2, the menu display tool of the information communication unit 1-1 generates a playlist-list display screen 701 like the one shown in FIG. 31.

Next, at the next step S11, the information communication unit 1-1 serving as the recipient to receive a musical content to be reproduced in a streaming reproduction process produces a result of determination as to whether or not the user has confirmed selection of a musical content. If the result of determination indicates that the user has confirmed selection of a musical content, the flow of the processing goes on to a step S12.

For example, when the user confirms selection of the now-playing item from the screen shown in FIG. 31, the flow of the processing goes on to a step S12. In addition, if the determination result indicates that the user has confirmed selection of a predetermined disclosed playlist to eventually confirm selection of a musical content included on the disclosed playlist shown in FIG. 32 or, in other words, if the determination result indicates that the user has confirmed selection of a predetermined musical track from a track display screen 711 showing a list of musical tracks, that is, if the result of the determination indicates that the user has confirmed selection of a musical content or a musical track, the flow of the processing goes on to a step S12.

At the step S12, the music stream application of the information communication unit 1-1 serving as the recipient to receive a musical content to be reproduced in a streaming reproduction process receives the musical content from the information communication unit 1-2 serving as the source to supply the musical content to be reproduced in a streaming reproduction process. Details of the process carried out at this step S12 is described below by referring to a flowchart shown in FIG. 35.

Figure 35:
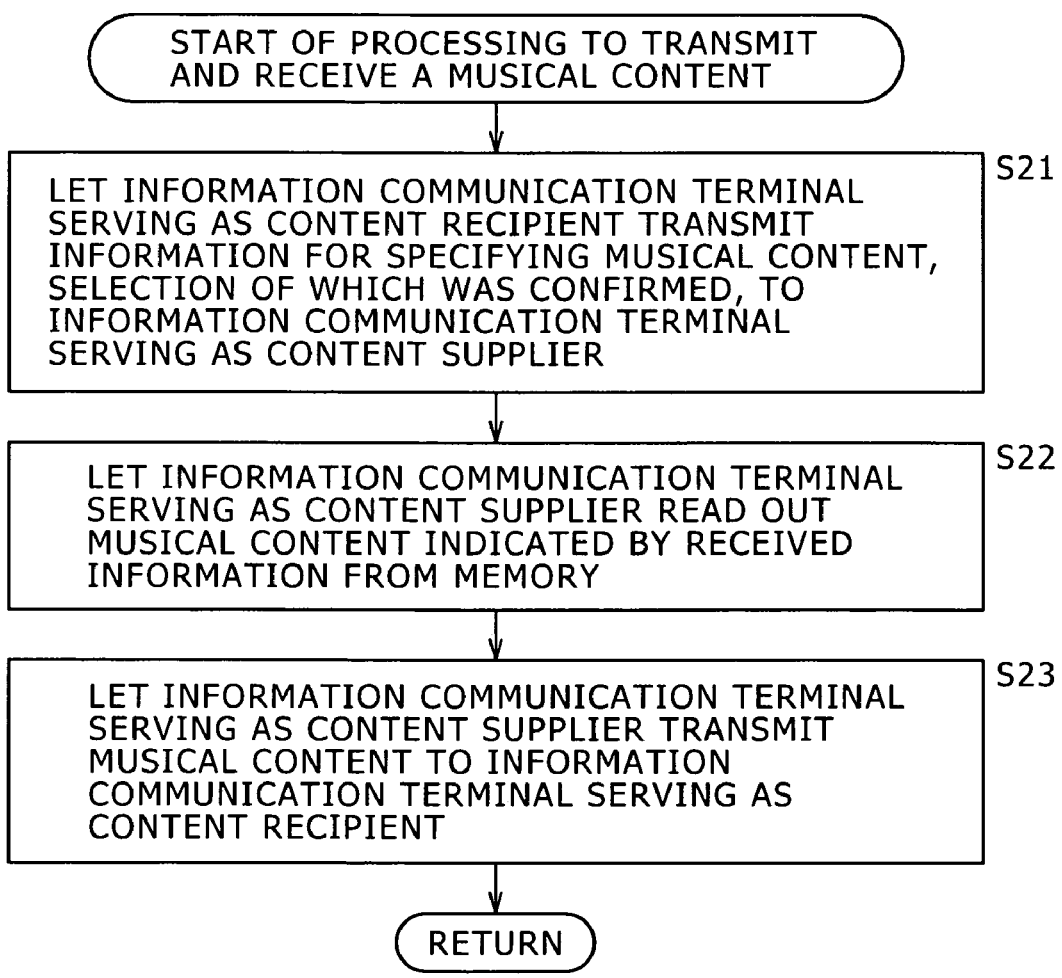
FIG. 35 shows a flowchart to be referred to in explanation of musical-data exchanging processing carried out at a step S12 of the flowchart shown in FIG. 33.

The flowchart shown in FIG. 35 begins with a step S21 at which the music stream application executed by the application processor 131 employed in the information communication unit 1-1 serving as the recipient to receive a musical content to be reproduced in a streaming reproduction process receives a signal from the input module 150 as a signal representing an operation input entered by the user. In accordance with the signal, the music stream application of the information communication unit 1-1 controls the radio communication module 148 to transmit information to the information communication unit 1-2 serving as the source to supply a musical content to be reproduced in a streaming reproduction process. The transmitted information is information used for specifying a playlist and musical data, selection of both of which has been confirmed by the user in accordance with the operation input entered by the user. The music stream application is executed by the application processor 131 of the information communication unit 1-1.

Then, at the next step S22, the music stream application executed by the application processor 131 employed in the information communication unit 1-2 serving as the source to supply a musical content to be reproduced in a streaming reproduction process receives the information used for specifying a playlist and musical data, selection of both of which has been confirmed by the user in accordance with the operation input entered by the user, from the information communication unit 1-1 through the radio communication module 148 employed in the information communication unit 1-2. The application processor 131 then passes on the information to the audio processor 132 employed in the information communication unit 1-2. Then, the audio processor 132 reads out the selected musical data from the large-capacity flash memory 154 also used for storing musical contents managed by using the music DB and passes on the musical data to the application processor 131. The music stream application is executed by the application processor 131 of the information communication unit 1-2.

Subsequently, at the next step S23, the audio processor 132 employed in the information communication unit 1-2 serving as the source to supply a musical content to be reproduced in a streaming reproduction process controls the radio communication module 148 to start transmitting the musical data read out from the large-capacity flash memory 154 to the information communication unit 1-1 serving as the recipient to receive a musical content to be reproduced in a streaming reproduction process. On the other hand, the radio communication module 148 employed in the information communication unit 1-1 receives the musical data from the information communication unit 1-2. In this way, the musical data is transmitted from the information communication unit 1-2 to the information communication unit 1-1 as the musical content reproduced in the streaming reproduction process.

As described above, when the information communication unit 1-1 receives the musical data from the information communication unit 1-2, the flow of the processing represented by the flowchart shown in FIG. 33 goes on to a step S13 at which the information communication unit 1-1 serving as the recipient to receive a musical content to be reproduced in a streaming reproduction process starts the streaming reproduction process of the musical data received from the information communication unit 1-2. To put it concretely, if the copyright of the stream data received from the information communication unit 1-2 serving as the source to supply a musical content to be reproduced in a streaming reproduction process is protected, the music stream application of the information communication unit 1-1 carries out a process to de-scramble the musical data by making use of a function and/or data, which are stored in DRM.Lib, supplying the result of the de-scramble process to the audio-signal processing module 152. The stream data is the musical data received by the information communication unit 1-1 from the information communication unit 1-2. Then, by making use of an audio coding/decoding function, the audio processor 132 controls the audio-signal processing module 152 to carry out a decoding process and a DA conversion process on the result of the de-scramble process. Finally, the music stream application outputs the result of the decoding process and the DA conversion process from the ringer speaker 42 or a headphone connected to the connector jack 52 as eventual reproduced data.

During the streaming reproduction process, the information communication unit 1-1 displays a musical-data reproduction display screen 671 explained before by referring to FIG. 29 on the display unit 21.

If the determination result produced at the step S11 indicates that the user has neither selected a musical content nor confirmed the selection of the musical content, on the other hand, the flow of the processing goes on to a step S14 to produce a result of determination as to whether or not the streaming reproduction process has been completed. If the result of the determination indicates that the streaming reproduction process has not been completed, the flow of the processing goes back to the step S11 to repeat the processes of this step and the subsequent steps.

If the determination result produced at the step S14 indicates that the streaming reproduction process has been completed, on the other hand, the processing is ended.

As described above, in accordance with the present invention, it is possible to provide a configuration in which disclosed playlists are provided by the information communication unit 1-2 serving as the source to supply a musical content to be reproduced in a streaming reproduction process to the information communication unit 1-1 serving as the recipient to receive a musical content to be reproduced in a streaming reproduction process and, if a musical content of a playlist is requested by a user owning the information communication unit 1-1, the requested musical content is supplied by the information communication unit 1-2 to the information communication unit 1-1. In an example shown in FIG. 36, musical content 'a' requested by the user owning the information communication unit 1-1 is supplied by the information communication unit 1-2 to the information communication unit 1-1. On the other hand, musical contents included on an undisclosed playlist in the information communication unit 1-2 can be enjoyed by only a user owning the information communication unit 1-2 and are not to be supplied to the user owning the information communication unit 1-1. In addition, in accordance with the present invention, it is possible to provide a configuration in which the information communication unit 1-2 provides information on a musical content being reproduced in the information communication unit 1-2 to the information communication unit 1-1 as the now-playing information cited before in spite of the fact that the musical content is included on an undisclosed playlist. An example of such a musical content is musical content 'c' in the example shown in FIG. 36. In this case, if the user owning the information communication unit 1-1 makes a request for the musical content indicated by the now-playing information, the information communication unit 1-2 provides the data of the content to the information communication unit 1-1. As a result, a musical content not included on a disclosed playlist in the information communication unit 1-2 can also be disclosed temporarily by the information communication unit 1-2 and supplied to the information communication unit 1-1 if the musical content is being reproduced in the information communication unit 1-2.

Figure 36:
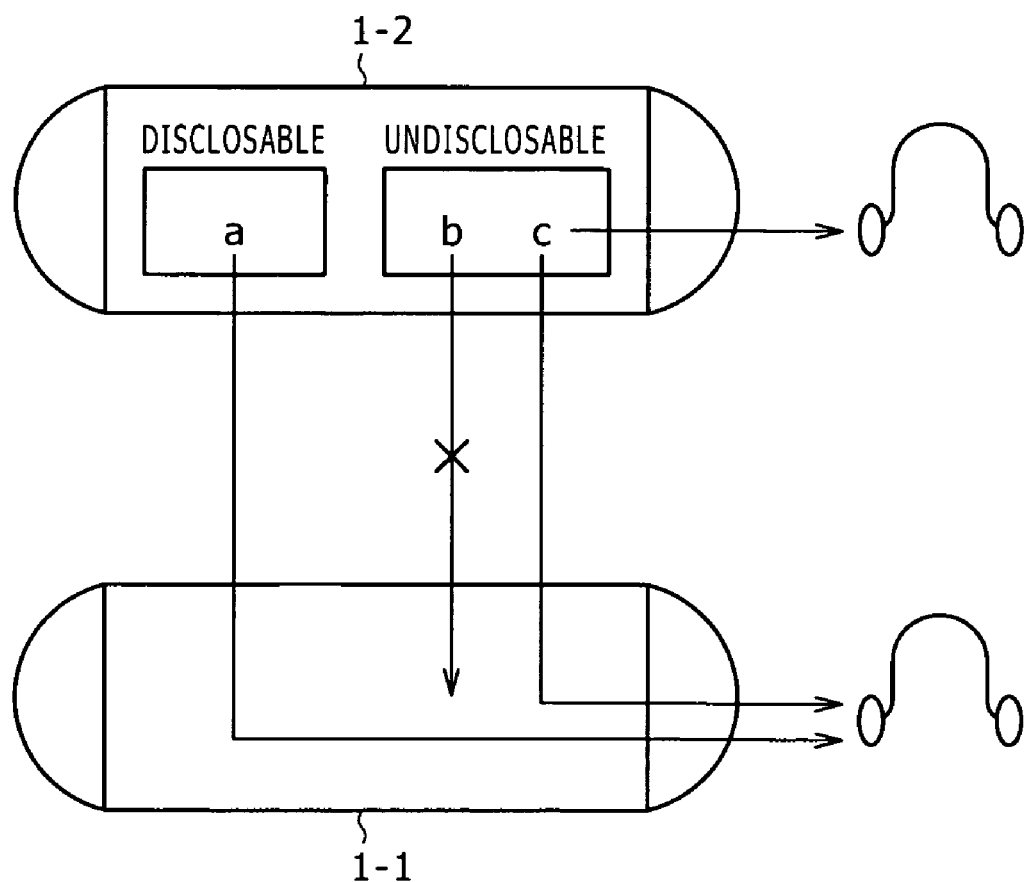
FIG. 36 is an explanatory diagram to be referred to in description of a streaming reproduction process.

Musical content 'c' in the example shown in FIG. 36 is a typical musical content not included on a disclosed playlist in the information communication unit 1-2 serving as the source to supply a musical content to be reproduced in a streaming reproduction process but supplied to the information communication unit 1-1 serving as the recipient to receive a musical content to be reproduced in a streaming reproduction process. It is to be noted that, in this case, musical content 'c' is reproduced in the information communication unit 1-1 in a streaming reproduction process synchronously with the reproduction in the information communication unit 1-2. Strictly speaking, musical content 'c' being reproduced in the information communication unit 1-2 serving as the source to supply a musical content is also reproduced in the information communication unit 1-1 serving as the recipient to receive a musical content to be reproduced in a streaming reproduction process typically at a predetermined time delay. This synchronous reproduction process can be implemented by typically exchanging time stamps at predetermined time intervals.

By carrying out the synchronous reproduction process as described above, for example, a predetermined effect added to the reproduction process by the information communication unit 1-2 serving as the source to supply a musical content to be reproduced in a streaming reproduction process can also be provided to the information communication unit 1 serving as the recipient to receive the musical content to be reproduced in the streaming reproduction process along with the musical content. An example of a reproduction process with the predetermined effect added is a scratch reproduction process.

Figure 37:
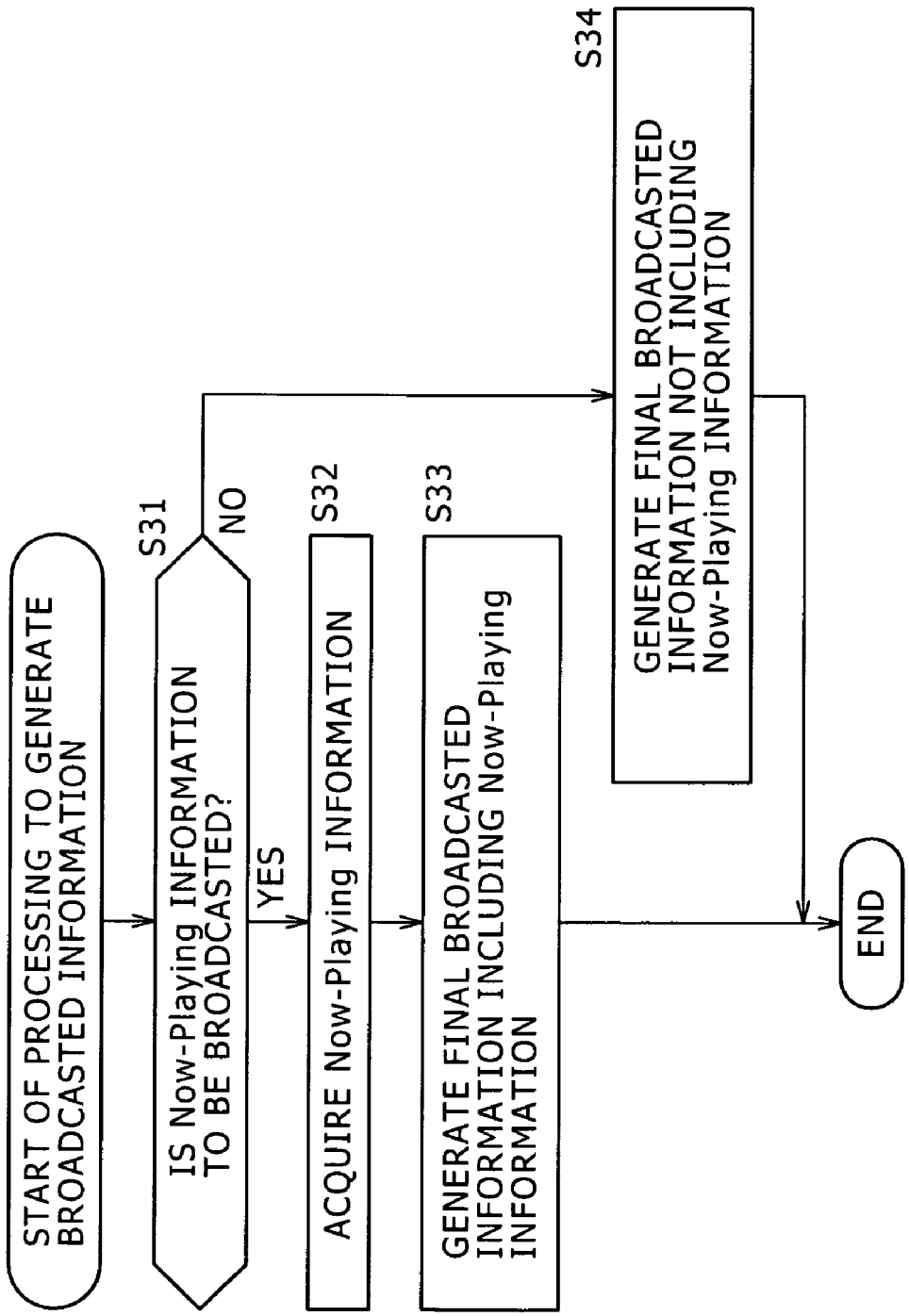
FIG. 37 shows a flowchart to be referred to in explanation of processing to generate broadcasted information.

Next, processing to generate broadcasted information is explained by referring to a flowchart shown in FIG. 37 as follows.

The flowchart shown in the figure begins with a step S31 at which the ad-hoc communication engine executed by the application processor 131 employed in the information communication terminal 1 produces a result of determination as to whether or not setting has been made to include information on a musical content being reproduced presently in information to be broadcasted. In the following description, the information on a musical content being reproduced presently is also referred to as now-playing information whereas the information to be broadcasted is also referred to as broadcasted information. For example, setting can be made to include information on a musical content being reproduced presently in the broadcasted information by checking a box associated with a now-playing item displayed on a setting screen 800 shown in FIG. 34 as an item representing the information on a musical content being reproduced presently.

If the determination result produced at the step S31 indicates that setting has been made to include the now-playing information in the broadcasted information, the flow of the processing goes on to a step S32 at which the ad-hoc communication engine executed by the application processor 131 employed in the information communication terminal 1 acquires the now-playing information. If the audio player executed by the audio processor 132 is reproducing a musical content, for example, the now-playing information including the title of the musical content being reproduced and the name of an artist for the content is acquired from the music DB shown in FIG. 13. If the audio player executed by the audio processor 132 is not reproducing a musical content, on the other hand, information indicating that no content is being reproduced is taken as the now-playing information.

Then, at the next step S33, the ad-hoc communication engine reads out broadcasted information other than the now-playing information from the large-capacity flash memory 154 typically through the audio processor 132 and generates final broadcasted information based on the other broadcasted information and the now-playing information. Examples of the broadcasted information other than the now-playing information are the unique IP address/port of the station implemented by the information communication terminal 1 and the unique ID of the station. The unique IP address/port and the unique ID are shown in FIG. 24.

If the determination result produced at the step S31 indicates that no setting has been made to include the now-playing information in the broadcasted information, on the other hand, the flow of the processing goes on to a step S34 at which the ad-hoc communication engine reads out broadcasted information other than the now-playing information from the large-capacity flash memory 154 typically through the audio processor 132 and generates final broadcasted information based on the other broadcasted information. Thus, in this case, the generated final broadcasted information does not include the now-playing information.

After the process carried out at the step S33 or S34 is completed, the processing to generate broadcasted information is ended.

In the processing described above, the now-playing information can be included in the broadcasted information in order to disclose a musical content presently being reproduced. It is to be noted, however, that a technique to disclose a musical content presently being reproduced is by no means limited to this method. That is to say, a musical content presently being reproduced can be disclosed by adoption of another method.

In addition, in the above descriptions, a musical content is reproduced in a streaming reproduction process. However, the present invention can also be applied to a case in which another content such as a moving picture is reproduced in a streaming reproduction process.

By referring to a functional block diagram of FIG. 38, the following description explains control executed by an information communication terminal 1 serving as a recipient to receive a musical content to be reproduced in a streaming reproduction process. The application processor 131 employed in an information communication terminal 1 carries out the control functions to transmit and receive streaming data during a streaming reproduction process. As shown in the figure, the control functions included in the application processor 131 as functions to transmit and receive streaming data during a streaming reproduction process include a reception control unit 901, a transmission control unit 902, a notification control unit 903 and an access-permission setting unit 904.

The access-permission setting unit 904 is a section for making setting to indicate whether a content stored in a storage unit 905 as a content of a first category of a second category and storing information on the setting in the storage unit 905, which can be typically the flash memory 156, memory 157 or removable recording medium 172 shown in FIG. 11. A content of the first category is defined as a content disclosable to an external apparatus while a content of the second category is defined as a content undisclosable to an external apparatus. In this embodiment, a content included on a disclosed playlist is a content disclosable to an external apparatus or a content of the first category whereas a content not included on a disclosed playlist is a content undisclosable to an external apparatus or a content of the second category. In addition, the access-permission setting unit 904 also controls the transmission control unit 902 to restrict operations to read out a content from the storage unit 905 on the basis of the setting information stored in the storage unit 905.

The information communication unit 1-1 serving as a recipient to receive a musical content to be reproduced in a streaming reproduction process is capable of transmitting a request for a disclosed playlist to the information communication unit 1-2 serving as a source to supply a musical content to be reproduced in a streaming reproduction process by way of the communication module 144. A user owning the information communication unit 1-1 can select a desired content included on a disclosed playlist received from the information communication unit 1-2 and the information communication unit 1-1 is capable of requesting the information communication unit 1-2 to transmit the selected content. Receiving the request for the selected content from the information communication unit 1-1 through the communication module 144 employed in the information communication unit 1-2, the information communication unit 1-2 transmits the content to the information communication unit 1-1 in a streaming reproduction process by way of the communication module 144.

In addition to the functions which have been described above, the access-permission setting unit 904 also sets a content being reproduced presently as a disclosed content without regard to whether the content has been stored in the storage unit 905 as a content of the first or second category. It is needless to say that, as described above, if no setting has been made to include now-playing information in the broadcasted information, the access-permission setting unit 904 does not set a content being reproduced presently by the audio processor 132 as a disclosed content.

In addition, if the reproduction of a content is inevitably stopped or changed in the information communication unit 1-2 for some reasons while the content is being transmitted to the information communication unit 1-1, the access-permission setting unit 904 employed in the information communication unit 1-2 discloses the content to the information communication unit 1-1 as a disclosable content till the information communication unit 1-2 completes or terminates the transmission of the content being reproduced to the information communication unit 1-1.

The reception control unit 901 employed in the information communication unit 1-1 is a section for controlling the communication module 144 of the information communication unit 1-1 to receive a disclosed content as a streaming content from the information communication unit 1-2 and store the content in the storage unit 905.

The transmission control unit 902 employed in the information communication unit 1-2 is a section for selecting a content, which has been set as a disclosed content in accordance with control executed by the access-permission setting unit 904 of the information communication unit 1-2, among contents stored in the storage unit 905 of the information communication unit 1-2, for reading out the selected content from the storage unit 905 and for controlling the communication module 144 of the information communication unit 1-2 to transmit the content to the information communication unit 1-1.

The notification control unit 903 is a section for generating broadcasted information including the title of a content being reproduced presently, the name of an artist for the content as well as a picture of the jacket of an album including the content and for controlling the communication module 144 to broadcast the generated information.

The series of processes described previously can be carried out by hardware and/or execution of software. If the series of processes described above is carried out by execution of software, programs composing the software can be installed into a computer embedded in dedicated hardware, a general-purpose personal computer or the like from typically a recording medium. In this case, the computer or the personal computer serves as the information communication terminal 1 described above. A general-purpose personal computer is defined as a personal computer, which can be made capable of carrying out a variety of functions by installing a variety of programs into the personal computer.

The aforementioned recording medium for recording programs to be installed into a computer or a general-purpose personal computer as programs to be executed by the computer or the general-purpose personal computer respectively is typically a removable recording medium 172 provided to the user separately from the main unit of the computer as shown in FIG. 11. Examples of the removable recording medium 172 include a magnetic disk such as a flexible disk, an optical disk such as a CD-ROM (Compact Disk-Read Only Memory) or a DVD (Digital Versatile Disk), a magneto-optical disk such as an MD (Mini Disk, a trademark) as well as a semiconductor memory.

In this specification, steps of each program recorded on the recording medium can be carried out not only in a pre-prescribed order along the time axis, but also concurrently or individually.

It is worth noting that the technical term 'system' used in this specification implies the configuration of a confluence including a plurality of apparatus.

It is also to be noted that embodiments of the present invention are by no means limited to the embodiments described above. In addition, it is possible to make a variety of changes in a range not deviating from essentials of the present invention.

What is claimed is:

1. An information communication terminal comprising:
a storage unit configured to store contents;
a communication unit configured to communicate with an external apparatus;
a content reproduction unit configured to reproduce a content from the contents stored in the storage unit;
an accessible-content setting unit configured to:

classify the contents into a first category of the contents, which are accessible by the external apparatus, and a second category of the contents, which are inaccessible by the external apparatus;

change a classification of the content, while the content is being reproduced by the content reproduction unit, to the first category if the content being reproduced is classified according to the second category; and change back the content being reproduced by the content reproduction unit from the first category to an original second category after reproduction of the content being reproduced is completed; and a transmission control unit configured to control the communication unit to transmit contents classified according to the first category to the external apparatus upon receipt of a request for the contents classified according to the first category received from the external apparatus through the communication unit, wherein if the reproduction of the content being reproduced is stopped while the transmission control unit is controlling the communication unit to transmit the content being reproduced to the external apparatus, then the accessible-content setting unit handles the content being reproduced as being classified according to the first category until the transmission control unit completes the controlling of the transmission of the content being reproduced to the external apparatus.

2. The information communication terminal according to claim 1, further comprising a notification unit configured to control the communication unit to notify the external apparatus of information on the content being reproduced, the notifying occurring through the communication unit.

3. The information communication terminal according to claim 1 wherein the transmission control unit controls the communication unit to transmit the contents that are categorized according to the first category to the external apparatus in a streaming format.

4. The information communication terminal according to claim 1, further comprising a reception control unit configured to control the communication unit to transmit a request to the external apparatus as a request for content and receiving the requested content from the external apparatus through the communication unit, wherein the content reproduction unit reproduces the received content synchronously with the reproduction of the requested content in the external apparatus.

5. The information communication terminal according to claim 1 wherein the accessible-content setting unit sets a content stored in the storage unit as a first category by including the content stored in the storage unit on a playlist.

6. The information communication terminal of claim 1, wherein the accessible-content setting unit is configured to change the classification of the content from the second category to the first category in response to the content being reproduced by the content reproduction unit.

7. An information communication method comprising the steps of:

classifying contents stored in a storage unit into a first category of the contents, which are accessible by an external apparatus and a second category of the contents, which are inaccessible by the external apparatus;

reproducing a content from the contents stored in the storage unit;

changing, by a processor, the content, while the content is being reproduced, to the first category if the content being reproduced is classified according to the second category;

changing back the content being reproduced from the first category to an original second category after reproduction of the content being reproduced is completed; and controlling a communication unit to transmit content classified according to the first category content to the external apparatus upon receipt of a request for the content classified according to the first category received from the external apparatus through the communication unit, wherein if the reproduction of the content being reproduced is stopped during the step of controlling, then the method further comprises the step of handling the content being reproduced as being classified according to the first category until completion of the step of controlling.

8. The information communication method according to claim 7, further comprising the step of:

controlling the communication unit to notify the external apparatus of information on the content being reproduced.

9. The information communication method according to claim 7, wherein the step of controlling further comprises:

controlling the communication unit to transmit the contents that are categorized according to the first category to the external apparatus in a streaming format.

10. The information communication method according to claim 7, the method further comprising the steps of:

controlling the communication unit to transmit a request to the external apparatus as a request for content;

receiving the requested content from the external apparatus; and reproducing the received content synchronously with the reproduction of the requested content in the external apparatus.

11. The information communication method according to claim 7, further comprising the step of:

setting a content stored in the storage unit as a first category by including the content stored in the storage unit on a playlist.

12. The information communication method of claim 7, wherein the step of changing the content further comprises:

changing the classification of the content from the second category to the first category in response to the reproduction of the content.

13. A recording medium storing a computer-readable program to be executed by a computer for carrying out processing comprising the steps of:

classifying contents stored in a storage unit into a first category of the contents, which is accessible by an external apparatus and a second category of the contents, which is inaccessible by the external apparatus;

reproducing a content from the contents stored in the storage unit;

changing, by a processor, the content, while the content is being reproduced, to the first category if the content being reproduced is classified according to the second category;

changing back the content being reproduced from the first category to an original second category after reproduction of the content being reproduced is completed; and controlling a communication unit to transmit content classified according to the first category content to the external apparatus upon receipt of a request for the content classified according to the first category from the external apparatus through the communication unit, wherein if the reproduction of the content being reproduced is stopped during the step of controlling, then the method further comprises the step of handling the content being reproduced as being classified according to the first category until completion of the step of controlling.

14. An information communication system comprising:
a first information communication terminal; and
a second information communication terminal, wherein
the first information communication terminal includes:
a first storage unit configured to store contents,
a first communication unit configured to communicate with the second information communication terminal,
a first content reproduction unit configured to reproduce a content from the contents stored in the first storage unit,
a first accessible-content setting unit configured to:
classify the contents into a first category of the contents, which are accessible by the second information communication terminal and a second category of the contents, which are inaccessible by the second information communication terminal,
changing a classification of the content, while the content is being reproduced by the first content reproduction unit, to the first category if the content being reproduced is classified according to the second category, and
change back the content being reproduced by the content reproduction unit from the first category to an original second category after reproduction of the content being reproduced is completed; and a transmission control unit configured to control the first communication unit to transmit the content classified according to the first category being reproduced by the first content reproduction unit to the second information communication terminal upon receipt of a request for the contents classified according to the first category received from the second information communication terminal through the first communication unit, wherein if the reproduction of the content being reproduced is stopped while the transmission control unit is controlling the communication unit to transmit the content being reproduced to the external apparatus, then the accessible-content setting unit handles the content being reproduced as being classified according to the first category until the transmission control unit completes the controlling of the transmission of the content being reproduced to the external apparatus, and further wherein, the second information communication terminal includes
a second communication unit configured to communicate with the first information communication terminal,
a reception control unit configured to control the second communication unit to transmit a request to the first information communication terminal as a request for the contents classified according to the first category content being reproduced by the first information communication terminal and receive the content, and
a second content reproduction unit configured to reproduce the received content.

* * * * *